(12) United States Patent
Hirzallah et al.

(10) Patent No.: US 12,531,765 B2
(45) Date of Patent: Jan. 20, 2026

(54) COMPRESSING AND REPORTING PRS/SRS MEASUREMENTS FOR LMF-SIDED AI/ML POSITIONING

(71) Applicant: QUALCOMM Incorporated, San Diego, CA (US)

(72) Inventors: Mohammed Ali Mohammed Hirzallah, San Diego, CA (US); Taesang Yoo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/320,918

(22) Filed: May 19, 2023

(65) Prior Publication Data
US 2024/0388472 A1 Nov. 21, 2024

(51) Int. Cl.
*H04L 25/02* (2006.01)
*H04L 5/00* (2006.01)

(52) U.S. Cl.
CPC ........ *H04L 25/0212* (2013.01); *H04L 5/0051* (2013.01)

(58) Field of Classification Search
CPC . H04L 25/0212; H04L 5/0048; H04L 5/0051; H04L 25/0224; H04W 64/00; G01S 5/0036; G06N 3/00
See application file for complete search history.

(56) References Cited

U.S. PATENT DOCUMENTS

2023/0109257 A1* 4/2023 Rydén ............... H03M 7/30
341/50

FOREIGN PATENT DOCUMENTS

WO 2023211627 A1 11/2023

OTHER PUBLICATIONS

CATT: "Discussion on AI/ML For Positioning Enhancement", 3GPP TSG RAN WG1 #110bis-e, R1-2208972, 3rd Generation Partnership Project, Mobile Competence Centre, 650, Route Des Lucioles, F-06921, Sophia-Antipolis Cedex, France, vol. RAN WG1, No. e-Meeting, Oct. 10, 2022-Oct. 19, 2022, Sep. 30, 2022, 8 Pages, XP052276892.
International Search Report and Written Opinion—PCT/US2024/028544—ISA/EPO—Aug. 12, 2024.

(Continued)

*Primary Examiner* — Natasha W Cosme
(74) *Attorney, Agent, or Firm* — Procopio, Cory, Hargreaves & Savitch LLP

(57) ABSTRACT

Aspects presented herein may improve the efficiency and performance of artificial intelligence (AI)/machine learning (ML) (AI/ML) positioning by enabling a user equipment (UE) to compress downlink (DL) reference signal measurements to reduce reporting overhead for the DL reference signal measurements. In one aspect, a UE performs at least one channel impulse response (CIR) measurement or at least one channel frequency response (CFR) measurement for a set of positioning reference signals (PRSs). The UE compresses the at least one CIR measurement or the at least one CFR measurement for the set of PRSs. The UE reports, for a network entity, one or more of the at least one compressed CIR measurement or the at least one compressed CFR measurement for the set of PRSs.

28 Claims, 28 Drawing Sheets

(56) References Cited

OTHER PUBLICATIONS

Mediatek Inc: "Other Aspects on AI ML Based Positioning Enhancement", 3GPP TSG RAN WG1 Meeting #112bis-e, R1-2303341, 3rd Generation Partnership Project, Mobile Competence Centre, 650, Route Des Lucioles, F-06921, Sophia-Antipolis Cedex, France, vol. 3GPP RAN 1, No. Online, Apr. 17, 2023-Apr. 26, 2023, Apr. 7, 2023, 22 Pages, XP052293905, The whole document.

Qualcomm Incorporated: "Other Aspects on AI/ML For Positioning Accuracy Enhancement", 3GPP TSG RAN WG1 #112bis-e, R1-2303587, 3rd Generation Partnership Project, Mobile Competence Centre, 650, Route Des Lucioles, F-06921, Sophia-Antipolis Cedex, France, vol. 3GPP RAN 1, No. Online, Apr. 17, 2023-Apr. 26, 2023, Apr. 7, 2023, 33 Pages, XP052294147, The whole document.

TCL Communication: "Discussions on CSI Measurement Enhancement for AI/ML Communication", 3GPP TSG RAN WG1 #112bis-e, R1-2303810, 3rd Generation Partnership Project, Mobile Competence Centre, 650, Route Des Lucioles, F-06921, Sophia-Antipolis Cedex, France, vol. RAN WG1, No. e-Meeting, Apr. 17, 2023-Apr. 26, 2023, Apr. 7, 2023, 11 Pages, XP052353258, The whole document.

\* cited by examiner

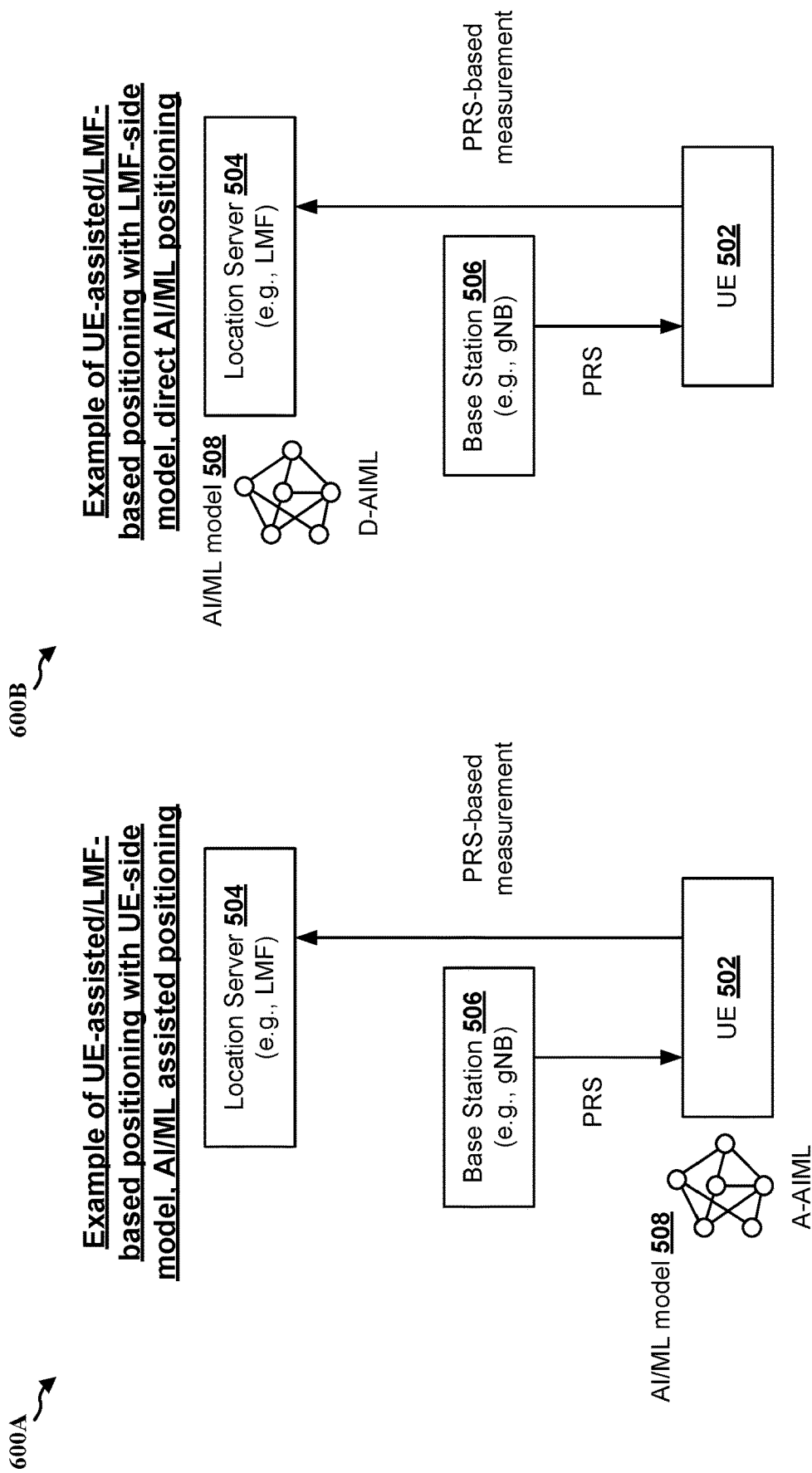

COMPRESSING AND REPORTING PRS/SRS MEASUREMENTS FOR LMF-SIDED AI/ML POSITIONING

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus performs at least one channel impulse response (CIR) measurement or at least one channel frequency response (CFR) measurement for a set of positioning reference signals (PRSs). The apparatus compresses the at least one CIR measurement or the at least one CFR measurement for the set of PRSs. The apparatus reports, for a network entity, one or more of the at least one compressed CIR measurement or the at least one compressed CFR measurement for the set of PRSs.

In an aspect of the disclosure, a method, a computer-readable medium, and an apparatus are provided. The apparatus transmits, for a user equipment (UE), an indication to report one or more of at least one compressed CIR measurement or at least one compressed CFR measurement for a set of PRSs. The apparatus receives, from the UE, one or more of the at least one compressed CIR measurement or the at least one compressed CFR measurement for the set of PRSs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6A is a diagram illustrating an example of UE-assisted/location management function (LMF)-based positioning with UE-side AI/ML model, AI/ML assisted positioning in accordance with various aspects of the present disclosure.

FIG. 6B is a diagram illustrating an example of UE-assisted/LMF-based positioning with LMF-side model, direct AI/ML positioning in accordance with various aspects of the present disclosure.

DETAILED DESCRIPTION

Figure 1:
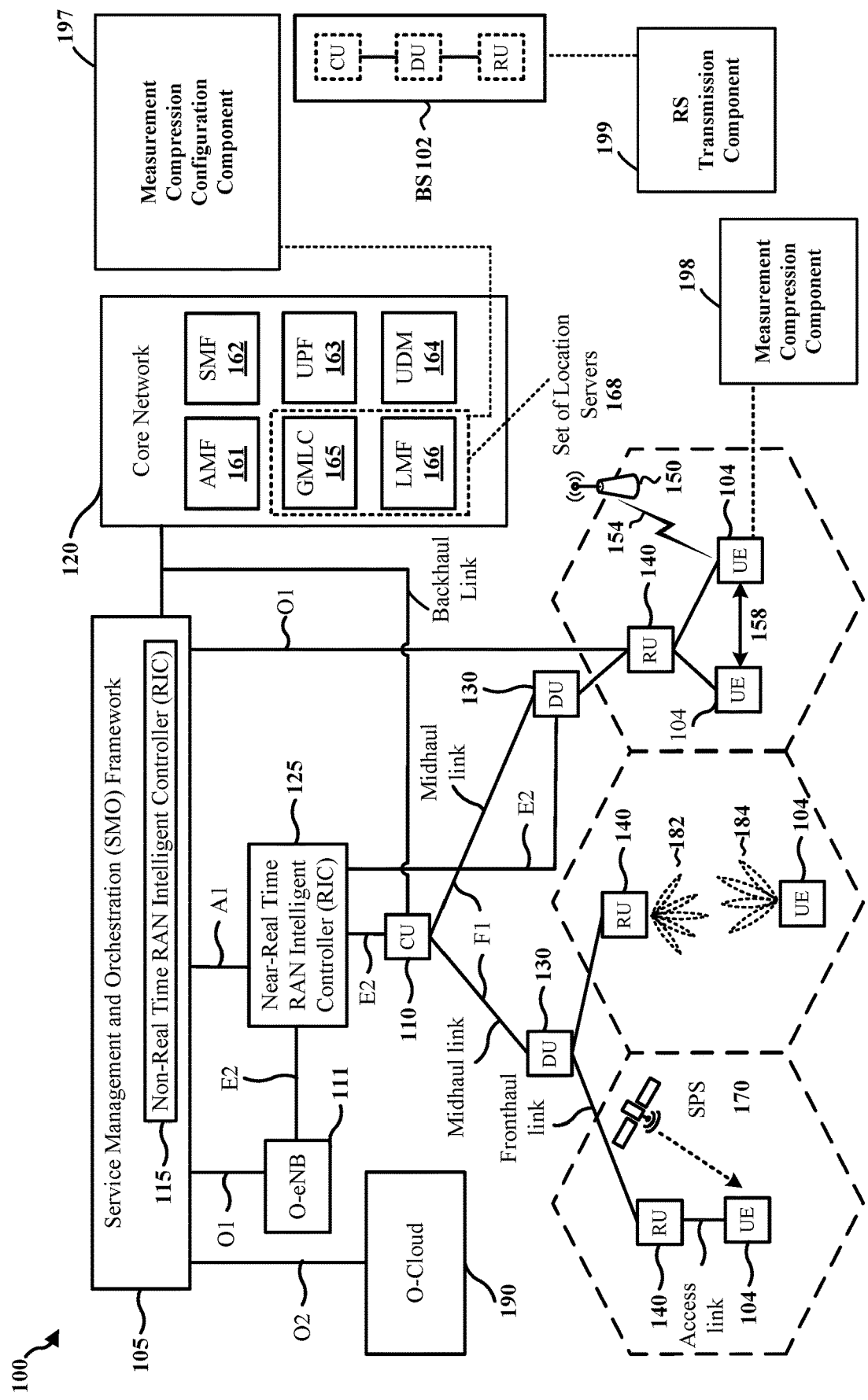
FIG. 1 is a diagram illustrating an example of a wireless communications system and an access network.

Aspects presented herein may improve the efficiency and performance of artificial intelligence (AI)/machine learning (ML) (AI/ML) positioning by reducing the reporting overhead for downlink (DL) reference signal measurements. For example, aspects presented herein may enable a UE to compress the reporting of channel impulse response (CIR)/channel frequency response (CFR) measurements using one or more compressing methods, where an AI/ML model may use the compressed CIR/CFR reporting to perform AI/ML inference and/or to be trained effectively and accurately. In other words, although reporting the whole CIR/CFR measurements for an AI/ML model (e.g., an LMF-sided AI/ML model) may be inefficient due to high over-the-air (OTA) reporting overhead, one or more compression methods may be implemented at a UE for a more efficient reporting of CIR/CFR measurements to a location management function (LMF), such as when the UE is configured to report multiple PRS resources.

Aspects presented herein may also improve the efficiency, accuracy, and performance of AI/ML positioning based on UL reference signal (e.g., sounding reference signal (SRS)) measurements by reducing the reporting overhead for UL reference signal measurements. For example, aspects presented herein may enable a network node (e.g., a NG-RAN node, a base station, a transmission reception point (TRP), etc.) to compress the reporting of CIR/CFR measurements using one or more compressing methods, where an AI/ML model may use the compressed CIR/CFR reporting to perform AI/ML inference and/or to be trained effectively and accurately. Although reporting of UL measurement(s) (e.g., in NR Positioning Protocol A (NRPPa)) may take place over a wired/fiber channel, it may still be suitable to seek methods for compressing CIR/CFR measurements as they incur high reporting overhead as discussed above, especially when a network node is configured to report multiple SRS resources.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF)

163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a measurement compression component 198 that may be configured to perform at least one CIR measurement or at least one CFR measurement for a set of PRSs; compress the at least one CIR measurement or the at least one CFR measurement for the set of PRSs; and report, for a network entity, one or more of the at least one compressed CIR measurement or the at least one compressed CFR measurement for the set of PRSs. In certain aspects, the base station 102 may include an RS transmission component 199 that may be configured to transmit a set of RSs to the UE 104 for performing measurements related to positioning.

In certain aspects, the one or more location servers 168 may include a measurement compression configuration component 197 that may be configured to transmit, for a UE, an indication to report one or more of at least one compressed CIR measurement or at least one compressed CFR measurement for a set of PRSs; and receive, from the UE, one or more of the at least one compressed CIR measurement or the at least one compressed CFR measurement for the set of PRSs.

Figure 2:
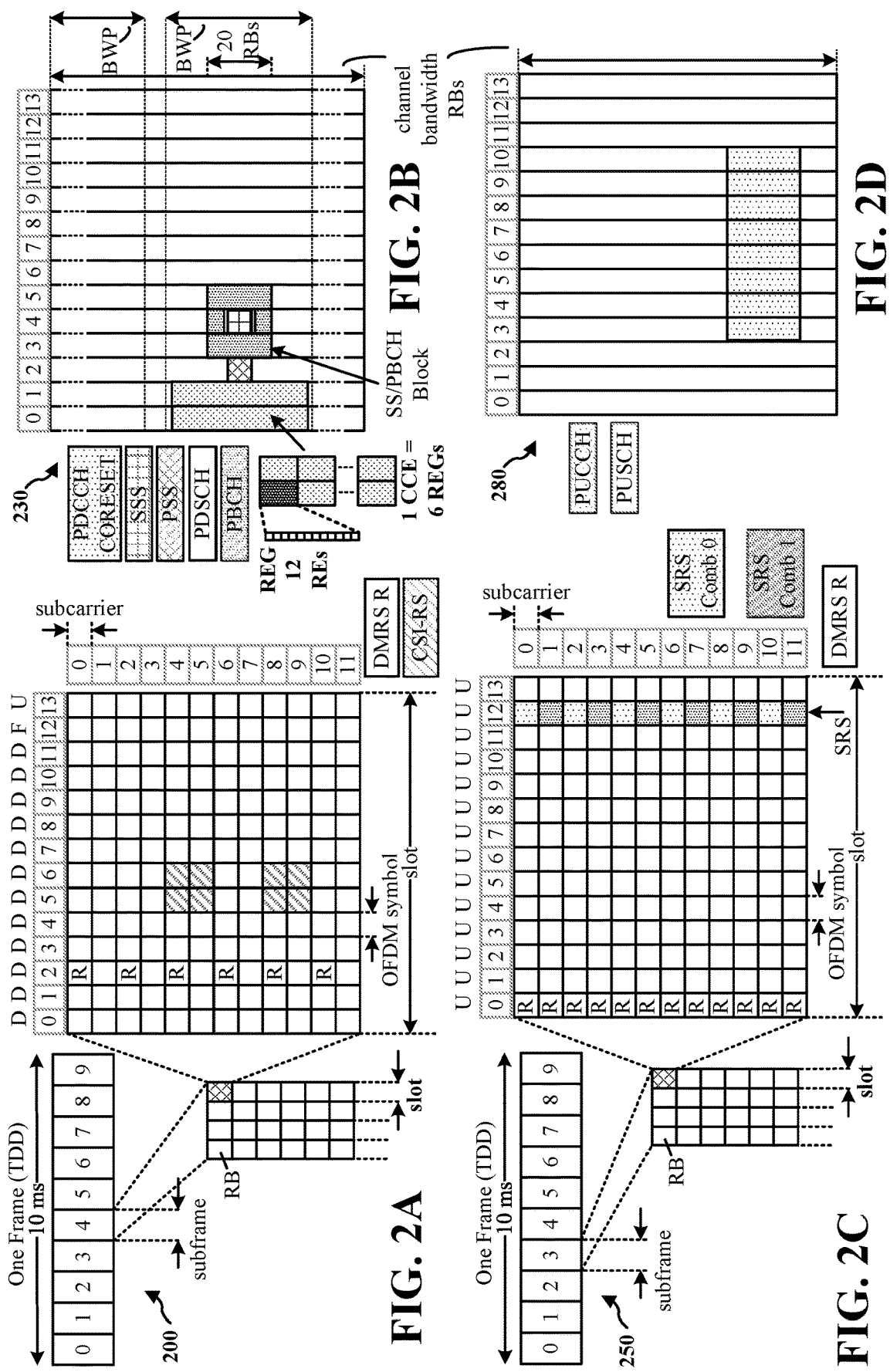
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
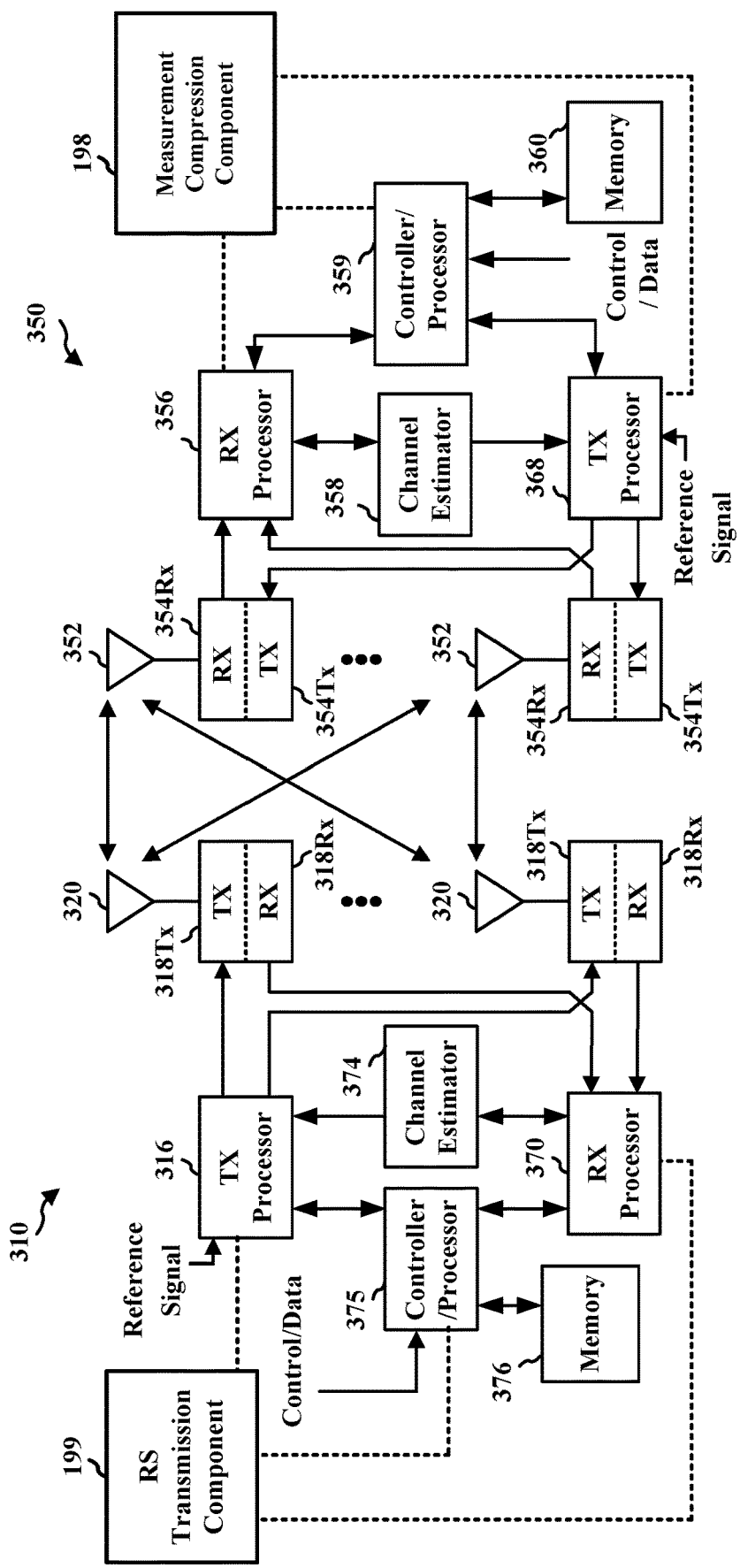
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement compression component 198 of FIG. 1.

At least one of the TX processor 316, the RX processor 370, and the controller/processor 375 may be configured to perform aspects in connection with the RS transmission component 199 of FIG. 1.

Figure 4:
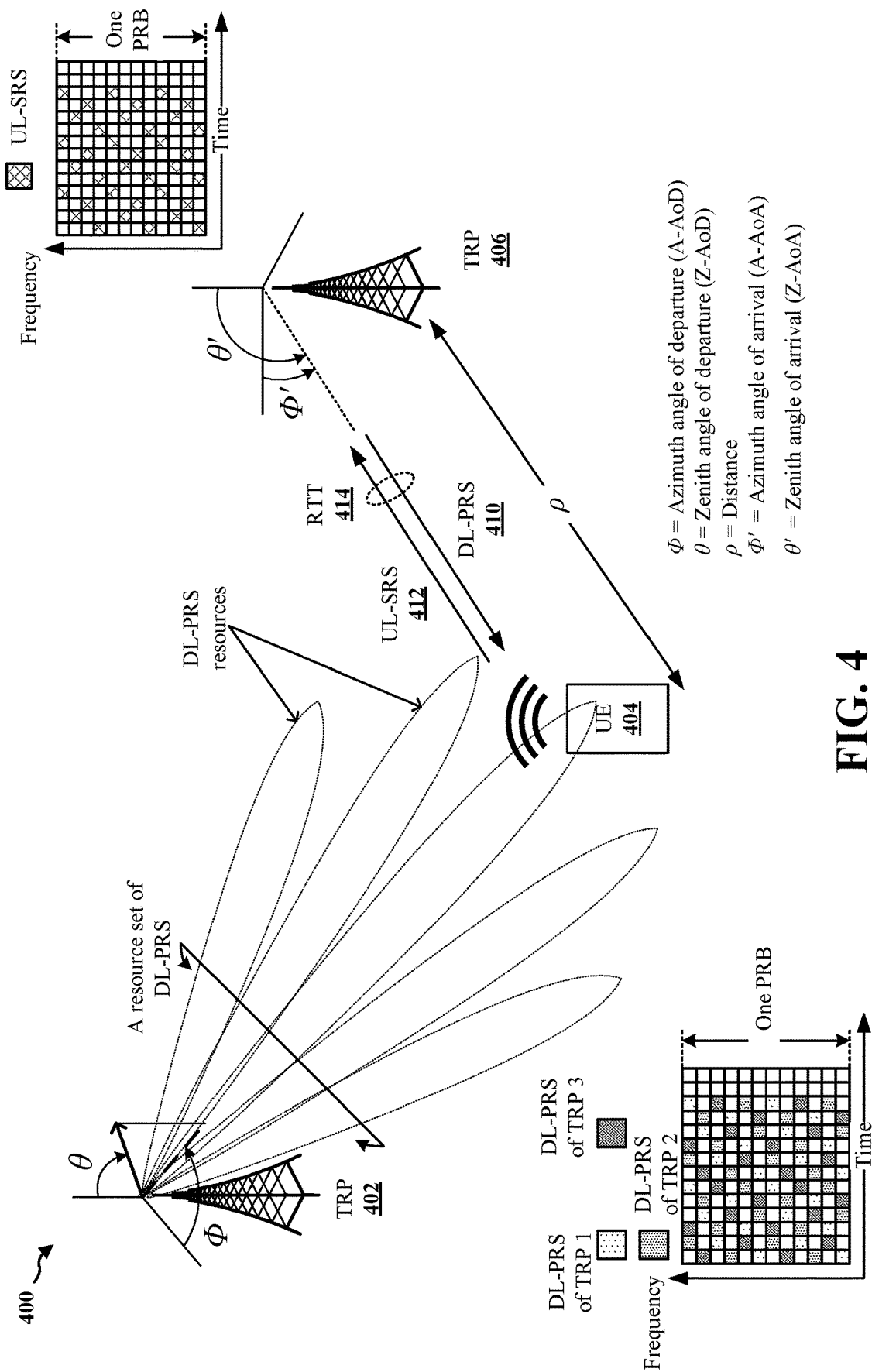
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS

412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance to certainty, supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In some implementations, at least one artificial intelligence (AI)/machine learning (ML) (AI/ML) model may be configured/implemented at a UE or at a network entity/node (e.g., a base station, a location server, a location management function (LMF), etc.) for assisting the UE and/or the network entity/node with the positioning of the UE. For example, an AI/ML model may be trained to determine the position of a UE based on DL-AoA, DL-TDOA, channel impulse response (CIR), radio frequency (RF) fingerprinting, etc. In most scenarios, using an AI/ML model may significantly improve UE positioning latency, accuracy/reliability, and/or efficiency. For purposes of the present disclosure, an AI/ML model that is implemented at a UE side may be referred to as a "UE-side model" and/or "UE-side AI/ML model." On the other hand, an AI/ML model that is implemented at a network side may be referred to as a "network-side model," "network-side AI/ML model," and/or (network name)-side AI/ML model (e.g., base station-side AI/ML model, LMF-side AI/ML model, etc.).

In addition, positioning that is associated with a UE or a network entity/node using an AI/ML model to determine the position of the UE may be referred to as "direct AI/ML positioning," whereas positioning that is associated with a UE or a network entity/node performing positioning related measurements using an AI/ML model (and transmitting the positioning related measurements to another entity) to determine the position of the UE may be referred to as "AI/ML assisted positioning" and/or "assisted AI/ML positioning." Also, UE-based positioning (e.g., UE determines its own position) using at least one UE-side AI/ML model may be referred to as "direct UE AI/ML positioning" and/or "UE direct AI/ML positioning," whereas UE-assisted positioning (e.g., a UE provides positioning measurements and a network entity, such as an LMF, determines the position for the UE based on the positioning measurements provided by the UE) using at least one UE-side AI/ML model may be referred to as "UE AI/ML assisted positioning," "UE assisted AI/ML positioning" "AI/ML assisted UE positioning," and/or "AI/ML UE assisted positioning," etc. Similarly, network-based positioning (e.g., a network entity, such as an LMF, determines the position for the UE) using at least one network/LMF-side AI/ML model may be referred to as "direct network/LMF AI/ML positioning" and/or "network/LMF direct AI/ML positioning."

Figure 5:
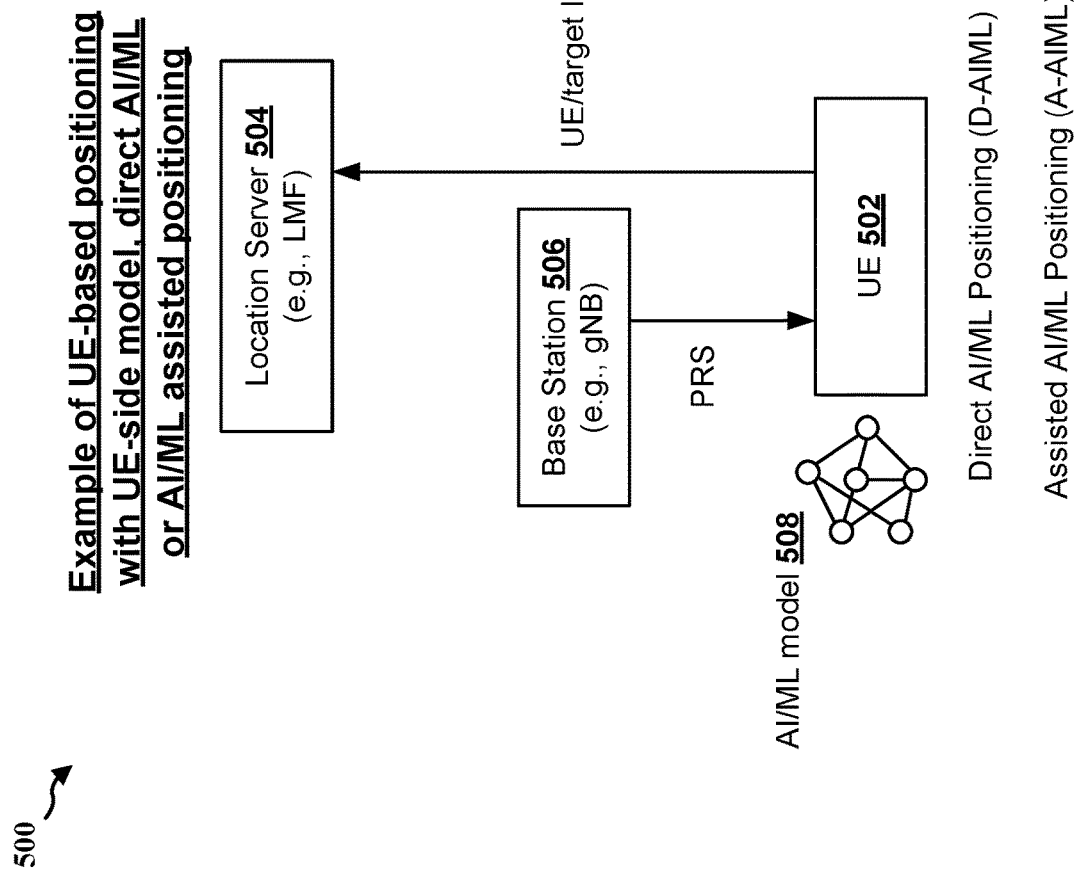
FIG. 5 is a diagram illustrating an example of UE-based positioning with UE-side AI/ML model, direct artificial intelligence (AI)/machine learning (ML) (AI/ML) or AI/ML assisted positioning in accordance with various aspects of the present disclosure.

FIG. 5 is a diagram 500 illustrating an example of UE-based positioning with UE-side AI/ML model, direct AI/ML or AI/ML assisted positioning in accordance with various aspects of the present disclosure. In one implementation, a UE 502 may be associated with at least one AI/ML model 508, and the UE 502 may use the at least one AI/ML model 508 to perform the direct AI/ML positioning and/or the assisted AI/ML positioning based on downlink (DL) reference signals, such as positioning reference signals (PRSs). For example, the UE 502 may receive and measure a set of PRSs transmitted from a base station 506, such as measuring the reference signal received power (RSRP), channel impulse response (CIR), DL-AoA, and/or time of flight (ToF) of the set of PRSs, etc., which may be collectively be referred to as "PRS measurement(s)" and/or "PRS-based measurement(s)." In some examples, the UE 502 may use the at least one AI/ML model 508 for measuring the set of PRSs (e.g., for assisted AI/ML positioning). In some examples, based on the PRS measurement(s), the UE 502 may use the at least one AI/ML model 508 for determining its position (e.g., for direct AI/ML positioning). Note in this assisted AI/ML positioning example, the UE 502 may use the at least one AI/ML model 508 for performing PRS measurements, and the UE 502 may determine its position based on the PRS measurements without the assistance of an AI/ML model.

FIG. 6A is a diagram 600A illustrating an example of UE-assisted/LMF-based positioning with UE-side AI/ML model, AI/ML assisted positioning in accordance with various aspects of the present disclosure. In another implementation, a UE 502 may be associated with at least one AI/ML model 508, and the UE 502 may use the at least one AI/ML model 508 to perform or assist measurement(s) of DL reference signals. For example, the UE 502 may receive and measure a set of PRSs transmitted from a base station 506 with the assistance of the at least one AI/ML model 508, which may be referred to as "PRS-based measurement(s)" Then, the UE 502 may transmit the PRS-based measurement(s) to a location server 504, such as an LMF. In response, the location server 504 may determine the position of the UE 502 based on the PRS-based measurement(s) (with or without suing an AI/ML model).

FIG. 6B is a diagram 600B illustrating an example of UE-assisted/LMF-based positioning with LMF-side AI/ML model, direct AI/ML positioning in accordance with various aspects of the present disclosure. In another implementation, a UE 502 may not include a UE-side AI/ML model, and a location server 504 may use at least one AI/ML model 508 to determine the position of the UE 502. For example, the UE 502 may receive and measure a set of PRSs transmitted from a base station 506, and the UE 502 may transmit the PRS-based measurement(s) to the location server 504, such as an LMF. In response, the location server 504 may use the at least one AI/ML model 508 to determine the position of the UE 502 based on the PRS-based measurement(s) from the UE 502.

Figure 7B:
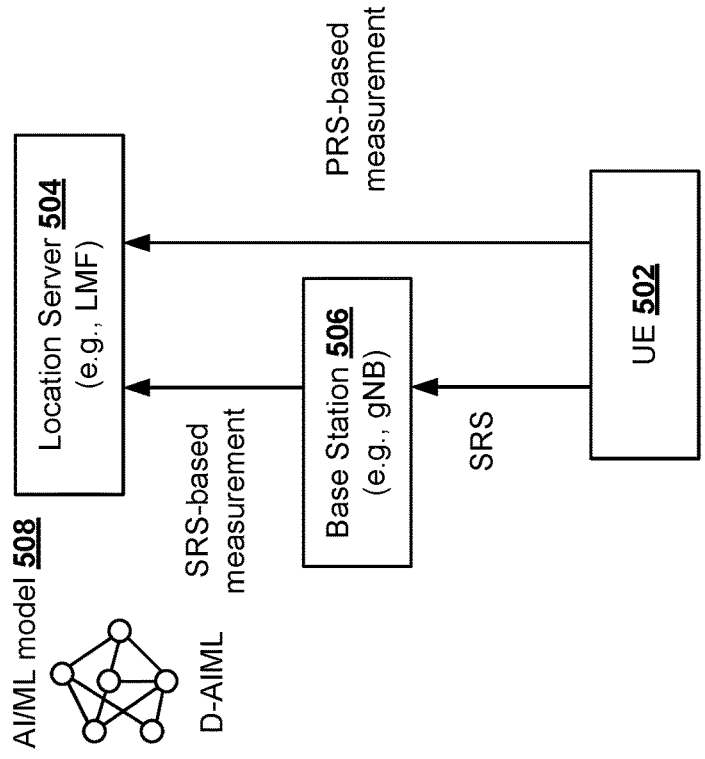
FIG. 7B is a diagram illustrating an example of network (e.g., NG-RAN) node assisted positioning with LMF-side model, direct AI/ML positioning in accordance with various aspects of the present disclosure.
Figure 7A:
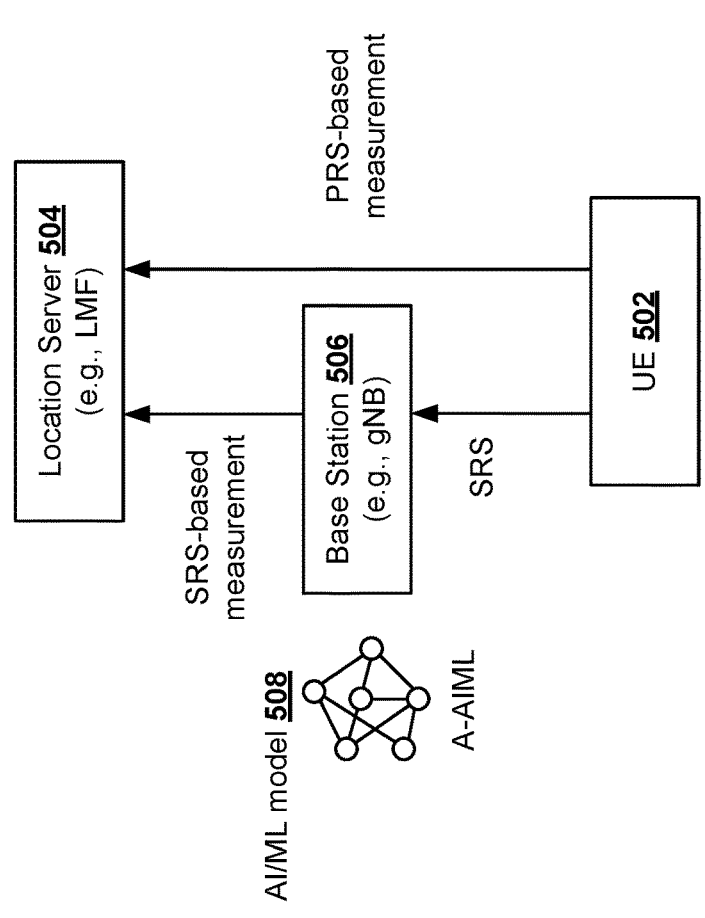
FIG. 7A is a diagram illustrating an example of network (e.g., a next generation (NG) radio access network (RAN) (NG-RAN)) node assisted positioning with gNB-side model, AI/ML assisted positioning in accordance with various aspects of the present disclosure.

FIG. 7A is a diagram 700A illustrating an example of network (e.g., NG-RAN) node assisted positioning with gNB-side AI/ML model, AI/ML assisted positioning in accordance with various aspects of the present disclosure. In another implementation, a network node, such as a base station 506, may be associated with at least one AI/ML model 508, and the base station 506 may use the at least one AI/ML model 508 to assist measurement(s) of uplink (UL) reference signals, such as sounding reference signals (SRSs). For example, the UE 502 may transmit a set of SRSs to the base station 506, and the base station 506 may receive and measure the set of SRSs (which may be referred to as "SRS-based measurement(s)") with the assistance of the at least one AI/ML model 508. Then, the base station 506 may transmit the SRS-based measurement(s) to the location server 504, such as an LMF. In response, the location server 504 may determine the position of the UE 502 based on the SRS-based measurement(s) from the base station 506 (with or without suing an AI/ML model).

FIG. 7B is a diagram 700B illustrating an example of network (e.g., NG-RAN) node assisted positioning with LMF-side AI/ML model, direct AI/ML positioning in accordance with various aspects of the present disclosure. In another implementation, a network node, such as a base station 506, may not include an AI/ML model, and a location server 504 may use at least one AI/ML model 508 to determine the position of a UE 502. For example, the UE 502 may transmit a set of SRSs to the base station 506, and the base station 506 may receive and measure the set of SRSs. Then, the base station 506 may transmit the SRS-based measurement(s) to the location server 504, such as an LMF. Based on the SRS-based measurement(s) from the base station 506, the location server 504 may use the at least one AI/ML model 508 to determine the position of the UE 502. For purposes of the present disclosure, positioning described in connection with FIGS. 5, 6A, and 6B may be referred to as AI/ML positioning based on DL reference signals, and positioning described in connection with FIGS. 7A and 7B may be referred to as AI/ML positioning based on UL reference signals.

Figure 8A:
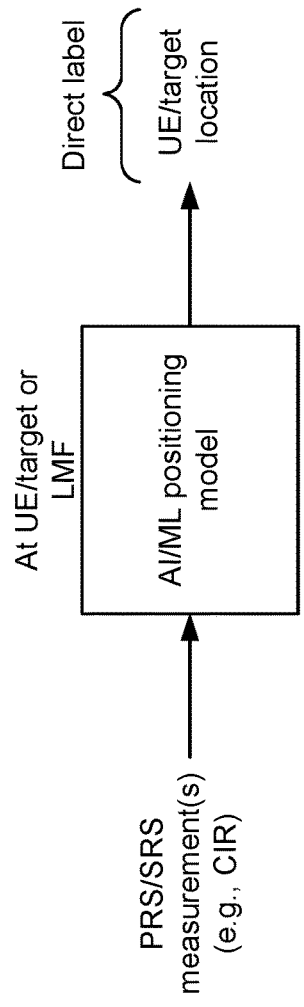
FIG. 8A is a diagram illustrating an example of direct AI/ML positioning in accordance with various aspects of the present disclosure.

FIG. 8A is a diagram 800A illustrating an example of direct AI/ML positioning in accordance with various aspects of the present disclosure. As described in connection with FIGS. 5, 6B, and 7B, for direct AI/ML positioning, a network entity (e.g., a UE, a location server, an LMF, etc.) may use at least one AI/ML model (e.g., the at least one AI/ML model 508) to determine the position of a UE or a target. For example, a UE may receive and measure PRSs transmitted from one or more base stations, and the UE may determine its position using an AI/ML model based on the PRS measurements. In another example, an LMF may receive PRS measurements from a UE or SRS measurements from a baes station, and the LMF may determine the position of the UE using an AI/ML model based on the PRS/SRS measurements.

Figure 8B:
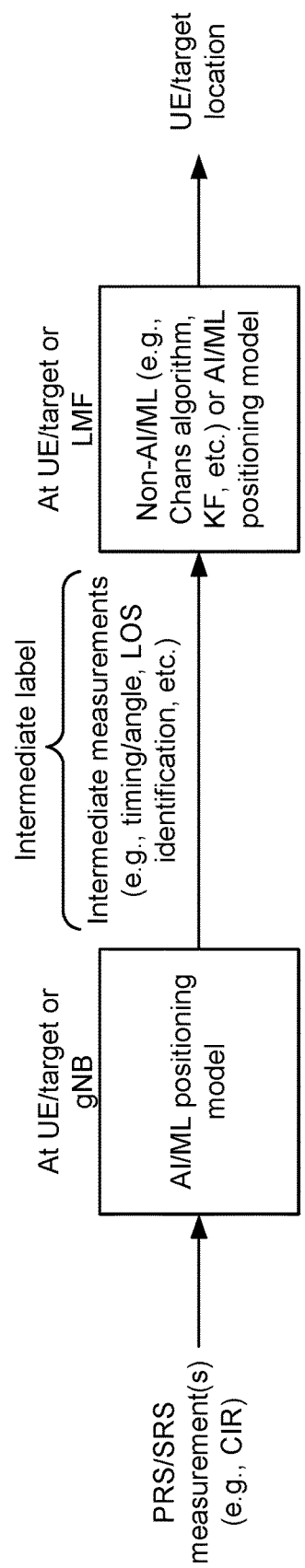
FIG. 8B is a diagram illustrating an example of AI/ML assisted positioning in accordance with various aspects of the present disclosure.

FIG. 8B is a diagram 800B illustrating an example of AI/ML assisted positioning in accordance with various aspects of the present disclosure. As described in connection with FIGS. 5, 6A, and 7A, for AI/ML assisted positioning, a network node/entity (e.g., a UE, a base station, etc.) may use at least one AI/ML model (e.g., the at least one AI/ML model 508) to assist measurement of reference signals (e.g., PRS, SRS, etc.). Then, the network node/entity may transmit the reference signal measurements to a location server, such as an LMF. In response, the location server may determine the position of the UE based on a non-AI/ML mechanism/algorithm, or based on using an AI/ML model to determine the position of the UE. For example, a UE may receive and measure PRSs transmitted from one or more base stations, and the UE may transmit the PRS measurements to an LMF. The PRS measurements may include intermediate measurements, such as timing and/or angle of the PRSs, whether the PRSs are received based on a line-of-sight (LOS) condition or a non-line-of-sight (NLOS) condition, etc. Then, the LMF may determine the position of the UE based on the PRS measurements (e.g., the intermediate measurements) with or without using an AI/ML model. Similarly, a base station may receive and measure SRSs transmitted from a UE, and the baes station may transmit the SRS measurements to an LMF. Then, the LMF may determine the position of the UE based on the SRS measurements (e.g., the intermediate measurements) with or without using an AI/ML model.

A positioning frequency layer (PFL) (or a "frequency layer" in some examples) may refer to a collection of one or more PRS resource sets across one or more TRPs that have the same values for certain parameters. A PFL may include one or more TRPs, and each TRP in the one or more TRPs may include one or more resource sets, and each resource set in the one or more resource sets may include one or more PRs resources, etc. In some examples, the collection of PRS resource sets may have the same subcarrier spacing and cyclic prefix (CP) type (e.g., meaning all numerologies supported for PDSCHs are also supported for PRS), the same value of the downlink PRS bandwidth, the same start PRB (and center frequency), and/or the same comb-size, etc. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

In some implementations, the concept of a PFL may be similar to a component carrier (CC) and a BWP, where CCs and BWPs may be used by one base station (or a macro cell base station and a small cell base station) to transmit data channels, while PFLs may be used by multiple (e.g., three or more) base stations to transmit PRS. A UE may indicate the number of PLFs it is capable of supporting when the UE sends the network its positioning capabilities, such as during a positioning protocol session. For example, a UE may indicate whether it is capable of supporting one, two, three, or four PFLs.

In some scenarios, a UE may receive a plurality of PRS resources from multiple TRPs via one or more PFLs, where the UE may not have capabilities to process all of the plurality of PRS resources. As such, the UE may apply a predefined prioritization rule to prioritize measurements of PRS resources. Based on the predefined prioritization rule, the UE may measure a subset of the plurality of PRS resources, and the UE may skip measuring another subset of the plurality of PRS resources.

Figure 9:
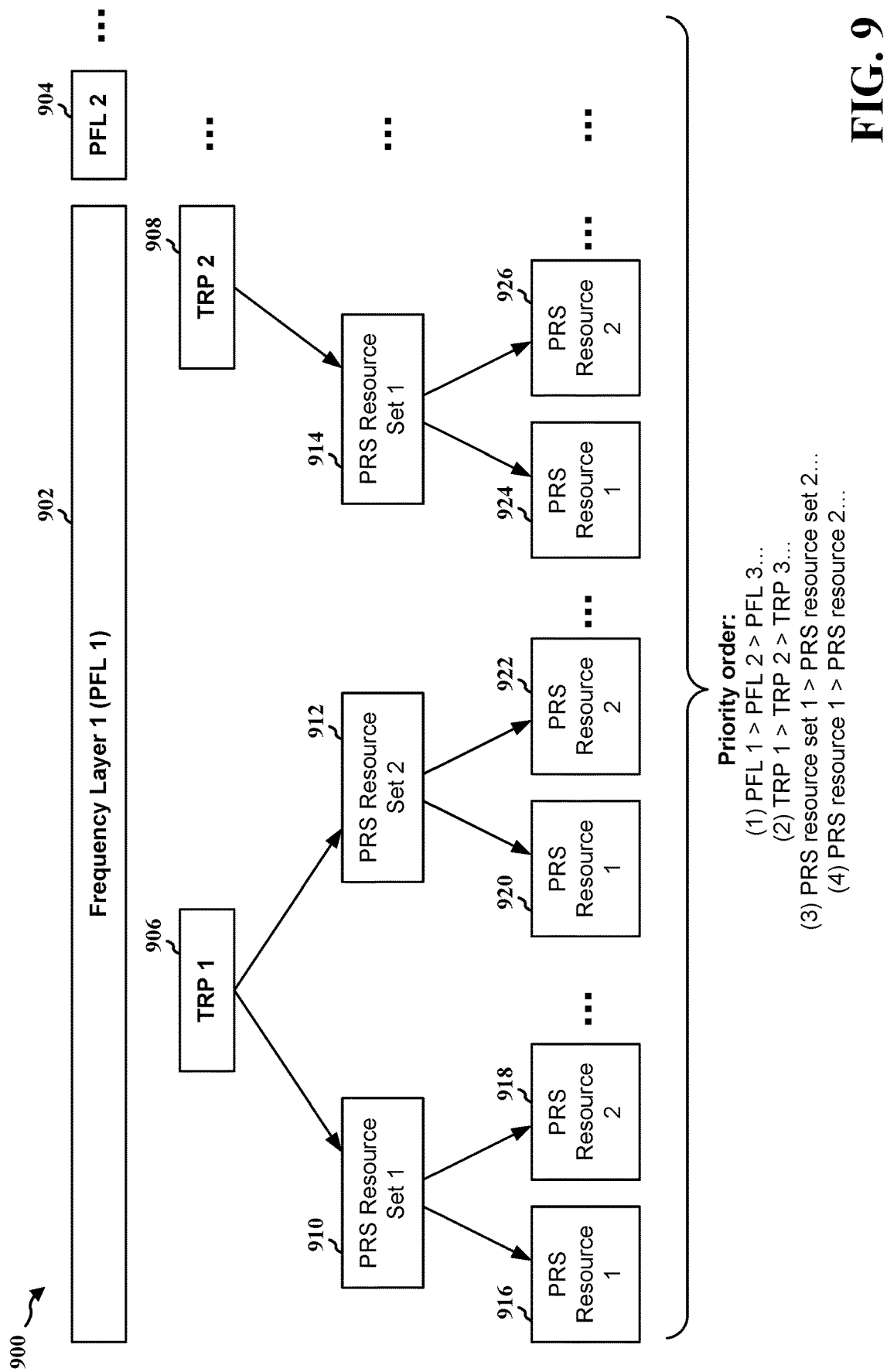
FIG. 9 is a diagram illustrating an example DL-positioning reference signal (PRS) (DL-PRS) resource prioritization in accordance with various aspects of the present disclosure.

FIG. 9 is a diagram 900 illustrating an example DL PRS resource prioritization in accordance with various aspects of the present disclosure. A UE may be configured with a number of PRS resources in an assistance data of a positioning session, where the number of PRSs resources to be process by the UE may be beyond the processing capability of the UE. In one example, the UE may assume the DL PRS resources in the assistance data are sorted in a decreasing order of measurement priority. For example, if the UE is configured to receive or measure the DL PRS resources via multiple frequency layers (e.g., PFLs), where each PFL may include PRS resources transmitted from multiple TRPs in, the UE may measure the DL PRS resources based on the priority associated with the multiple frequency layers (e.g., from a first frequency layer to a last frequency layer), based on the priority associated with the TRPs in each PFL (e.g., from a first TRP to a last TRP in a PFL), based on the priority associated with the RPS resource sets associated with each TRP (e.g., from a first PRS resource set to a last PRS resource set in a TRP), and based on the priority associated with the RPS resources within each PRS resource set (e.g., from a first PRS resource to a last PRS resource in a resource set), etc.

For example, as shown by the diagram 900, the UE may be configured to receive DL PRSs from a first frequency layer 902 (PFL 1) and a second frequency layer 904 (PFL 2). The first frequency layer 902 may include DL PRSs transmitted from a first TRP 906 and a second TRP 908, where the first TRP 906 may transmit PRSs using a first PRS resource 916 and a second PRS resource 918 in a first PRS resource set 910, and using a first PRS resource 920 and a second PRS resource 922 in a second PRS resource set 912, and the second TRP 908 may transmit PRSs using a first PRS resource 924 and a second PRS resource 926 in a first PRS resource set 914. Similarly, the UE may also receive DL PRSs from the second frequency layer 904 via multiple TRPs, PRS resource sets, and/or PRS resources.

In one example, if the UE does not have the capability to process all the configured PRS resources, the UE may be configured to receive or measure the PRSs received from the first frequency layer 902 first before processing PRSs in the second frequency layer 904. Similarly, if there are also a third frequency layer (PFL 3) and a fourth frequency layer (PFL 4), the UE may be configured to receive or measure the PRSs received from the first frequency layer 902 first, then the PRSs received from the second frequency layer 904, then the PRSs received from the third frequency layer, and then the PRSs received from the fourth frequency layer (e.g., PRSs are processed/measured based on PFL 1>PFL 2>PFL 3>PFL 4). If the UE does not have the capability to process/measure PRSs in a frequency layer, the UE may skip measuring the PRSs in that frequency layer. For example, if the UE is configured to receive the PRSs via the first frequency layer 902 and the second frequency layer 904 but the UE is just able to process/measure PRSs in the first frequency layer 902, the UE may skip PRS measurements for the second frequency layer 904.

Similarly, within a frequency layer, if the UE does not have the capability to process all the PRSs in the frequency layer, the UE may prioritize its PRS measurements based on the priorities associated with the TRPs. For example, the UE may be configured to receive or measure the PRSs received from the first TRP 906 before processing PRSs from the second TRP 908. Similarly, if there are also a third TRP (TRP 3) and a fourth TRP (TRP 4), the UE may be configured to receive or measure the PRSs received from the first TRP 906, then receive or measure the PRSs from the second TRP 908, then receive or measure the PRSs from the third TRP, and then receive or measure the PRSs from the fourth TRP (e.g., PRSs are processed/measured based on TRP 1>TRP 2>TRP 3>TRP 4 with a frequency layer). If the UE does not have the capability to process/measure PRSs from a TRP, the UE may skip measuring the PRSs in that TRP. For example, if the UE is configured to receive the PRSs via the first TRP 906 and the second TRP 908 via the first frequency layer 902 but the UE is just able to process/measure PRSs in the first TRP 906, the UE may skip PRS measurements for the second TRP 908.

Furthermore, within a TRP, if the UE does not have the capability to process all the PRSs in that TRP, the UE may prioritize its PRS measurements based on the priorities associated with the PRS resource sets. For example, the UE may be configured to receive or measure the PRSs received from the first PRS resource set 910 first before processing PRSs from the second PRS resource set 912. Similarly, if there are also a third PRS resource set (PRS resource set 3) and a fourth PRS resource set (PRS resource set 4), the UE may be configured to receive or measure the PRSs received from the first PRS resource set 910 first, then the PRSs received from the second PRS resource set 912, then the PRSs received from the third PRS resource set, and then the PRSs received from the fourth PRS resource set (e.g., PRSs are processed/measured based on PRS resource set 1>PRS resource set 2>PRS resource set 3>PRS resource set 4 with a TRP). If the UE does not have the capability to process/measure PRSs in a PRS resource set, the UE may skip measuring the PRSs in that PRS resource set. For example, if the UE is configured to receive the PRSs via the first PRS resource set 910 and the second PRS resource set 912 from the first TRP 906 but the UE is just able to process/measure PRSs in the first PRS resource set 910, the UE may skip PRS measurements for the second PRS resource set 912.

Lastly, within a PRS resource set, if the UE does not have the capability to process all the PRSs in that PRS resource set, the UE may prioritize its PRS measurements based on the priorities associated with the PRS resources. For example, the UE may be configured to receive or measure the PRSs received from the first PRS resource 916 first before processing PRSs from the second PRS resource 918. Similarly, if there are also a third PRS resource (PRS resource 3) and a fourth PRS resource (PRS resource 4), the UE may be configured to receive or measure the PRSs received from the first PRS resource 916 first, then the PRSs received from the second PRS resource 918, then the PRSs received from the third PRS resource, and then the PRSs received from the fourth PRS resource (e.g., PRSs are processed/measured based on PRS resource 1>PRS resource 2>PRS resource 3>PRS resource 4 with a PRS resource set). If the UE does not have the capability to process/measure PRSs in a PRS resource, the UE may skip measuring the PRSs in that PRS resource. For example, if the UE is configured to receive the PRSs via the first PRS resource 916 and the second PRS resource 918 of the first PRS resource set 910 but the UE is just able to process/measure PRSs in the first PRS resource 916, the UE may skip PRS measurements for the second PRS resource 918.

As such, if a UE is configured with multiple PRS resources via multiple frequency layers, multiple TRPs, multiple PRS resource sets, and/or multiple PRS resources, the UE may sort the frequency layers (e.g., may be up to four frequency layers) according to a priority, sort the TRPs per frequency layer (e.g., may be up to sixty four (64) TRPs per frequency layer) also according to a priority, sort the PRS resource sets per TRP (e.g., may be up to two resource sets per TRP) according to a priority, and/or sort the PRS resource per PRS resource set (e.g., may be up to sixty four (64) PRS resources per PRS resource set). In other words, within a positioning frequency layer, the DL PRS resources may be sorted in the decreasing order of priority for measurement to be performed by the UE, with the reference indicated by nr-DL-PRS-ReferenceInfo being the highest priority for measurement, and the following priority is assumed: (1) up to 64 dl-PRS-IDs of the frequency layer are sorted according to priority; and (2) up to 2 DL PRS resource sets per dl-PRS-ID of the frequency layer are sorted according to priority.

Figures 10A, 10B:
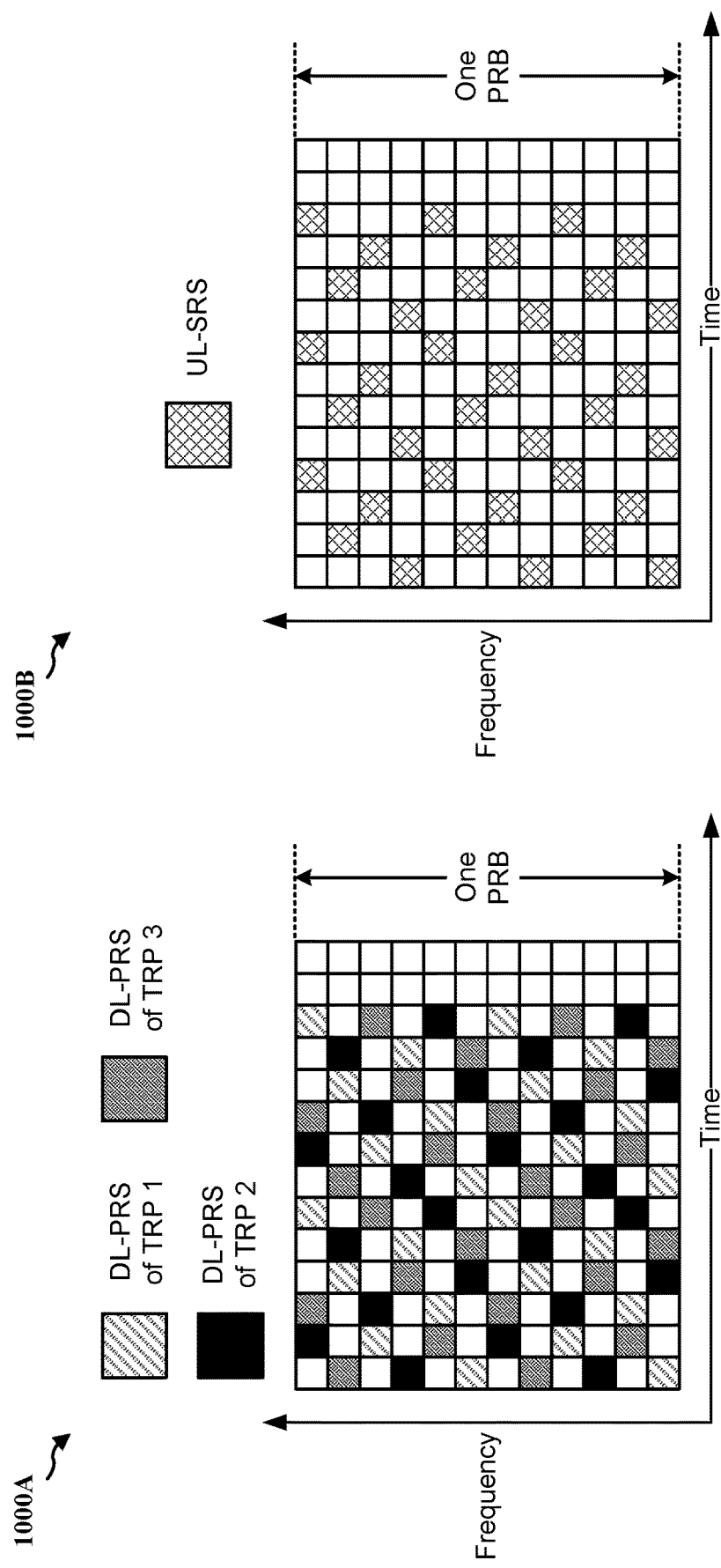
FIG. 10A is a diagram illustrating an example of DL-PRS transmitted from multiple TRPs in accordance with various aspects of the present disclosure.
FIG. 10B is a diagram illustrating an example of UL-sounding reference signal (SRS) (UL-SRS) transmitted from a UE in accordance with various aspects of the present disclosure.

FIG. 10A is a diagram 1000A illustrating an example of DL-PRS transmitted from multiple TRPs in accordance with various aspects of the present disclosure. In one example, a serving base station or a location server may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 9. As shown by FIG. 10A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 1000A shows an example of a comb-6 DL-PRS configuration, where the pattern for the DL-PRS from different TRPs may be repeated after six (6) symbols.

FIG. 10B is a diagram 1000B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

FIGS. 11A, 11B, 12A, 12B, 13A, 13B, 14A, and 14B, are diagrams 1100A, 1100B, 1200A, 1200B, 1300A, 1300B, 1400A, and 1400B, respectively, illustrating example patterns of DL-PRS resource within a slot in accordance with various aspect of the present disclosure. A DL-PRS resource may spans within a slot 2, 4, 6, or 12 consecutive symbols with a fully frequency-domain staggered pattern. The DL-PRS resource may be configured in a high layer configured DL or FL symbol of a slot. In addition, all REs of a given DL-PRS resource may have a constant energy per resource element (EPRE).

Figures 11A, 11B:
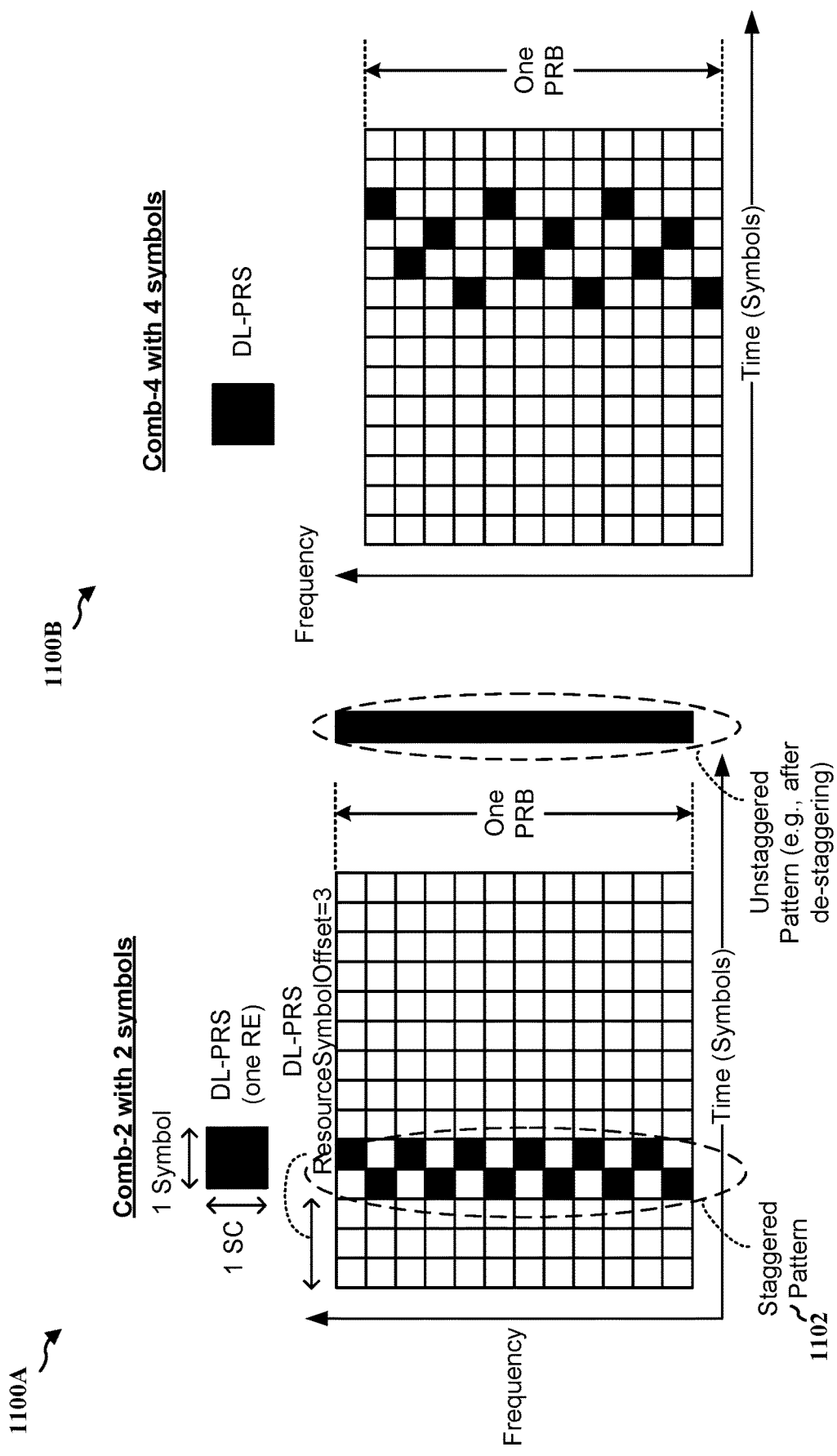
FIG. 11A is a diagram illustrating an example pattern of DL-PRS resource within a slot in accordance with various aspect of the present disclosure.
FIG. 11B is a diagram illustrating an example pattern of DL-PRS resource within a slot in accordance with various aspect of the present disclosure.

The patterns illustrated by the diagrams 1100A, 1100B, 1200A, 1200B, 1300A, 1300B, 1400A, and 1400B may be referred to as "staggered pattern" or a "frequency-domain staggered pattern," where the resource elements on which the DL-PRS are transmitted may be staggered in the frequency domain of a given bandwidth such that these resource elements are not adjacent to each other in two consecutive resource elements on the given bandwidth. In addition, while the resource elements on which the DL-PRS are transmitted may be staggered over multiple symbols, the resource elements may occupy the whole bandwidth if they are de-staggered. For example, diagram 1100A of FIG. 11A illustrates an example DL-PRS resource based on a comb-2 with 2 symbols pattern, where there is one PRS resource element per every two subcarriers in the frequency domain for two occupying symbols, such as shown at 1102. In addition, a set of frequency offsets may be applied to the PRS resource elements in each of the occupying symbols. For example, a frequency offset of {0, 1} may be applied to the comb-2 with 2 symbols pattern, where PRS resource elements on the first occupying symbol may be transmitted with an offset of zero (0) and PRS resource elements on the second occupying symbol may be transmitted with an offset of one (1). As such, the PRS resource elements may also not be adjacent to each other on the time domain. As shown at 1104, while the PRS resource elements may be staggered in a given bandwidth (and also on a given time domain), after a UE receives these PRS resource elements, the UE may still able to receive the full bandwidth of the PRS, which may be referred to as de-staggering a staggered pattern or turning a staggered pattern to an unstaggered pattern.

Figures 12A, 12B:
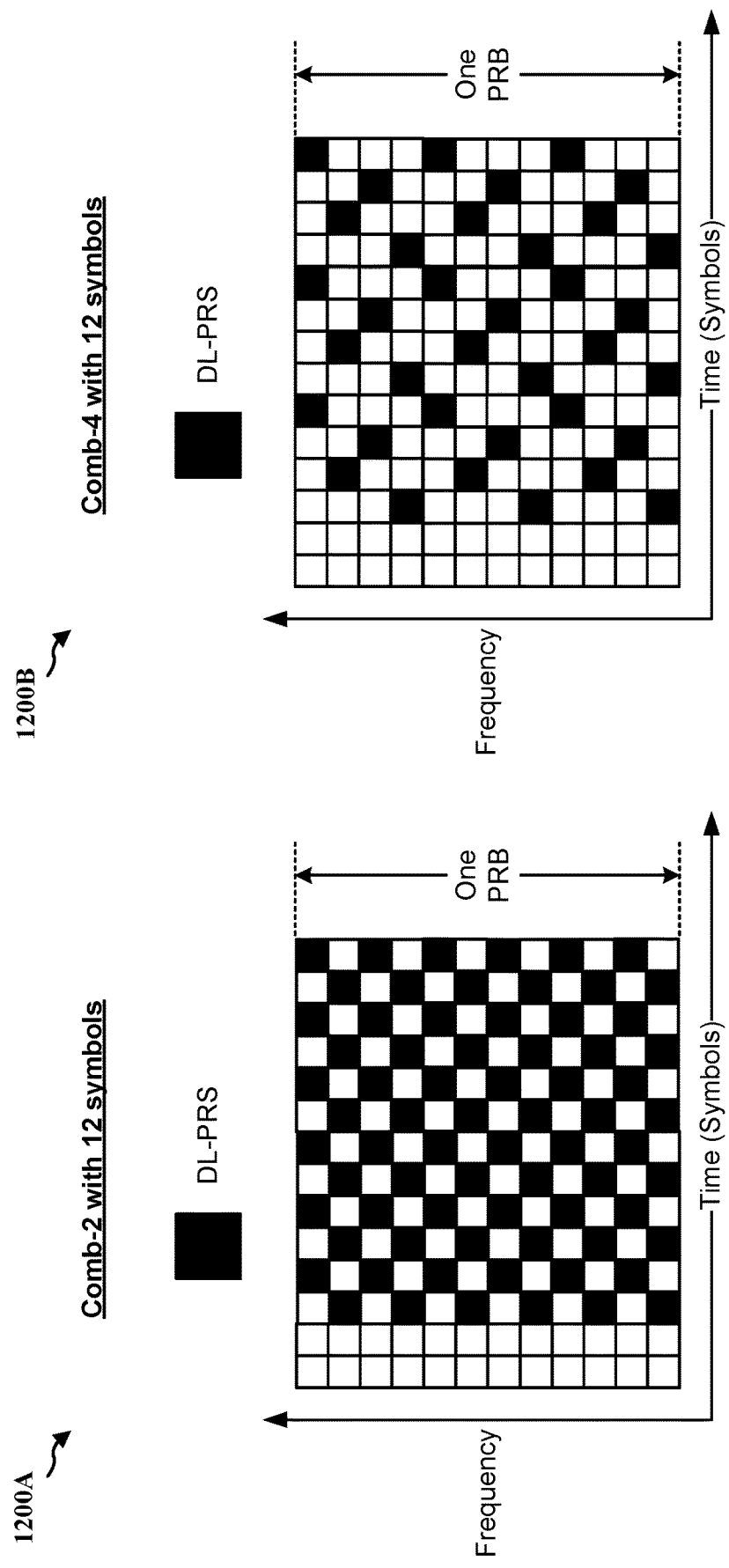
FIG. 12A is a diagram illustrating an example pattern of DL-PRS resource within a slot in accordance with various aspect of the present disclosure.
FIG. 12B is a diagram illustrating an example pattern of DL-PRS resource within a slot in accordance with various aspect of the present disclosure.
Figures 13A, 13B:
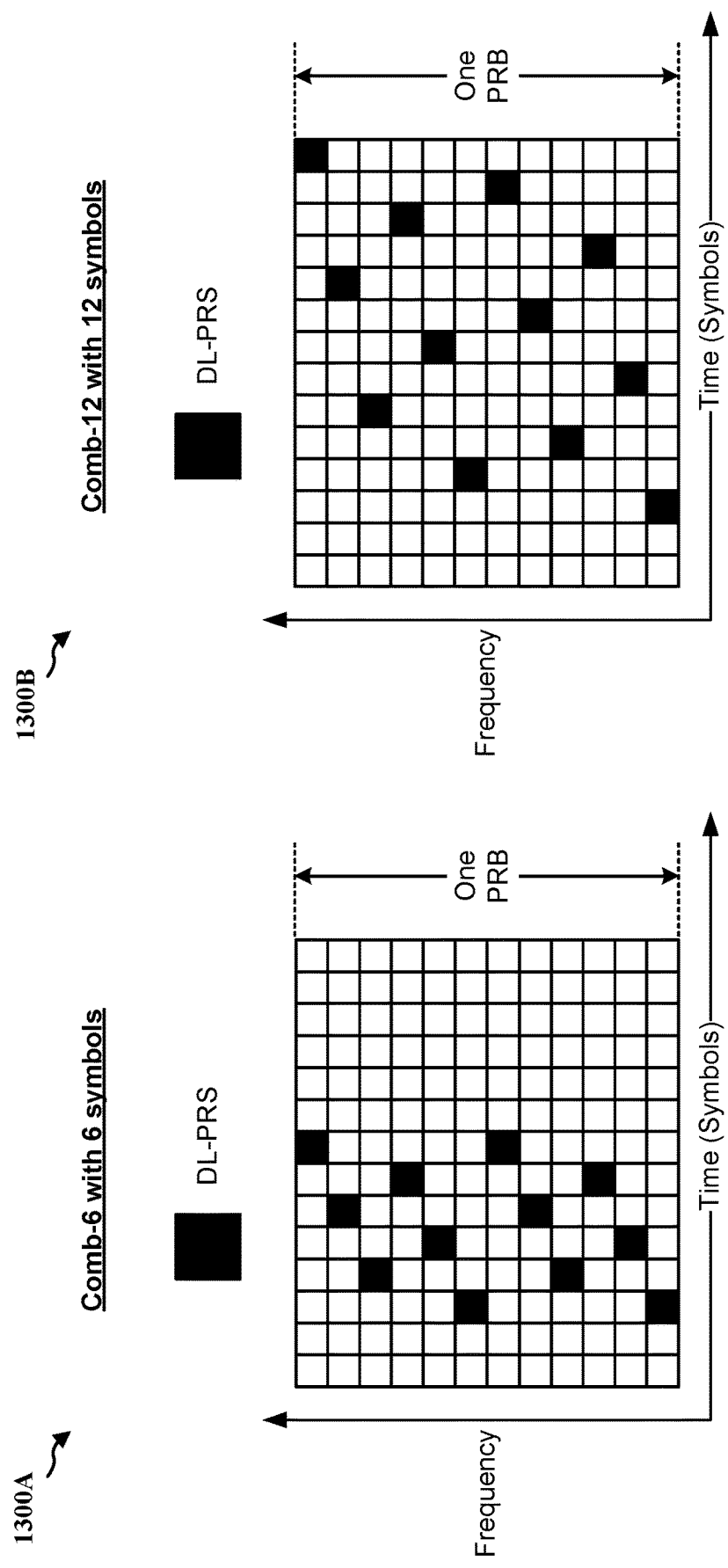
FIG. 13A is a diagram illustrating an example pattern of DL-PRS resource within a slot in accordance with various aspect of the present disclosure.
FIG. 13B is a diagram illustrating an example pattern of DL-PRS resource within a slot in accordance with various aspect of the present disclosure.
Figures 14A, 14B:
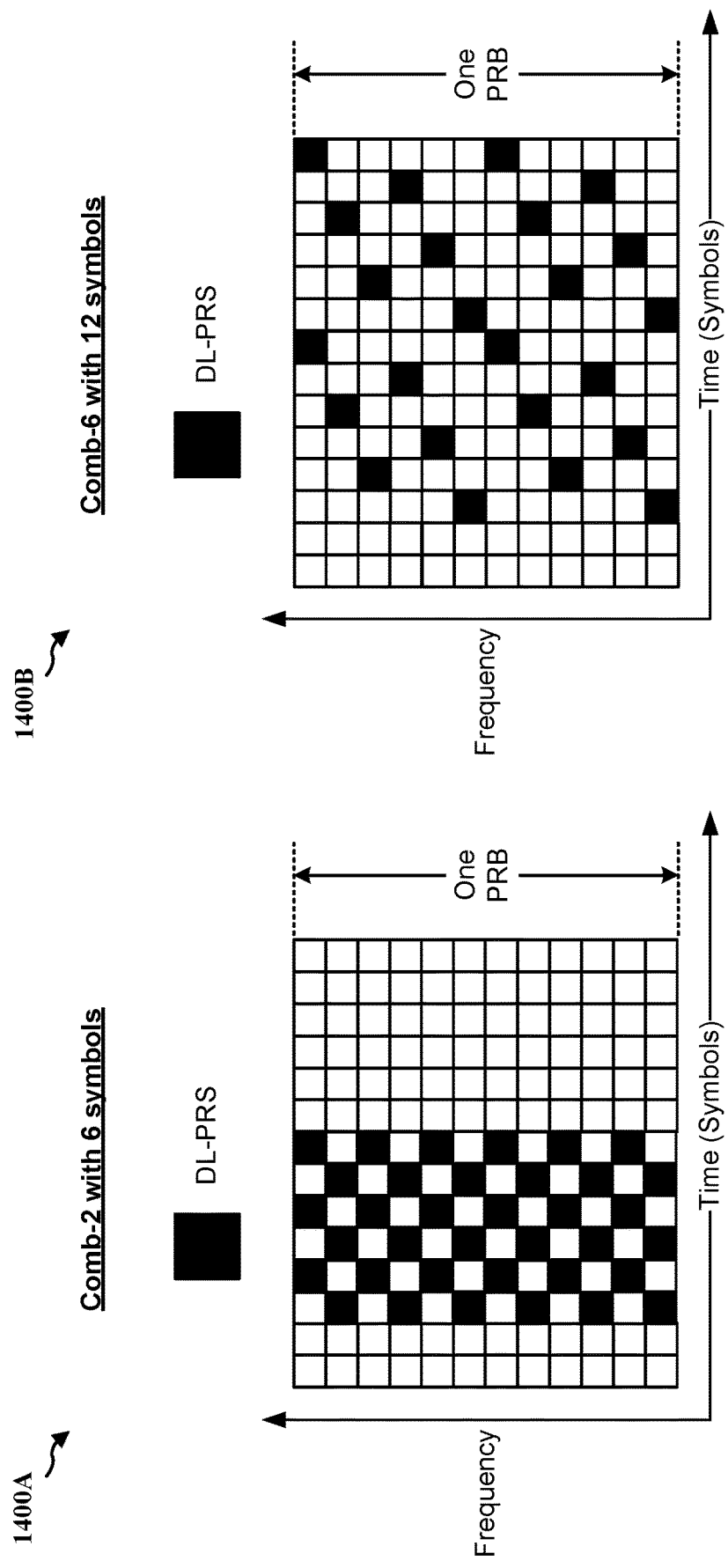
FIG. 14A is a diagram illustrating an example pattern of DL-PRS resource within a slot in accordance with various aspect of the present disclosure.
FIG. 14B is a diagram illustrating an example pattern of DL-PRS resource within a slot in accordance with various aspect of the present disclosure.

Similarly, diagram 1100B of FIG. 11B illustrates an example DL-PRS resource based on a comb-4 with 4 symbols pattern, where there is one PRS resource element per every four subcarriers in the frequency domain for four occupying symbols and the pattern may include a frequency offset of {0, 2, 1, 3}. Diagram 1200A of FIG. 12A illustrates an example DL-PRS resource based on a comb-2 with 12 symbols pattern, where there is one PRS resource element per every two subcarriers in the frequency domain for twelve occupying symbols and the pattern may include a frequency offset of {0, 1, 0, 1, 0, 1, 0, 1, 0, 1, 0, 1}. Diagram 1200B of FIG. 12B illustrates an example DL-PRS resource based on a comb-4 with 12 symbols pattern, where there is one PRS resource element per every four subcarriers in the frequency domain for twelve occupying symbols and the pattern may include a frequency offset of {0, 2, 1, 3, 0, 2, 1, 3, 0, 2, 1, 3}. Diagram 1300A of FIG. 13A illustrates an example DL-PRS resource based on a comb-6 with 6 symbols pattern, where there is one PRS resource element per every six subcarriers in the frequency domain for six occupying symbols and the pattern may include a frequency offset of {0, 3, 1, 4, 2, 5}. Diagram 1300B of FIG. 13B illustrates an example DL-PRS resource based on a comb-12 with 12 symbols pattern, where there is one PRS resource element per every twelve subcarriers in the frequency domain for twelve occupying symbols and the pattern may include a frequency offset of {0, 6, 3, 9, 1, 7, 4, 10, 2, 8, 5, 11}. Diagram 1400A of FIG. 14A illustrates an example DL-PRS resource based on a comb-2 with 6 symbols pattern, where there is one PRS resource element per every two subcarriers in the frequency domain for six occupying symbols and the pattern may include a frequency offset of {0, 1, 0, 1, 0, 1}. Diagram 1400B of FIG. 14B illustrates an example DL-PRS resource based on a comb-6 with 12 symbols pattern, where there is one PRS resource element per every six subcarriers in the frequency domain for twelve occupying symbols and the pattern may include a frequency offset of {0, 3, 1, 4, 2, 5, 0, 3, 1, 4, 2, 5}.

Figure 15:
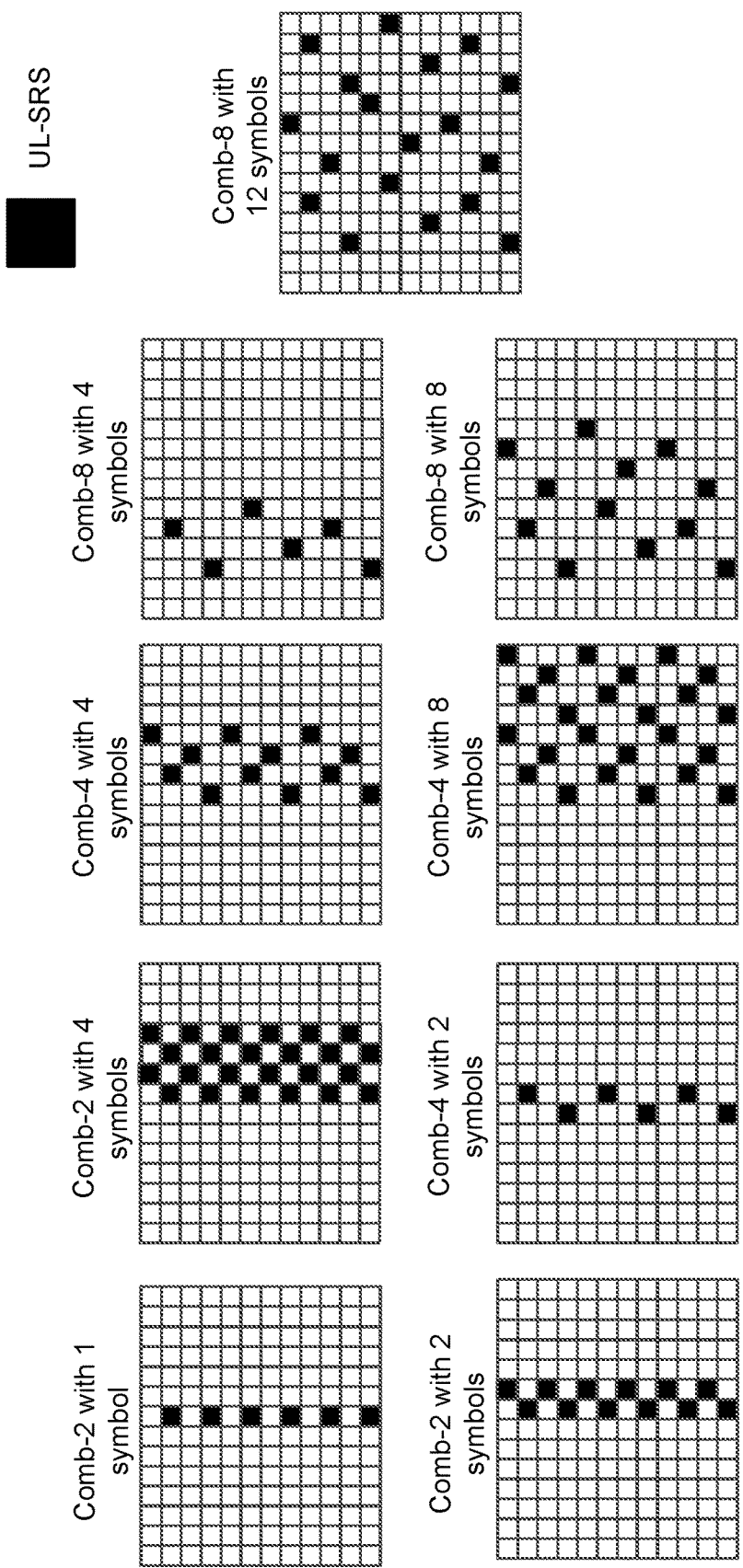
FIG. 15 is a diagram illustrating example patterns of UL-SRS resource within a slot in accordance with various aspect of the present disclosure.

The staggering pattern may also apply to the UL-SRS. For example, FIG. 15 is a diagram 1500 illustrating example patterns of UL-SRS resource within a slot in accordance with various aspect of the present disclosure. The following may be the frequency offsets from symbol to symbol for comb sizes 2, 4, and 8 over 1, 2, 4, 8, and 12 symbols. 1-symbol comb-2: {0}; 2-symbol comb-2: {0, 1}; 2-symbol comb-2: {0, 1}; 4-symbol comb-2: {0, 1, 0, 1}; 2-symbol comb-4: {0, 2}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}, etc.

As shown by FIGS. 11A, 11B, 12A, 12B, 13A, 13B, 14A, 14B, and 15, in some examples, both DL-RPS and UL-SRS for positioning may include specific resource elements mapping patterns. For the comb pattern in the frequency domain, power may be boosted per resource element for higher positioning coverage/range, and the comb size (e.g., the density of REs) may be configurable, e.g., Comb-2, Comb-4, Comb-6, and Comb-12, etc. The staggered comb offset may apply across symbols, such that after de-staggering, the energy of multiple symbols may be combined for higher coverage/range. In some examples, after de-staggering, the combined symbols may also become a comb-1, such as shown by 1104 of FIG. 11A, which may provide a higher positioning range (e.g., by avoiding spatial aliasing).

As described in connection with FIGS. 5, 6A and 6B, AI/ML positioning (direct and assisted) based on DL reference signal may specify measuring channel between a target (e.g., the UE 502) and one or more network/RAN node(s) (e.g., the base station 506, gNB/TRPs, etc.), which may be enabled through sending a reference signal (e.g., PRS, SSB, CSI-RS, etc.) and measuring it at a data collection/inference entity (e.g., a UE, a positioning reference unit (PRU), etc.). Examples of DL reference signal measurements for AI/ML positioning model input may include channel impulse response (CIR), channel frequency response (CFR), received signal strength indicator (RSSI), reference signal received power (RSRP), reference signal received path power (RSRPP), reference signal received quality (RSRQ), time of arrival (TOA), reference signal time difference (RSTD), and/or angle of departure (AoD), etc.

For network node assisted positioning with LMF-side model described in connection with FIG. 6B, an LMF (e.g., the location server 504) may be configured to run a direct AI/ML positioning model with UE-assistance in which a UE (e.g., the UE 502) may be configured to provide AI/ML model input(s). In some scenarios, this configuration has been shown to produce excellent performance when the AI/ML model input(s) are based on CIR/CFR measurements of DL reference signals, such as PRSs. However, most/current network implementations (e.g., LTE Positioning Protocol (LPP) or LPP A (LPPa)) do not support/enable a UE to report complex I/Q samples (e.g., for CIR and/or CFR) as this may specify a very high over-the-air (OTA) reporting overhead. As an example, for 100 MHz with 30 KHz subcarrier spacing, a UE may specify reporting N complex values for one PRS resource where N corresponds to the number of subcarriers (e.g., approximately 3300 complex values in this example). This reporting overhead may be scaled linearly when the UE is configured to report additional PRS resources (e.g., approximately 6600 complex values for two PRS resources, approximately 9900 complex values for three PRS resources, etc.). As such, reporting CIR/CFR measurements for AI/ML positioning may consume a very high resource overhead.

Aspects presented herein may improve the efficiency and performance of AI/ML positioning by reducing the reporting overhead for DL reference signal measurements, such as positioning reference signals (PRS) measurements. For example, aspects presented herein may enable a UE to compress the reporting of CIR/CFR measurements using one or more compressing methods, where the compressed CIR/CFR measurement reporting may still be used by an AI/ML model to perform AI/ML inference and/or to be trained effectively and accurately. In other words, although reporting the whole CIR/CFR measurements for an AI/ML model (e.g., an LMF-sided AI/ML model) may be inefficient due to high OTA reporting overhead, one or more compression methods may be implemented at a UE for efficient reporting of CIR/CFR to an LMF, especially when the UE is configured to report multiple PRS resources.

In one aspect, a UE may be configured, by an LMF or a location server, to run at least one compression method (e.g., as part of assistance data (AD) exchange procedure, location information procedure, and/or positioning broadcast procedure, etc.). For example, let $\tilde{s}=\{\tilde{s}_i\}_{i=1}^{NM}$ be the received PRS resource (including unused subcarriers) before applying channel estimation (e.g., $\tilde{s}$ may correspond to a set of tones representing the PRS), where M is a number of OFDM symbols (note: depending on the PRS comb structure, M may be 2, 4, 6, or 12 symbols as described in connection with FIGS. 11A, 11B, 12A, 12B, 13A, 13B, 14A, and 14B, etc.). Also, let $\hat{s}=\{\hat{s}_i\}_{i=1}^{N}$ be the channel frequency response of one PRS resource, where N is a number of complex I/Q samples corresponding to subcarriers of the PRS resource. In some configurations, the UE may be configured to report multiple PRS resources that are part of different resource sets and physical frequency layers (PFLs) as described in connection with FIG. 9. As such, the UE may be specified to report up to $L_{PRS}L_{set}L_{PFL}$ PRS resources, where $L_{PRS}$ is the number of PRS resources per set, $L_{set}$ is the number of resource sets, and $L_{PFL}$ is the number of PFLs. Then, let the UE computes/measures the CIR r. e.g., by applying $N_{ifft}$-sized inverse discrete Fourier transform to the CFR (e.g., $\hat{s} \rightarrow r = ifft(\hat{s})$).

In one aspect of the present disclosure, a UE may be configured to report a sparse representation of $\hat{s}$ or $\tilde{s}$ (e.g., $\hat{s}$ being the CFR of one PRS resource and $\tilde{s}$ being the received PRS resource before applying channel estimation, etc.), where the UE may consider/apply a sparse pattern of estimated PRS resource. For example, the UE may be configured to report every kth subcarrier of occupied subcarrier in $\hat{s}$. In some examples, the UE may also be configured to report sparse representation of unoccupied subcarriers in $\tilde{s}$ (if any). For example, the UE may be configured to report every qth unoccupied subcarrier in $\tilde{s}$ (if available). This reporting may be used by an LMF to estimate the SNR (of a channel between the UE and a base station) and utilize it as an additional input for AI/ML learning/training/inferring. Sampling parameters k and q may be configured by the LMF or pre-configured at the UE.

Figure 16:
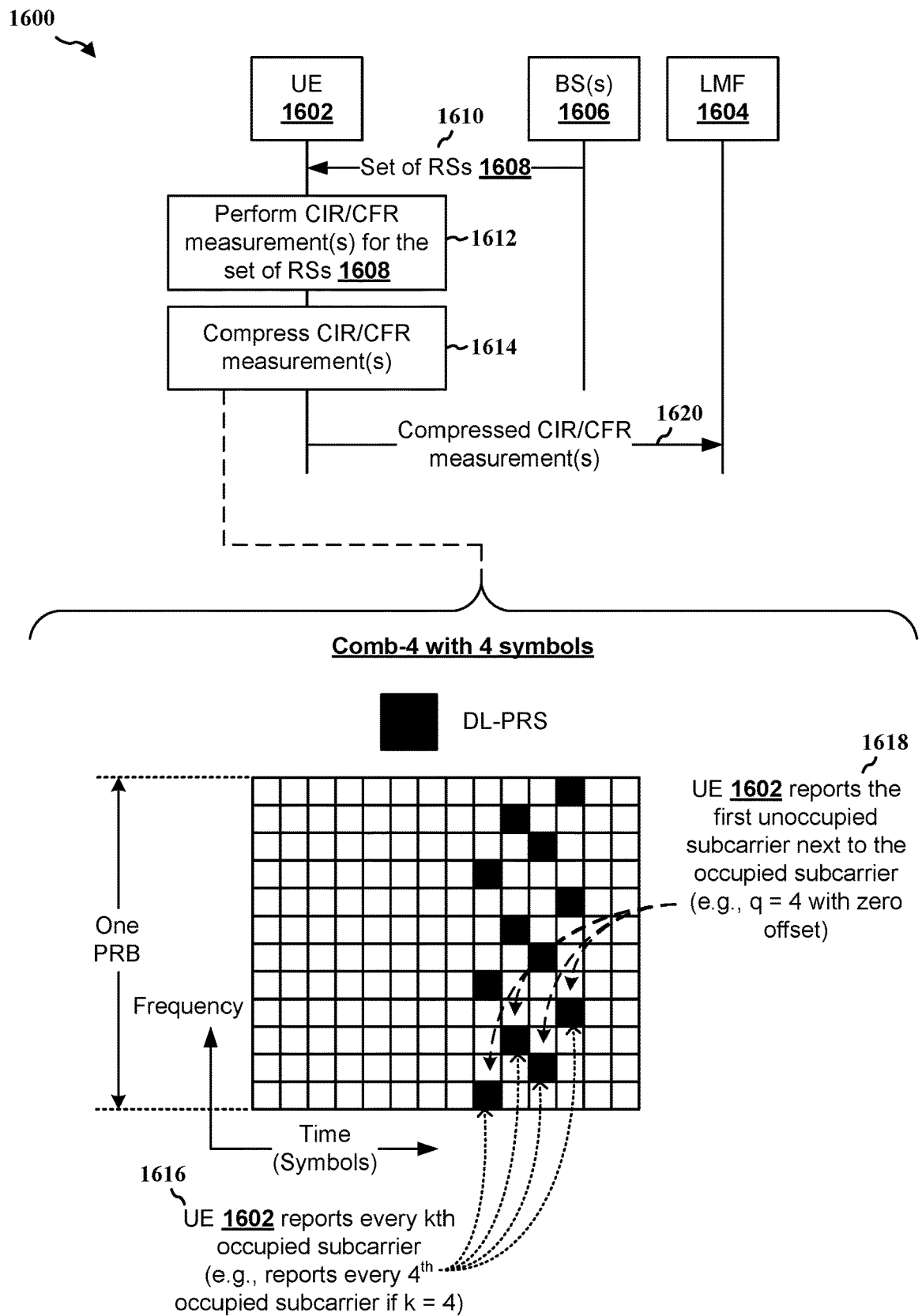
FIG. 16 is a diagram illustrating an example of a UE compressing a set of channel impulse response (CIR)/channel frequency response (CFR) measurements by reporting a sparse representation of $\hat{s}$ or $\tilde{s}$ ($\hat{s}$ being the CFR of one PRS resource and $\tilde{s}$ being the received PRS resource before applying channel estimation, etc.) in accordance with various aspects of the present disclosure.

FIG. 16 is a diagram 1600 illustrating an example of a UE compressing a set of CIR/CFR measurements by reporting a sparse representation of r, $\hat{s}$, or $\tilde{s}$ ($\hat{s}$ being the CFR of one PRS resource and $\tilde{s}$ being the received PRS resource before applying channel estimation, etc.) in accordance with various aspects of the present disclosure. The numberings associated with the communication diagram 1600 do not specify a particular temporal order and are merely used as references for the diagram 1600. For purposes of the present disclosure, CIR/CFR measurement(s) performed by a UE based on measurement(s) of PRS may be referred to as PRS-based CIR/CFR measurement(s), whereas CIR/CFR measurement(s) performed by a network node, such as a base station/TRP based on measurement(s) of SRS may be referred to as SRS-based CIR/CFR measurement(s).

As shown at 1610, a UE 1602 may receive a set of reference signals (RSs) 1608 (e.g., DL RSs, PRSs, etc.) from one or more base stations 1606 (e.g., which may be referred to as network node(s)). Then, as shown at 1612, the UE 1602 may perform channel impulse response (CIR) measurement(s) and/or channel frequency response (CFR) measurement(s) for the set of RSs 1608, such as described in connection with FIGS. 5, 6A, and 6B.

At 1614, the UE 1602 may compress the CIR/CFR measurement(s) for the set of RSs 1608 by reporting a sparse representation of CIR/CFR measurement(s) (e.g., r/$\hat{s}$/$\tilde{s}$), where the UE 1602 may be configured to report every kth subcarrier of occupied subcarrier in $\hat{s}$. For example, as shown at 1616, the UE 1602 may be configured to report every $4^{th}$ subcarrier of occupied subcarrier in $\hat{s}$. In some examples, as shown at 1618, the UE 1602 may also be configured to report sparse representation of unoccupied subcarriers in $\tilde{s}$ (if any), where this reporting may be used by an LMF 1604 to estimate the SNR (of the channel between the UE 1602 and the one or more base stations 1606) and utilize it as an additional input for AI/ML learning/training/inferring. For example, the UE 1602 may be configured to report the first unoccupied subcarrier next to the occupied subcarrier (e.g., q=4 with zero offset). In some examples, sampling parameters k and q may be configured by the LMF 1604 or pre-configured at the UE 1602. In other words, the UE 1602 may receive the configuration for compressing the CIR/CFR measurement(s) from the LMF 1604.

At 1620, based on the compressing method applied, the UE 1602 may report the compressed CIR/CFR measurement(s) to the LMF 1604. In some examples, the compressed CIR/CFR measurement(s) may include: an absolute value of the compressed CIR/CFR measurement(s), a complex value of the compressed CIR/CFR measurement(s), and/or timing/frequency indication of compressed CIR/CFR measurements. As such, the reporting overhead for the CIR/CFR measurement(s) may be greatly reduced. For example, if k=4 (e.g., the UE 1602 reports every $4^{th}$ subcarrier of occupied subcarrier in ŝ), the reporting overhead for the CIR/CFR measurement(s) may be reduced by approximately 75%.

In another aspect of the present disclosure, a UE may be configured to report $N'<N_{ifft}$ samples of CIR r, where N' samples may correspond to the strongest power samples, or N' samples may be selected based on:

(1) first N' contiguous samples in r for which the first sample has a magnitude exceeding a threshold η (the threshold may be set in dB value with respect to the maximum of CIR), (2) the UE find the sample whose magnitude is the maximum in r and reports $N'_1$ contiguous samples before the maximum sample and $N'_2$ contiguous samples after the maximum sample (including the maximum), where $N'_1+N'_2=N'$, and/or (3) the UE may report the first N' peaks in r.

Similarly, parameters N', $N'_1$, $N'_2$, $N_{ifft}$ and η may be configured by the LMF or pre-configured at the UE.

Figure 17:
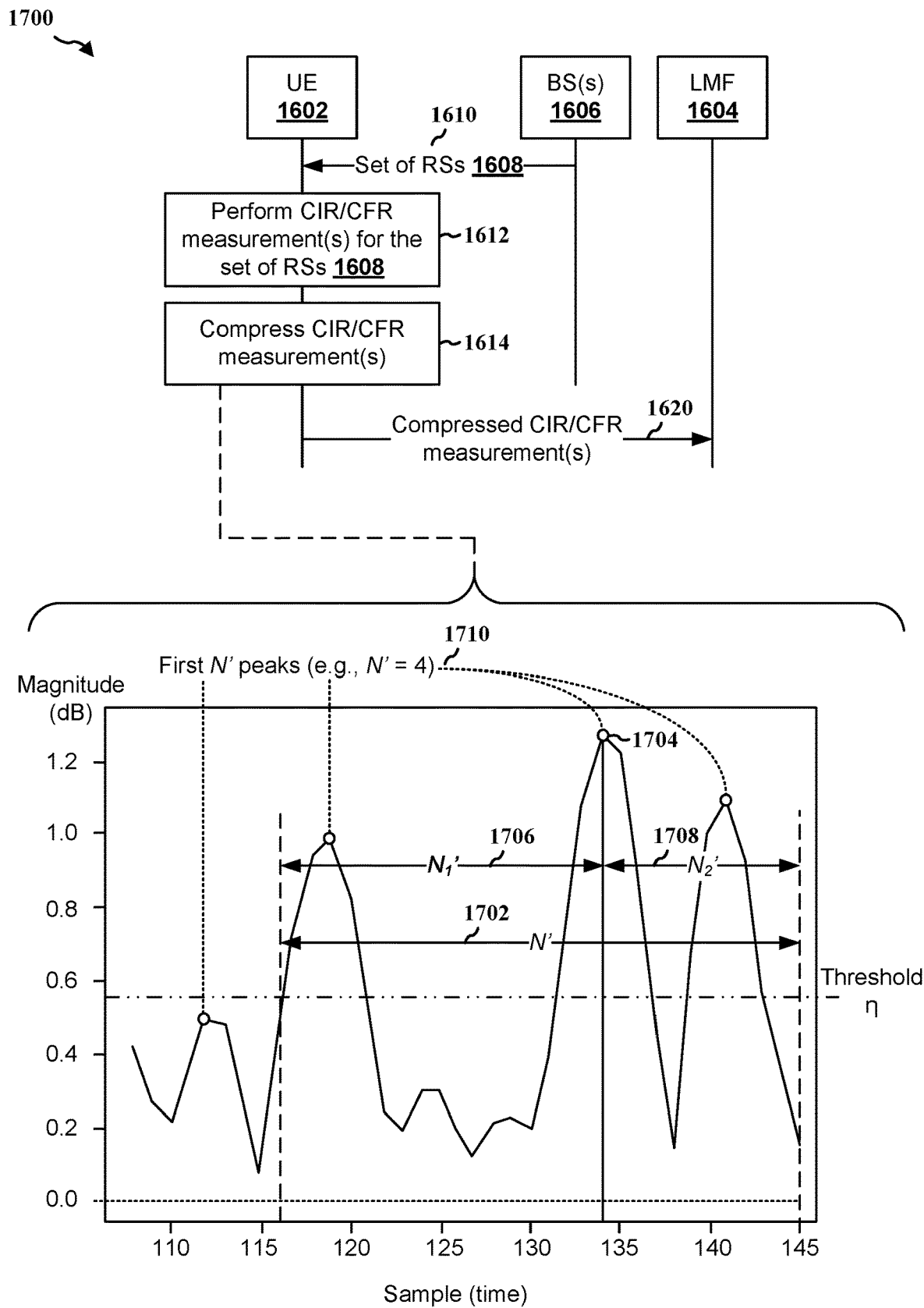
FIG. 17 is a diagram illustrating an example of a UE compressing a set of CIR/CFR measurements by reporting N' samples of CIR r, where N' is smaller than $N_{ifft}$ and is selected based on at least one criterion in accordance with various aspects of the present disclosure.

FIG. 17 is a diagram 1700 illustrating an example of a UE compressing a set of CIR/CFR measurements by reporting N' samples of CIR r, where N' is smaller than $N_{ifft}$ and is selected based on at least one criterion in accordance with various aspects of the present disclosure. The numberings associated with the communication diagram 1700 do not specify a particular temporal order and are merely used as references for the diagram 1700.

As described in connection with FIGS. 16, at 1610 and 1612, a UE 1602 may receive a set of RSs 1608 (e.g., DL RSs, PRSs, etc.) from one or more base stations 1606. Then, the UE 1602 may perform CIR measurement(s) and/or CFR measurement(s) for the set of RSs 1608, such as described in connection with FIGS. 5, 6A, and 6B.

At 1614, the UE 1602 may compress the CIR/CFR measurement(s) for the set of RSs 1608 by reporting $N'<N_{ifft}$ samples of CIR r. In one example, the N' samples may correspond to the first N' contiguous samples in r for which the first sample has magnitude exceeding a threshold η (the threshold may be set in dB value with respect to the maximum of CIR). For example, as shown at 1702, the UE 1602 may be configured to report thirty (30) contiguous samples (e.g., N'=30) after the first sample with a magnitude exceeding a threshold η. If the threshold η is set to be approximately 0.57 dB and the first sample which has a magnitude exceeding the threshold η is the $116^{th}$ sample, then the UE 1602 may be configured to report samples 116 to 145 to the LMF 1604.

In another example, the UE 1602 may be configured to find the sample whose magnitude is the maximum in r and reports $N'_1$ contiguous samples before the maximum sample and $N'_2$ contiguous samples after the maximum sample (including the maximum), where $N'_1+N'_2=N'$. For example, as shown at 1704, if the sample that has the maximum magnitude is the $134^{th}$ sample, then the UE 1602 may be configured to report $N'_1$ samples before the $134^{th}$ sample (as shown at 1706) and $N'_2$ samples after the $134^{th}$ sample (as shown at 1708) to the LMF 1604. Thus, the total samples reported by the UE 1602 are $N'_1+N'_2=N'$ samples.

In another example, the UE 1602 may be configured to report the first N' peaks in r (e.g., first N' samples that correspond to first N' peaks) or the strongest power N' samples in r. For example, as shown at 1710, if the UE 1602 is configured to report the first four (4) peaks in r and the first four peaks correspond to samples 112, 119, 134, and 141, then the UE 1602 may report samples 112, 119, 134, and 141 to the LMF 1604. As such, approximately 2.8% (4/145) of samples are reported by the UE 1602.

The LMF 1604 may configure one or more of the parameters N', $N'_1$, $N'_2$, $N_{ifft}$ and/or η described in connection with FIG. 17 for the UE 1602, and/or one or more of these parameters may be pre-configured at the UE 1602 (e.g., defined by a specification).

At 1620, based on the compressing method applied, the UE 1602 may report the compressed CIR/CFR measurement(s) to the LMF 1604. In some examples, the compressed CIR/CFR measurement(s) may include: an absolute value of the compressed CIR/CFR measurement(s), a complex value of the compressed CIR/CFR measurement(s), and/or timing/frequency indications of the compressed CIR/CFR measurement(s). As such, the reporting overhead for the CIR/CFR measurement(s) may be greatly reduced.

In another aspect of the present disclosure, to compress the CIR/CFR measurement reporting, the UE 1602 may be configured to report CIR/CFR measurements for the set of RSs 1608 that satisfy at least one pre-defined condition and/or certain characteristic(s) for different resource sets and/or physical frequency layers. For example, the UE 1602 may be configured to report samples having: (1) a signal-to-noise ratio (SNR) above an SNR threshold $\gamma_{snr}$, (2) a reference signal received power (RSRP) above an RSRP threshold $\gamma_{rsrp}$, (3) a delay spread above or below a delay spread threshold $\gamma_{ds}$, and/or (4) a Rician factor above or below a Rician factor threshold $\gamma_K$, etc.

In some examples, these pre-defined condition(s) and/or characteristic(s) may be applied by the UE 1602 in addition to aspects described in connection with FIGS. 16 and 17. For example, the UE 1602 may be configured to report thirty (30) contiguous samples (e.g., N'=30) after the first sample with a magnitude exceeding a threshold η (e.g., as described in connection with 1702 of FIG. 17) and also with SNR above an SNR threshold. Similarly, the LMF 1604 may configure one or more of the SNR threshold $\gamma_{snr}$, the RSRP threshold $\gamma_{rsrp}$, the delay spread threshold $\gamma_{ds}$, and/or the Rician factor threshold $\gamma_K$ for the UE 1602, and/or one or more of these thresholds may be pre-configured at the UE 1602 (e.g., defined by a specification).

In another aspect of the present disclosure, to compress the CIR/CFR measurement reporting, the UE 1602 may be configured to report top L CIR/CFR measurements for the set of RSs 1608 whose radio characteristics are maximum for different resource sets and/or physical frequency layers, where the radio characteristics may include SNR, RSRP, delay spread, and/or Rician factor, etc. For example, the UE 1602 may be configured to report top ten CIR/CFR measurements for the set of RSs 1608 whose SNR are maximum for different resource sets and/or physical frequency layers.

In some examples, this configuration may also be applied by the UE 1602 in addition to aspects described in connection with FIGS. 16 and 17. For example, the UE 1602 may be configured to report thirty (30) contiguous samples (e.g., N'=30) after the first sample with a magnitude exceeding a threshold η (e.g., as described in connection with 1702 of FIG. 17) and also whose SNR are maximum for different resource sets and/or physical frequency layers. The LMF 1604 may configure the parameter L for the UE 1602, and/or the parameter L may be pre-configured at the UE 1602 (e.g., defined by a specification).

In another aspect of the present disclosure, a UE may pass CFR measurement(s) (e.g., CFR ŝ or s̃) and/or CIR measurement(s) (e.g., CIR r) to an AI/ML model (which may or may not be co-located with the UE). In response, the AI/ML model may compress the CIR/CFR measurement(s), such as using aspects described in connection with FIGS. 16 and 17, and the AI/ML may transmit the compressed latent representation of CIR/CFR to an LMF. Such configuration may be suitable for UEs with lower processing capabilities and/or if a standard AI/ML model is used for multiple UEs, etc.

Figure 18:
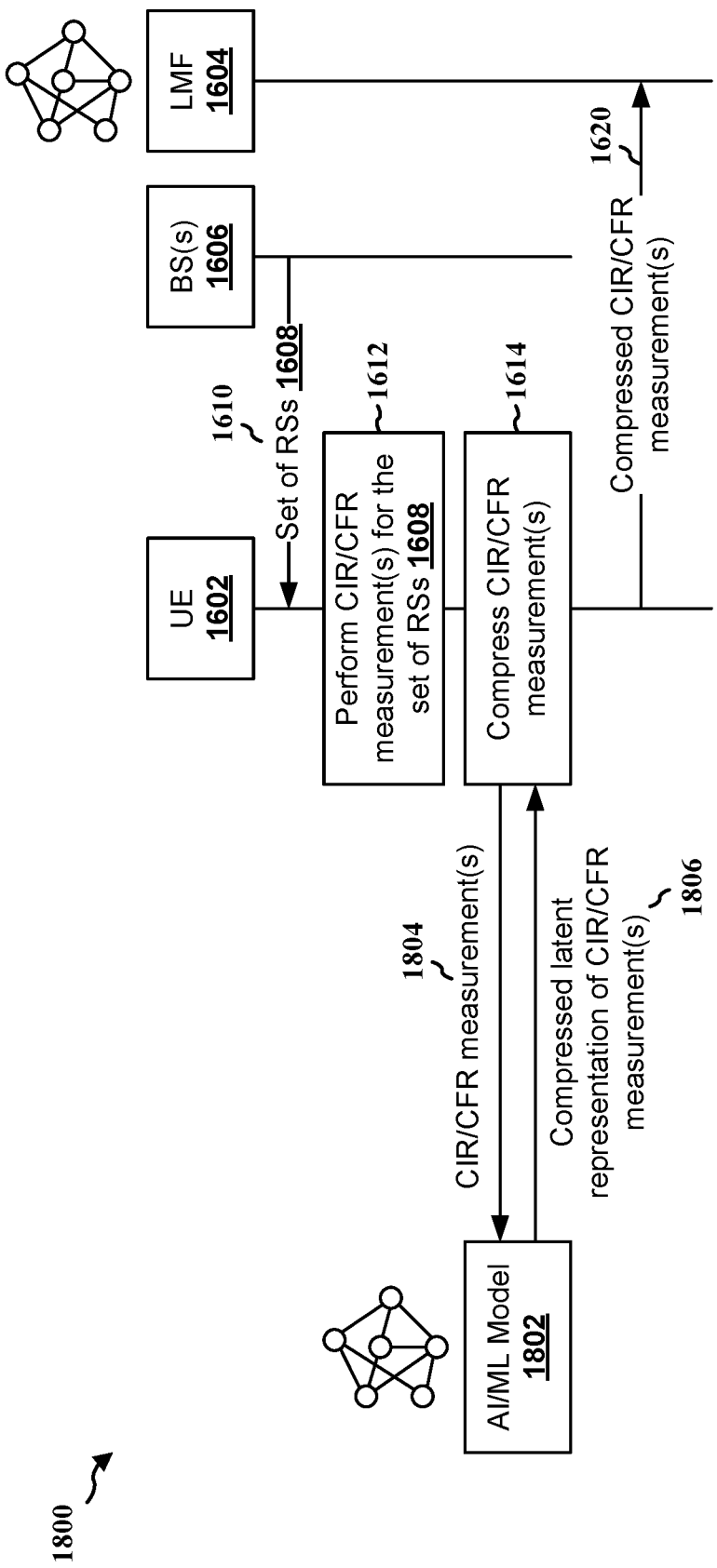
FIG. 18 is a diagram illustrating an example of a UE passing CIR/CFR measurement(s) to an AI/ML model for performing the compression of the CIR/CFR measurement(s) in accordance with various aspects of the present disclosure.

FIG. 18 is a diagram 1800 illustrating an example of a UE passing CIR/CFR measurement(s) to an AI/ML model for performing the compression of the CIR/CFR measurement(s) in accordance with various aspects of the present disclosure. The numberings associated with the communication diagram 1800 do not specify a particular temporal order and are merely used as references for the diagram 1800.

As described in connection with FIGS. 16, at 1610 and 1612, a UE 1602 may receive a set of RSs 1608 (e.g., DL RSs, PRSs, etc.) from one or more base stations 1606. Then, the UE 1602 may perform CIR measurement(s) (e.g., r) and/or CFR measurement(s) (e.g., ŝ or s̃) for the set of RSs 1608, such as described in connection with FIGS. 5, 6A, and 6B.

At 1614, the UE 1602 may compress the CIR/CFR measurement(s) using an AI/ML model 1802. For example, as shown at 1804, the UE 1602 may transmit, input, and/or pass CFR ŝ (or s̃) to the AI/ML model 1802 (e.g., an encoder, a PRS CIR measurements encoder model, etc.) that is capable of producing a compressed latent representation of CFR (which may be denoted by $z_s$ for purposes of the present disclosure), and/or the UE 1602 may transmit, input, and/or pass CIR r to the AI/ML model 1802 (e.g., an encoder, a PRS CFR measurements encoder model, etc.) that is capable of producing a compressed latent representation of CIR (which may be denoted by $z_r$ for purposes of the present disclosure). The AI/ML model 1802 may or may not be located with the UE 1602. For example, if the AI/ML model 1802 is not located with the UE 1602, the UE may transmit the CFR ŝ (or s̃) and/or the CIR r to the AI/ML model 1802 (e.g., via signaling or dedicated message). On the other hand, if the AI/ML model 1802 is located with the UE 1602, the UE may input/pass the CFR ŝ (or s̃) and/or the CIR r to the AI/ML model 1802 (e.g., via internal transmission).

After receiving the CIR/CFR measurement(s), the AI/ML model 1802 may apply one or more compression methods to the CIR/CFR measurement(s), such as described in connection with FIGS. 16 and 17. For example, the AI/ML model 1802 may compress the CIR/CFR measurement(s) by selecting every $K^{th}$ occupied subcarrier for reporting and/or by selecting N'<$N_{ifft}$ samples of CIR r for reporting, where N' samples are selected based on (1) first N' contiguous samples in r for which the first sample has magnitude exceeding a threshold η (the threshold can be set in dB value with respect to the maximum of CIR), (2) the sample whose magnitude is the maximum in r and $N'_1$ contiguous samples before the maximum sample and $N'_2$ contiguous samples after the maximum sample (including the maximum) where $N'_1$+$N'_2$=N', and/or (3) first N' peaks in r, etc. In some examples, the AI/ML model 1802 may also compress the CIR/CFR measurement(s) by selecting CIR/CFR measurement(s) that are above or below an SNR threshold $γ_{snr}$, an RSRP threshold $γ_{rsrp}$, a delay spread threshold $γ_{ds}$, and/or a Rician factor threshold $γ_K$, etc., or by selecting top L CFR/CIR measurement(s), etc. Depending on the implementation, the AI/ML model 1802 may be a standard model, a model provided to the UE 1602 by the LMF 1604, a UE proprietary model (e.g., which may work when the UE's encoder is common across multiple UEs from the same vendor), or a combination thereof.

As shown at 1806, after compressing the CFR/CIR measurement(s), the AI/ML model 1802 may transmit the compressed latent representation of the CIR/CFR measurements (e.g., $z_r$ and/or $z_s$) to the UE 1602. In some examples, the AI/ML model 1802 may be configured to compress multiple CFRs (ŝ or s̃) and/or multiple CIRs (r) from same/different resource set(s) and physical frequency layer(s), and to produce a compressed latent representation of CFR $z_{ss}$ and/or CIR $z_{rr}$. Then, at 1620, the UE 1602 may transmit/forward the compressed CIR/CFR measurements (e.g., $z_r$/$z_{rr}$ and/or $z_s$/$z_{ss}$) to the LMF 1604.

In some configurations, the reported CIR/CFR measurements (e.g., from the UE 1602) and/or the reported compressed CIR/CFR measurements (e.g., from the UE 1602 and/or the AI/ML model 1802) may also be differentially encoded. For example, the UE 1602 and/or the AI/ML model 1802 may be configured to report the value of a maximum element (e.g., 2 dB) and delta values of other elements with respect to the value of the maximum element (e.g., −0.3 dB, +0.7 dB, 0 dB, −0.01 dB, etc.). This may further reduce the reporting overhead for the UE 1602 and/or the AI/ML model 1802.

In another aspect of the present disclosure, an LMF may request a UE or a target to indicate whether it has the capability to report CIR/CFR measurements and request the UE/target to provide a list of supported compression methods (e.g., as discussed above). In response, the UE/target may request a list of supported compression methods to the LMF, and the LMF may provide appropriate/suitable configurations for the compression methods for the UE/target.

Figure 19:
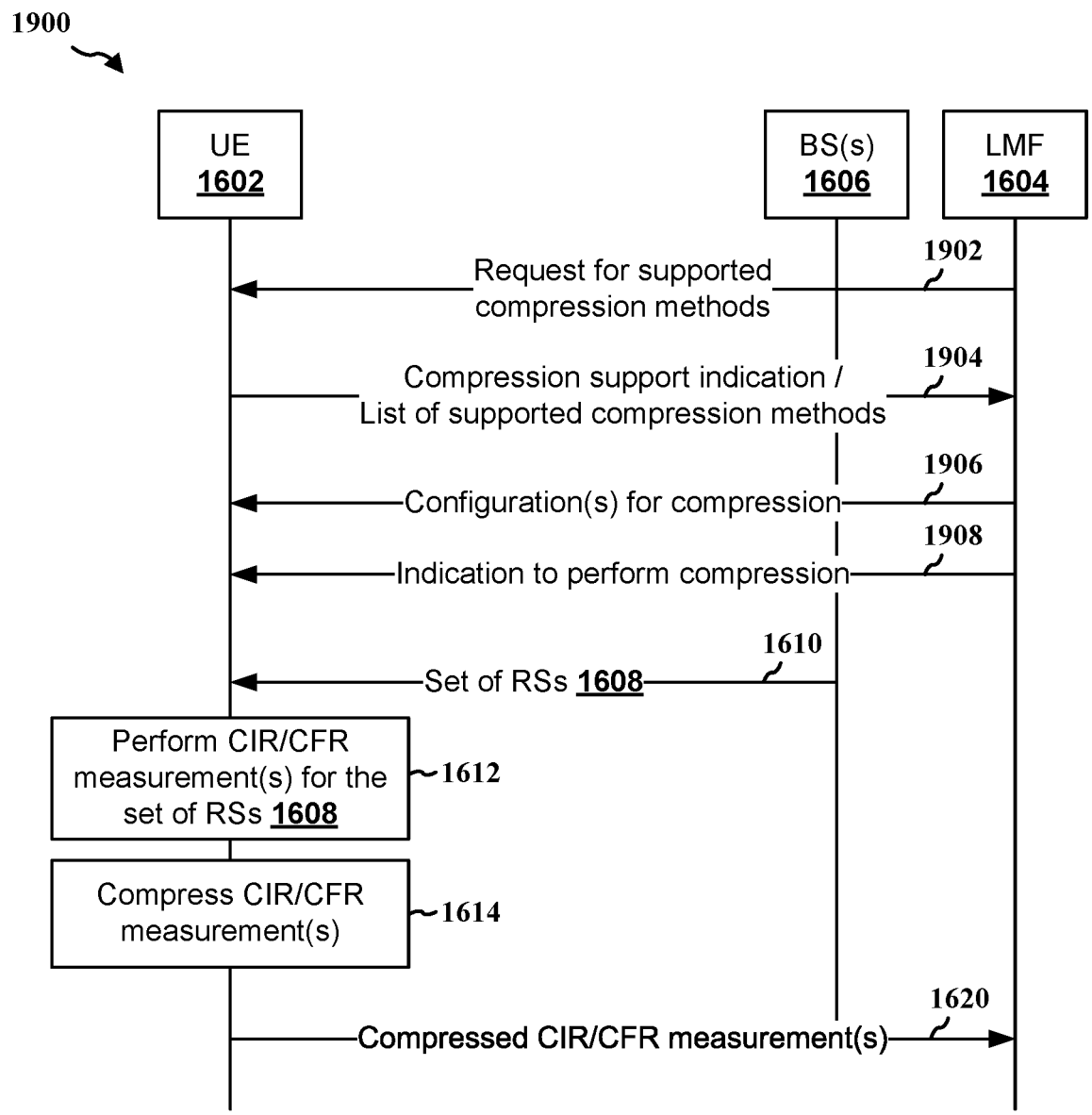
FIG. 19 is a diagram illustrating an example of an LMF requesting a UE to provide a list of supported compression method in accordance with various aspects of the present disclosure.

FIG. 19 is a diagram 1900 illustrating an example of an LMF requesting a UE to provide a list of supported compression method in accordance with various aspects of the present disclosure. The numberings associated with the communication diagram 1900 do not specify a particular temporal order and are merely used as references for the diagram 1900.

As shown at 1902, in some implementations, the LMF 1604 may request the UE 1602 to indicate whether the UE 1602 has the capability to report/compress CIR/CFR measurements and also request the UE 1602 to provide a list of supported compression methods (e.g., as discussed above) if the UE 1602 has the capability to compress CIR/CFR measurements (e.g., with or without using an AI/ML model). Then, as shown at 1904, in response to the request from the LMF 1604, the UE 1602 may indicate to the LMF 1604 whether it has the capability to report/compress the CIR/CFR measurements, and the UE 1602 may provide a list of supported compression methods if the UE 1602 has the capability to compress the CIR/CFR measurements.

In one configuration, the request message and the response message may be exchanged between the UE 1602 and the LMF 1604 as part of (or using) an LTE Positioning Protocol (LPP) or LPP A (LPPa) capability exchange procedure. Also, the indication of the supported compression methods may be based on a bitmap listing (e.g., if they are being defined/set in a specification. For example, the bitmap may correspond to a first compression method (e.g., reporting every $k^{th}$ occupied subcarrier), the bitmap may correspond to a second compression method (e.g., reporting first N' contiguous samples in r for which the first sample has magnitude exceeding a threshold η), and the bitmap may correspond to a third compression method (e.g., reporting top L CFR measurements), etc. In some examples, the UE 1602 may also indicate whether it is capable of reporting complex values of CIR/CFR, magnitude of CIR/CFR, and/or timing/frequency indication of CIR/CFR. In another example, for implementations where the UE 1602 is associated with an AI/ML encoder model, such as described in connection with FIG. 18 (e.g., the AI/ML model 1802), the UE 1602 may also indicate to the LMF information regarding the AI/ML encoder model. For example, the UE 1602 may indicate to the LMF whether the UE 1602 supports a UE proprietary AI/ML model, a standard AI/ML model, a network (NW) AI/ML model, a NW-developed AI/ML model, or a combination thereof if the UE 1602 supports more than one type of AI/ML model.

In another aspect of the present disclosure, the LMF 1604 may also configure the UE 1602 with at least one CIR/CFR compression method (e.g., one of the compression methods discussed above) along with parameters to be applied for the compression method. In some implementations, the UE 1602 may also request the LMF 1604 to configure a compression method for the UE 1602, and/or request additional/more assistance to configure the parameters of the compression method.

For example, as shown at 1906, the LMF 1604 may indicate/configure the UE 1602 to apply at least one compression method for the CIR/CFR measurement(s), and also related parameters to be applied for the indicated/configured compression method. The UE 1602 may also request the LMF 1604 to configure a specified compression method for the UE 1602 (e.g., the UE 1602 selects the compression method instead of the LMF 1604), and/or request for additional/more assistance to configure the parameters of the compression method selected by the UE 1602, etc. In one example, the request, the response, and the configuration messages (e.g., as discussed in connection with 1902, 1904, and 1906) may be exchanged between the UE 1602 and the LMF 1604 as part of (or using) an LPP capability exchange procedure and/or an LPP location information transfer procedure. In another example, the LMF 1604 may be configured to announce the configuration(s) for CIR/CFR compression along with its method(s) as part of a positioning broadcast procedure, e.g., running over NR Positioning Protocol A (NRPPa), where an LMF may send configurations to a network node (e.g., an NG-RAN node) using NRPPa, and then the network node may send/forward the configurations to the UE using a positioning system information block (posSIB). In addition, for implementations where the UE 1602 is associated with using an AI/ML encoder model that is provided by the LMF 1604, the LMF 1604 may transmit information/details for downloading the AI/ML encoder model, such as via the LPP capability exchange procedure, the LPP location information transfer procedure, and/or a positioning broadcast procedure, etc.

In some examples, as shown at 1908, the LMF 1604 may also transmit an indication to the UE 1602 to indicate/request the UE 1602 to compress CIR/CFR measurements (e.g., using the configured compression method). This indication may be transmitted as a separated signaling from the configuration at 1906, or implicitly implied based on the configuration(s) for compression.

In some examples, the configuration from the LMF 1604 (e.g., at 1906) may also indicate a periodicity and/or one or more conditions for the UE 1602 to report the RS measurements (e.g., measurements for the set of RSs 1608, PRSs, etc., such as CIF/CFR). For example, the LMF 1604 may set the UE 1602 to conduct PRS measurements (e.g., including scheduling of PRS resources), and the UE 1602 may report compressed CIR/CFR measurements to the LMF 1604 (as configured), such as described in connection with FIGS. 16-18. In response, the LMF 1604 may input the compressed measurements to an AI/ML model to infer location of the UE 1602, such as described in connection with FIG. 6B.

As described in connection with FIGS. 7A and 7B, AI/ML positioning (direct and assisted) may also be based on uplink (UL) reference signals, such as sounding reference signals transmitted from a UE. For example, a UE (e.g., the UE 502) may transmit a set of SRSs to a set of base stations/TRPs (e.g., the base station 506), which may also be referred to as network nodes for purposes of illustration. The set of base stations/TRPs may measure the set of SRSs (which may be referred to as "SRS-based measurement(s)") with the assistance of at least one AI/ML model (e.g., the AI/ML model 508). Then, the set of base stations/TRPs may transmit the SRS-based measurement(s) to a location server (e.g., the location server 504, an LMF, etc.). In response, the location server may determine the position of the UE based on the SRS-based measurement(s) from the set of base stations/TRPs. Examples of UL reference signal measurements for AI/ML positioning model input may include CIR, CFR, RSSI, RSRP, RSRPP, RSRQ, and/or relative time of arrival (RTOA), etc.

For purposes of the present disclosure, RSRP for UL reference signals, which may be referred to as "SRS-RSRP" and/or "UL SRS-RSRP," may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In one configuration, the reference point for UL SRS-RSRP may be: (1) for type 1-C base station: the Rx antenna connector; (2) for type 1-O or 2-O base station: based on the combined signal from antenna elements corresponding to a given receiver branch; and (3) for type 1-H base station: the Rx Transceiver Array Boundary connector. For frequency range 1 and 2 (e.g., FR1 and FR2), if receiver diversity is in use by the gNB, the reported UL SRS-RSRP value may not be lower than the corresponding UL SRS-RSRP of any of the individual receiver branches.

RTOA for UL reference signals, which may be referred to as "UL RTOA" and denoted by "$T_{UL\text{-}RTOA}$," may refer to the beginning of subframe i containing SRS received in Reception Point (RP) j, relative to the RTOA Reference Time. In one configuration, the UL RTOA reference time may be defined as $T_0 + t_{SRS}$, where $T_0$ is the nominal beginning time of SFN 0 provided by SFN Initialization Time, and $t_{SRS} = (10 n_f + n_{sf}) \times 10^{-3}$, where $n_f$ and $n_{sf}$ are the system frame number and the subframe number of the SRS, respectively. Multiple SRS resources may be used to determine the beginning of one subframe containing SRS received at a RP. The reference point for $T_{UL\text{-}RTOA}$ may be: (1) for type 1-C base station: the Rx antenna connector; (2) for type 1-O or 2-O base station: the Rx antenna (e.g., the center location of the radiating region of the Rx antenna); and (3) for type 1-H base station: the Rx Transceiver Array Boundary connector.

RSRPP for UL reference signals, which may be referred to as "SRS-RSRPP" and/or "UL SRS-RSRPP," may be defined as the power of the linear average of the channel response at the i-th path delay of the resource elements that carry the received UL SRS signal configured for the measurement, where UL SRS-RSRPP for 1st path delay is the power contribution corresponding to the first detected path in time. In one configuration, the reference point for UL SRS-RSRPP may be: (1) for type 1-C base station: the Rx antenna connector; (2) for type 1-O or 2-O base station: based on the combined signal from antenna elements corresponding to a given receiver branch; and (3) for type 1-H base station: the Rx Transceiver Array Boundary connector. For frequency range 1 and 2, if receiver diversity is in use by the gNB for UL SRS-RSRPP measurements: the reported UL SRS-RSRPP value for the first and additional paths may be provided for the same receiver branch(es) as applied for UL SRS-RSRP measurements, or the reported UL SRS-RSRPP value for the first path may not be lower than the corresponding UL SRS-RSRPP for the first path of any of the individual receiver branches and the reported UL SRS-RSRPP for the additional paths may be provided for the same receiver branch(es) as applied UL SRS-RSRPP for the first path.

A UE may be configured with multiple SRS resource sets and each SRS resource set may have up to K SRS resources (e.g., K=16), such as shown by FIG. 15. For example, in some implementations, a UE may be configured with one or more SRS resource sets as configured by the higher layer parameter SRS-ResourceSet or SRS-PosResourceSet. For each SRS resource set configured by SRS-ResourceSet, a UE may be configured with K≥1 SRS resources (higher layer parameter SRS-Resource), where the maximum value of K is indicated by UE capability. When SRS resource set is configured with the higher layer parameter SRS-PosResourceSet, a UE may be configured with K≥1 SRS resources (higher layer parameter SRS-PosResource), where the maximum value of K is 16. The SRS resource set applicability is configured by the higher layer parameter usage in SRS-ResourceSet. When the higher layer parameter usage is set to 'beamManagement', just one SRS resource in each of multiple SRS resource sets may be transmitted at a given time instant, but the SRS resources in different SRS resource sets with the same time domain behavior in the same BWP may be transmitted simultaneously.

In some examples, a UE may be configured by the higher layer parameter resourceMapping in SRS-Resource with an SRS resource occupying $N_s \in \{1,2,4\}$ adjacent OFDM symbols within the last 6 symbols of the slot, or at any symbol location within the slot if resourceMapping-r16 is provided subject to UE capability, where all antenna ports of the SRS resources are mapped to each symbol of the resource. When the SRS is configured with the higher layer parameter SRS-PosResourceSet the higher layer parameter resourceMapping-r16 in SRS-PosResource indicates an SRS resource occupying $N_s \in \{1,2,4,8,12\}$ adjacent symbols anywhere within the slot. When the SRS is configured with the higher layer parameter SRS-ResourceSet, the higher layer parameter resourceMapping-r17 in SRS-Resource indicates an SRS resource occupying $N_s \in \{1,2,4,8,10,12,14\}$ adjacent symbols anywhere within the slot.

In some examples, for a UE configured with one or more SRS resource configuration(s), and when the higher layer parameter resourceType in SRS-Resource or SRS-PosResource is set to 'periodic'. For a UE configured with one or more SRS resource configuration(s), and when the higher layer parameter resourceType in SRS-Resource or SRS-PosResource is set to 'semi-persistent'. If the UE has an active semi-persistent SRS resource configuration and has not received a deactivation command, the semi-persistent SRS configuration is considered to be active in the UL BWP which is active, otherwise it is considered suspended. For a UE configured with one or more SRS resource configuration(s), and when the higher layer parameter resourceType in SRS-Resource or SRS-PosResource is set to 'aperiodic':

In some implementations, when the SRS is configured by the higher layer parameter SRS-PosResource and if the higher layer parameter spatialRelationInfoPos is configured, it contains the ID of the configuration fields of a reference RS. The reference RS may be an SRS configured by the higher layer parameter SRS-Resource or SRS-PosResource, CSI-RS, SS/PBCH block, or a DL PRS configured on a serving cell or a SS/PBCH block or a DL PRS configured on a non-serving cell. If the UE is configured for transmission of SRS-PosResource in RRC_INACTIVE mode, the configured spatialRelationInfoPos is also applicable. The UE may not expected to transmit multiple SRS resources with different spatial relations in the same OFDM symbol. If the UE is not configured with the higher layer parameter spatialRelationInfoPos the UE may use a fixed spatial domain transmission filter for transmissions of the SRS configured by the higher layer parameter SRS-PosResource across multiple SRS resources or it may use a different spatial domain transmission filter across multiple SRS resources. The UE may be expected to transmit an SRS configured by the higher layer parameter SRS-PosResource within the active UL BWP of the UE. When the configuration of SRS is done by the higher layer parameter SRS-PosResource, the UE may just be provided with a single RS source in spatialRelationInfoPos per SRS resource for positioning. For operation on the same carrier, if an SRS configured by the higher parameter SRS-PosResource collides with a scheduled PUSCH, the SRS is dropped in the symbols where the collision occurs. The UE may not expect to be configured with SRS-PosResource on a carrier of a serving cell with slot formats comprised of DL and UL symbols, not configured for PUSCH/PUCCH transmission.

In some examples, the UE may be configured, subject to UE capability, to report UE Timing Error Groups (TEGs), where TEGs at UE side may be defined as: UE Tx TEG is associated with the transmissions of one or more UL SRS resources for the positioning purpose, which have the Tx timing error difference within a certain margin. The UE may be configured to report, via high layer parameter nr-UE-RxTxTEG-Request or ue-TxTEG-RequestUL-TDOA-Config, subject to UE capability, association information of the already transmitted SRS resource(s) configured by the higher layer parameter SRS-PosResource with UE Tx TEG(s) via higher layer parameter nr-SRS-TxTEG-Set or ue-TxTEG-AssociationList. The UE may report, via high layer parameter ue-TxTEG-TimingErrorMarginValue, the UE Tx TEG timing error margin value of all the UE Tx TEGs within one UEPositioningAssistanceInfo. If the UE reports a UE Tx TEG ID with a UE Rx-Tx time difference measurement, the UE may report the association information of the already transmitted SRS resources configured by the higher layer parameter SRS-PosResource with the UE Tx TEG ID. If the UE is configured with SRS resources configured by the higher layer parameter SRS-PosResource in multiple CCs, the UE may report the carrierFreq or servCellId of the SRS resources when it reports the UE Tx TEG associations. If the UE reports a UE RxTx TEG ID with a UE Rx-Tx time difference measurement, the UE may report a UE Tx TEG ID. If the UE reports a UE Tx TEG ID with a UE Rx-Tx time difference measurement, the UE may report a UE Tx TEG timing error margin value, via high layer parameter nr-UE-TxTEG-TimingErrorMargin, for all the UE Tx TEGs within one NR-Multi-RTT-SignalMeasurementInformation.

Subject to UE capability, the UE may be configured with an SRS resource for positioning associated with the initial UL BWP, and the SRS resource is transmitted inside the initial UL BWP during RRC_INACTIVE mode with the same CP and subcarrier spacing as configured for the initial UL BWP. Subject to UE capability, the UE may be configured with an SRS resource for positioning outside the initial BWP including frequency location and bandwidth, subcarrier spacing, and CP length for transmission of the SRS in RRC_INACTIVE mode. If the transmission of SRS for positioning outside the initial BWP in RRC_INACTIVE mode along with the switching time, indicated in higher layer parameter switching TimeSRS-TX-OtherTX, in unpaired spectrum, subject to UE capability, collides in time domain with other DL signals or channels or UL signals or channels, the SRS for positioning transmission is dropped in the symbol(s) where the collision occurs. If the transmission of SRS for positioning outside the initial BWP in RRC_INACTIVE mode along with the switching time, indicated in higher layer parameter switchingTimeSRS-TX-OtherTX, in paired spectrum or SUL band, subject to UE capability, collides in time domain with UL signals or channels on the same carrier, the SRS for positioning transmission is dropped in the symbol(s) where the collision occurs. The SRS resource for positioning outside the initial BWP in RRC_INACTIVE mode is configured in the same band and CC as the initial UL BWP. If the UE in RRC_INACTIVE mode determines that the UE is not able to accurately measure the configured DL RS in SRS-SpatialRelationInfoPos for an SRS resource for positioning where the DL RS is semi-persistent or periodic, the UE stops transmission of the SRS resource for positioning.

AI/ML positioning based on UL reference signal may specify measuring UL channel between a UE/target and one or more network nodes (e.g., NG-RAN node(s), gNB(s), base stations, TRPs, etc.), which may be enabled by letting the UE/target send a reference signal (e.g., an SRS) and measuring the reference signal at a data collection/inference entity (e.g., a NG RAN node, a base station, a gNB, a TRP, etc.). For network node assisted positioning with LMF-side model described in connection with FIG. 7B, an LMF (e.g., the location server 504) may be configured to run a direct AI/ML positioning model with network node-assistance (e.g., NG-RAN node assistance) in which a network node (e.g., the base station 506) may be configured to reports SRS measurements to the LMF. Then, the LMF may input the reported SRS measurements. In some examples, an AI/ML positioning model may have the capability to accept different UL-based input types, including CIR, CFR, RSSI, RSRP, RSRPP, RSRQ, RToA, and/or AoA, etc. of SRS resource. In some scenarios, it has been shown that training the AI/ML model of an LMF with SRS-based CIR/CFR may demonstrate excellent performance. However, most/current network implementations do not support/enable a network node to report CIR/CFR, such as over NR Positioning Protocol A (NRPPa).

Aspects presented herein may improve the efficiency, accuracy, and performance of AI/ML positioning based on UL reference signal (e.g., SRS) measurements by reducing the reporting overhead for UL reference signal measurements. For example, aspects presented herein may enable a network node (e.g., a NG-RAN node, a base station/TRP, etc.) to compress the reporting of CIR/CFR using one or more compressing methods, where the compressed CIR/CFR reporting may still be used by an AI/ML model to perform AI/ML inference and/or to be trained effectively and accurately. Although reporting of UL measurement(s) (e.g., in NRPPa) may take place over a wired/fiber channel, it is suitable to seek methods for compressing CIR/CFR as they incur high reporting overhead as discussed above, especially when a network node is configured to report multiple SRS resources.

Figure 20:
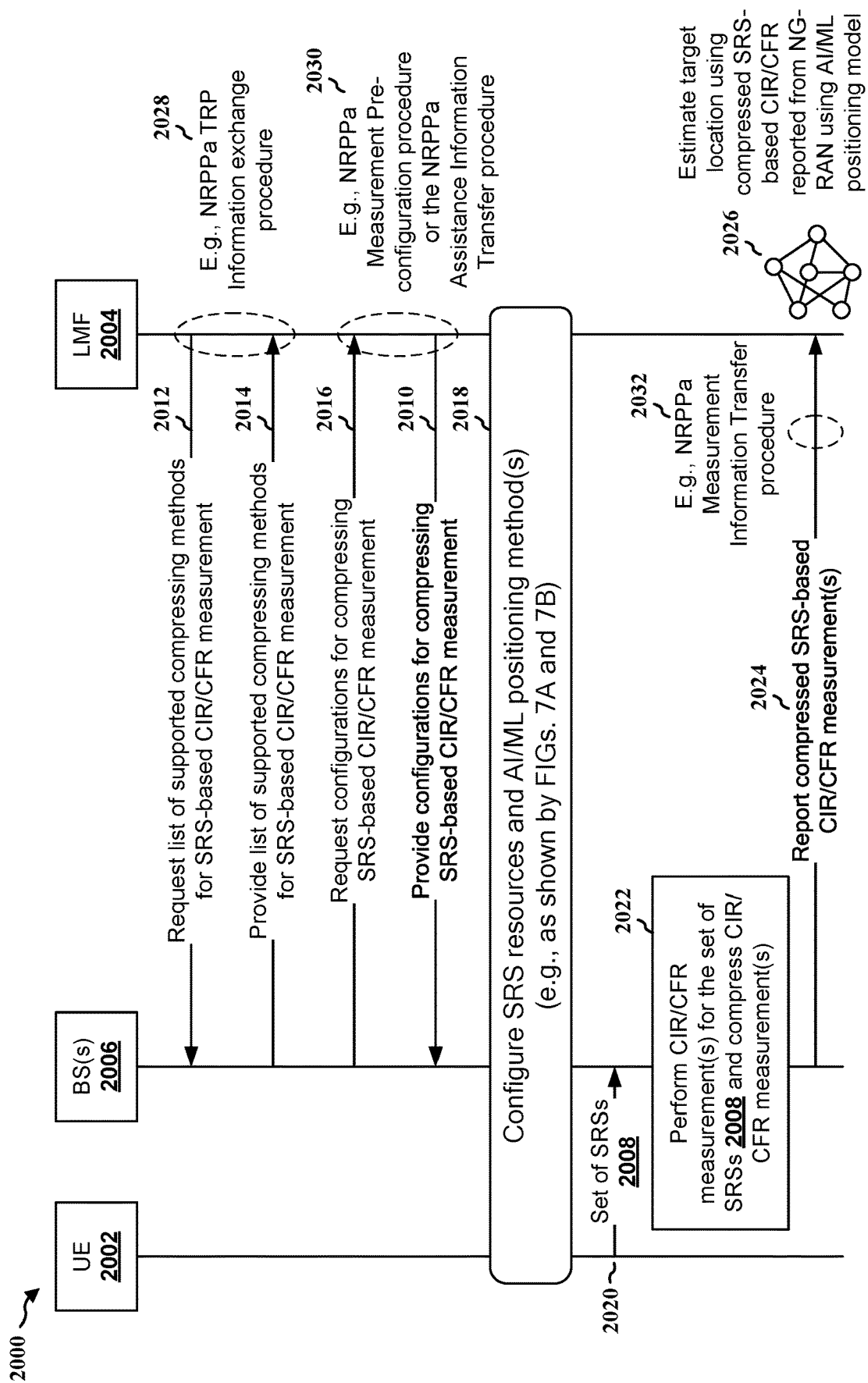
FIG. 20 is a diagram illustrating an example of an LMF configuring one or more network nodes (e.g., base stations/transmission reception points (TRPs)) to compress SRS-based CIR/CFR measurement(s) in accordance with various aspects of the present disclosure.

FIG. 20 is a diagram 2000 illustrating an example of an LMF configuring one or more network nodes (e.g., base stations/TRPs) to compress SRS-based CIR/CFR measurement(s) in accordance with various aspects of the present disclosure. The numberings associated with the communication diagram 2000 do not specify a particular temporal order and are merely used as references for the diagram 2000.

At 2010, an LMF 2004 (or a location server/network entity) may transmit a set of configurations to one or more base stations 2006 (e.g., NG-RAN nodes, gNBs, TRPs, etc.) for compressing SRS-based CIR/CFR measurements. The set of configurations may specify/indicate how the one or more base stations 2006 are to compress SRS-based CIR/CFR measurements before reporting them back to the LMF 2004 (or another network entity). In some examples, if the one or more base stations 2006 already have the set of configurations, the LMF 2004 may also transmit an indication to the one or more base stations 2006 to indicate/request the one or more base stations 2006 to compress and report SRS-based CIR/CFR measurements (using one or more compression method).

In one example, as shown at 2012, the LMF 2004 may transmit to the one or more base stations 2006 an initial request that solicits/requests the one or more base stations 2006 to specify/provide a list of supported methods for compressing SRS-based CIR/CFR measurements.

At 2014, in response to this initial request, the one or more base stations 2006 may send, to/for the LMF 2004, an initial response that includes a list of supported methods for compressing SRS-based CIR/CFR measurements (example compression methods are discussed below). In some implementations, the one or more base stations 2006 may also be configured to transmit a message indicating a list of supported methods for compressing SRS-based CIR/CFR measurements (e.g., information carried in the initial response) without the initial request (e.g., without solicitation/request from the LMF 2004). In some examples, as shown at 2028, the initial request and the initial response (e.g., at 2012 and 2014) may be exchanged between the LMF 2004 and the one or more base stations 2006 as part of an NRPPa TRP location information exchange procedure.

In another example, as shown at 2016, the one or more base stations 2006 may send, to/for the LMF, a request in which the one or more base stations 2006 request/ask the LMF 2004 to send a set of configurations for compressing SRS-based CIR/CFR measurements. Then, at 2010, the one or more base stations 2006 may receive the set of configurations for compressing SRS-based CIR/CFR measurements from the LMF 2004 in response. In other words, the one or more base stations 2006 may receive, from the LMF 2004, a response in which it includes the configurations. Similarly, in some implementations, the one or more base stations 2006 may receive the response (e.g., the set of configurations for compressing SRS-based CIR/CFR measurements) without sending a request (e.g., without the request shown at 2016). In some examples, as shown at 2030, the request for the set of configurations for compressing SRS-based CIR/CFR measurement(s) and the corresponding response (including the set of configurations) (e.g., at 2016 and 2010) may be exchanged between the LMF 2004 and the one or more base stations 2006 as part of an NRPPa measurement pre-configuration procedure and/or the NRPPa assistance information transfer procedure.

The set of configurations for compressing SRS-based CIR/CFR measurements may indicate at least one compression method for compressing SRS-based CIR/CFR measurements, and also related parameters associated with the at least one compression method. In addition, the set of configurations may indicate an AI/ML model to be used for compressing the SRS-based CIR/CFR measurements. In some examples, the set of configurations may also include information regarding the delivery of the AI/ML model to the one or more base stations 2006. For example, if the AI/ML model is provided by the LMF 2004, the LMF 2004 may transmit the AI/ML model to the one or more base stations 2006, indicate the one or more base stations 2006 to download the AI/ML model from a server, and/or indicate which AI/ML model to use if the one or more base stations 2006 already has this AI/ML model (along with other AI/ML models).

In some implementations, the set of configurations may indicate a periodicity of reporting the compressed SRS-based CIR/CFR measurements. For example, the set of configurations may indicate the one or more base stations 2006 to report the compressed SRS-based CIR/CFR measurements periodically (e.g., every X ms), or semi-periodically, etc. In another example, the set of configurations may indicate the one or more base stations 2006 to report the compressed SRS-based CIR/CFR measurements based on an event (e.g., based on one or more triggering conditions, such as when the channel traffic between the LMF 2004 and the one or more base stations 2006 is above a traffic threshold, when training of the AI/ML model is specified, etc.). In some implementations, the set of configurations may indicate SRS resources (e.g., resource sets, resource IDs, etc.) for which the compressed SRS-based CIR/CFR measurements are to be reported.

At 2018, the LMF 2004 may configure SRS resources and AI/ML positioning method(s) for a UE 2002 (e.g., the target) and the one or more base stations 2006, such as described in connection with FIGS. 7A and 7B. At 2020, based on the SRS resources configured for the UE 2002, the UE 2002 may transmit a set of SRSs 2008 to the one or more base stations 2006.

At 2022, the one or more base stations 2006 may perform CIR/CFR measurement(s) for the set of SRSs 2008 received from the UE 2002, and the one or more base stations 2006 may compress these SRS-based CIR/CFR measurement(s) based on the set of configurations for compressing SRS-based CIR/CFR measurement(s) (e.g., received at 2010). Then, at 2024, the one or more base stations 2006 may report the compressed SRS-based CIR/CFR measurement(s) to the LMF 2004. In some examples, as shown at 2032, one or more base stations 2006 may report the compressed SRS-based CIR/CFR measurements as part of an NRPPa measurement information transfer procedure.

At 2026, the LMF 2004 may estimate the location of the UE 2002 based on the compressed SRS-based CIR/CFR measurements reported from the one or more base stations 2006 using an AI/ML positioning model.

In one aspect of the present disclosure, the one or more base stations 2006 may be configured (e.g., by the LMF 2004) to apply one or more compression methods for the SRS-based CIR/CFR measurements, which may be similar to the compression methods for the SRS-based CIR/CFR measurements described in connection with FIGS. 16-19. For example, let $\tilde{s}=\{\hat{s}_i\}^{NM}_{i=1}$ be the received SRS resource (including unused subcarriers) before applying channel estimation (e.g., $\tilde{s}$ may correspond to a set of tones representing the SRS), where M is a number of OFDM symbols. Also, let $\hat{s}=\{\hat{s}_i\}^{N}_{i=1}$ be the channel frequency response of one SRS resource, where N is a number of complex I/Q samples corresponding to subcarriers of the SRS resource. In some configurations, each base station in the one or more base stations 2006 may be configured to report multiple SRS resources that are part of different resource sets and/or TRPs. In some examples, additional network nodes (e.g., base stations, NG-RAN nodes, TRPs, etc.) may also be configured to be involved in the CIR/CFR measurements.

Figure 21:
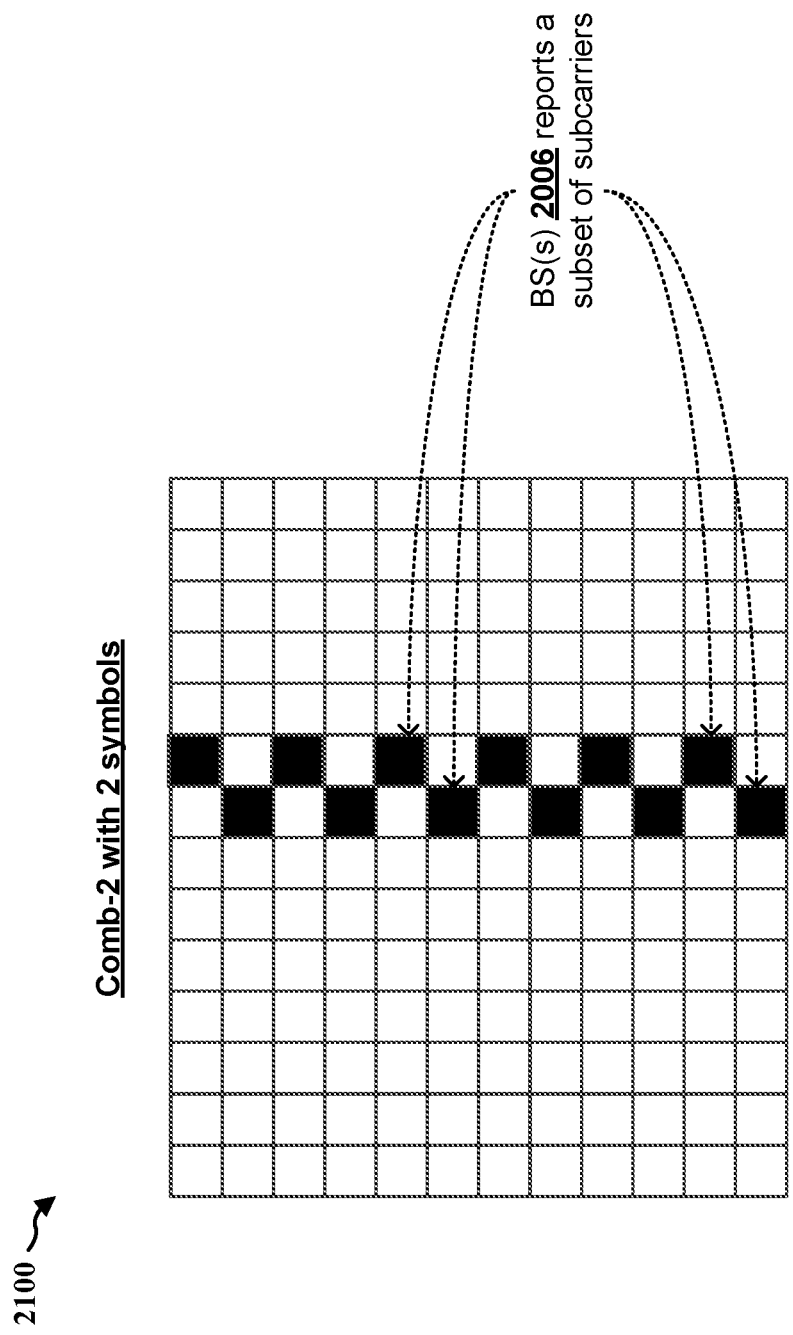
FIG. 21 is a diagram illustrating an example of a base station compressing a set of SRS-based CIR/CFR measurements by reporting a sparse representation of $\hat{s}$ or $\tilde{s}$ ($\hat{s}$ being the CFR of one PRS resource and $\tilde{s}$ being the received PRS resource before applying channel estimation, etc.) in accordance with various aspects of the present disclosure.

FIG. 21 is a diagram 2100 illustrating an example of a base station compressing a set of SRS-based CIR/CFR measurements by reporting a sparse representation of $\hat{s}$ or $\tilde{s}$ ($\hat{s}$ being the CFR of one SRS resource and $\tilde{s}$ being the received SRS resource before applying channel estimation, etc.) in accordance with various aspects of the present disclosure. In one example, the one or more base stations 2006 may be configured to report a sparse representation of $\hat{s}$ or $\tilde{s}$ (e.g., $\hat{s}$ being the CFR of one SRS resource and $\tilde{s}$ being the received SRS resource before applying channel estimation, etc.), where the one or more base stations 2006 may consider/apply a sparse pattern of estimated SRS resource. For example, the one or more base stations 2006 may be configured to report a subset of subcarriers, such as every kth subcarrier of occupied subcarrier in $\hat{s}$. For example, as shown by the diagram 2100, if k=4, then the one or more base stations 2006 may be configured to report every $4^{th}$ subcarriers. Thus, the reporting overhead for the SRS-based CIR/CFR measurement(s) may be reduced by approximately 75%. In some examples, the sparse pattern(s) of SRS to be reported by the one or more base stations 2006 may be configured by the LMF 2004 (e.g., over a NRPPa procedure) or pre-configured at the one or more base stations 2006 (e.g., based on NRPPa specifications).

In another aspect of the present disclosure, as described in connection with FIG. 17, the one or more base stations 2006 may be configured to computes SRS-based CIR r. e.g., by applying $N_{ifft}$-sized inverse discrete Fourier transform to CFR $\hat{s} \rightarrow r = ifft(\hat{s})$. Then, the LMF 2004 may configure the one or more base stations 2006 to report a compact version of SRS-based CIR r. For example, the LMF 2004 may configure the one or more base stations 2006 to report $N' < N_{ifft}$ samples of CIR r, where N' samples are strongest power samples in r or N' samples are selected based on:

(1) first N' contiguous samples in r for which the first sample has magnitude exceeding a threshold η (the threshold may be set in dB value with respect to the maximum of CIR), (2) the one or more base stations 2006 find the sample whose magnitude is the maximum in r and reports $N'_1$ contiguous samples before the maximum sample and $N'_2$ contiguous samples after the maximum sample (including the maximum), where $N'_1 + N'_2 = N'$, and/or (3) the one or more base stations 2006 may report the first N' peaks in r.

Similarly, parameters N', $N'_1$, $N'_2$, $N_{ifft}$ and η may be configured by the LMF 2004 or pre-configured at the one or more base stations 2006.

In some examples, the compressed SRS-based CIR/CFR measurement(s) may include: an absolute value of the compressed SRS-based CIR/CFR measurement(s) and/or a complex value of the compressed SRS-based CIR/CFR measurement(s). As such, the reporting overhead for the CIR/CFR measurement(s) may be greatly reduced.

In another aspect of the present disclosure, to compress the SRS-based CIR/CFR measurement reporting, the one or more base stations 2006 may be configured to report CIR/CFR measurements for the set of SRSs 2008 that satisfy at least one pre-defined condition and/or certain characteristic(s) for different SRS resources and/or TRPs. For example, the one or more base stations 2006 may be configured to report samples having: (1) a signal-to-noise ratio (SNR) above or below an SNR threshold $\gamma_{snr}$, (2) a reference signal received power (RSRP) above or below an RSRP threshold $\gamma_{rsrp}$, (3) a delay spread above or below a delay spread threshold $\gamma_{ds}$, and/or (4) a Rician factor above or below a Rician factor threshold $\gamma_K$, etc.

In some examples, these pre-defined condition(s) and/or characteristic(s) may be applied by the one or more base stations 2006 in addition to the compression methods described above. For example, the one or more base stations 2006 may be configured to report thirty (30) contiguous samples (e.g., N'=30) after the first sample with a magnitude exceeding a threshold η and also with SNR above an SNR threshold. Similarly, the LMF 2004 may configure one or more of the SNR threshold $\gamma_{snr}$, the RSRP threshold $\gamma_{rsrp}$, the delay spread threshold $\gamma_{ds}$, and/or the Rician factor threshold $\gamma_K$ for the one or more base stations 2006 (e.g., over NRPPa procedure(s)), and/or one or more of these thresholds may be pre-configured at the one or more base stations 2006 (e.g., defined by a specification, such as NRPPa specifications).

In another aspect of the present disclosure, to compress the SRS-based CIR/CFR measurement reporting, the one or more base stations 2006 may be configured to report top L SRS-based CIR/CFR measurements for the set of SRSs 2008 whose radio characteristics are maximum for different SRS resources and/or TRPs, where the radio characteristics may include SNR, RSRP, delay spread, and/or Rician factor, etc. For example, the one or more base stations 2006 may be configured to report top ten SRS-based CIR/CFR measurements for the set of SRSs 2008 whose SNR are maximum for different SRS resources and/or TRPs.

In some examples, this configuration may also be applied by the one or more base stations 2006 in addition to the compression methods described above. For example, the one or more base stations 2006 may be configured to report thirty (30) contiguous samples (e.g., N'=30) after the first sample with a magnitude exceeding a threshold η and also whose SNR are maximum for different SRS resources and/or TRPs. The LMF 2004 may configure the parameter L for the one or more base stations 2006 (e.g., over NRPPa procedure(s)), and/or the parameter L may be pre-configured at the one or more base stations 2006 (e.g., defined by a specification, such as NRPPa specifications).

In another aspect of the present disclosure, a base station may pass CFR measurement(s) (e.g., CFR ŝ or s̃) and/or CIR measurement(s) (e.g., CIR r) to an AI/ML model (which may or may not co-located with the base station). In response, the AI/ML model may compress the CIR/CFR measurement(s), such as using compression methods described above, and the AI/ML may transmit the compressed latent representation of CIR/CFR to an LMF. Such configuration may be suitable if a standard AI/ML model is used for multiple base stations.

Figure 22:
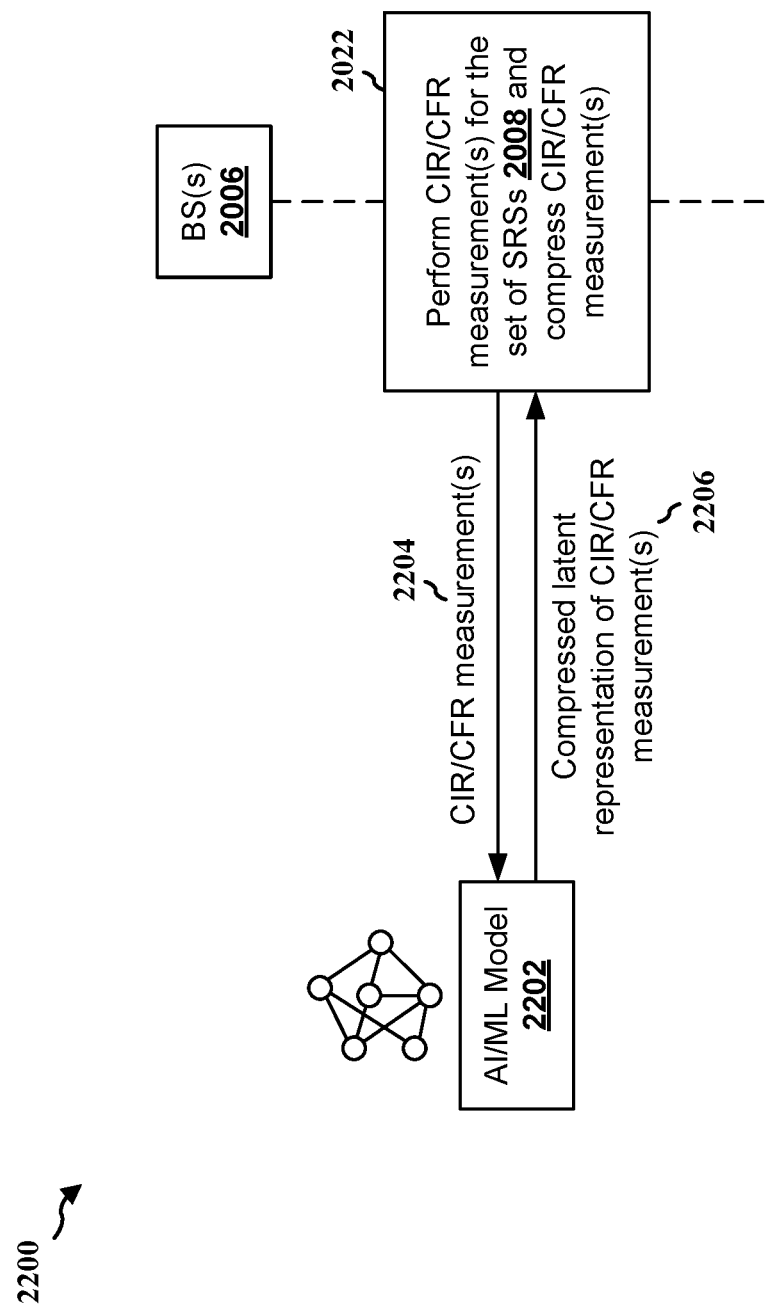
FIG. 22 is a diagram illustrating an example of one or more base stations passing CIR/CFR measurement(s) to an AI/ML model for performing the compression of the CIR/CFR measurement(s) in accordance with various aspects of the present disclosure.

FIG. 22 is a diagram 2200 illustrating an example of one or more base stations passing CIR/CFR measurement(s) to an AI/ML model for performing the compression of the CIR/CFR measurement(s) in accordance with various aspects of the present disclosure. The numberings associated with the communication diagram 2200 do not specify a particular temporal order and are merely used as references for the diagram 2200.

As described in connection with FIGS. 20, at 2008 and 2022, the one or more base stations 2006 may receive a set of SRSs 2008 from the UE 2002. Then, the one or more base stations 2006 may perform CIR measurement(s) (e.g., r) and/or CFR measurement(s) (e.g., ŝ or s̃) for the set of SRSs 2008, such as described in connection with FIGS. 7A, and 7B. then, the one or more base stations 2006 may compress the CIR/CFR measurement(s) using an AI/ML model 2202. For example, as shown at 2204, the one or more base stations 2006 may transmit CFR ŝ (or s̃) to the AI/ML model 2202 (e.g., an encoder, an SRS CIR measurements encoder model, etc.) that is capable of producing a compressed latent representation of CFR (which may be denoted by $z_s$ for purposes of the present disclosure), and/or the one or more base stations 2006 may transmit CIR r to the AI/ML model 2202 (e.g., an encoder, an SRS CFR measurements encoder model, etc.) that is capable of producing a compressed latent representation of CIR (which may be denoted by $z_r$ for purposes of the present disclosure).

After receiving the CIR/CFR measurement(s), the AI/ML model 2202 may apply one or more compression methods to the CIR/CFR measurement(s), such as above. For example, the AI/ML model 2202 may compress the CIR/CFR measurement(s) by selecting every $k^{th}$ occupied subcarrier for reporting and/or by selecting $N'<N_{ifft}$ samples of CIR r for reporting, where N' samples are selected based on (1) first N' contiguous samples in r for which the first sample has magnitude exceeding a threshold η (the threshold can be set in dB value with respect to the maximum of CIR), (2) the sample whose magnitude is the maximum in r and $N'_1$ contiguous samples before the maximum sample and $N'_2$ contiguous samples after the maximum sample (including the maximum) where $N'_1+N'_2=N'$, and/or (3) first N' peaks in r, etc. In some examples, the AI/ML model 2202 may also compress the CIR/CFR measurement(s) by selecting CIR/CFR measurement(s) that are above or below an SNR threshold $\gamma_{snr}$, an RSRP threshold $\gamma_{rsrp}$, a delay spread threshold $\gamma_{ds}$, and/or a Rician factor threshold $\gamma_K$, etc., or by selecting top L CFR/CIR measurement(s), etc. Depending on the implementation, the AI/ML model 2202 may be a standard model, a model provided to the one or more base stations 2006 by the LMF 2004, a base station proprietary model (an LMF trained with this model may assume it will stay fixed for a long period of time), or a combination thereof.

As shown at 2206, after compressing the CFR/CIR measurement(s), the AI/ML model 2202 may transmit the compressed latent representation of the CIR/CFR measurements (e.g., $z_r$ and/or $z_s$) to the one or more base stations 2006. In some examples, the AI/ML model 2202 may be configured to compress multiple CFRs (ŝ or s̃) and/or multiple CIRs (r) from same/different TRPs and to produce a compressed latent representation of CFR $z_{ss}$ and/or CIR $z_{rr}$. Then, at 2206, the one or more base stations 2006 may transmit/forward the compressed CIR/CFR measurements (e.g., $z_r/z_{rr}$ and/r $z_s/z_{ss}$) to the LMF 2004.

In some configurations, the reported SRS-based CIR/CFR measurements (e.g., from the one or more base stations 2006) and/or the reported compressed SRS-based CIR/CFR measurements (e.g., from the one or more base stations 2006 and/or the AI/ML model 2202) may also be differentially encoded. For example, the one or more base stations 2006 and/or the AI/ML model 2202 may be configured to report the value of a maximum element (e.g., 2 dB) and delta values of other elements with respect to the value of the maximum element (e.g., −0.3 dB, +0.7 dB, 0 dB, −0.01 dB, etc.). This may further reduce the reporting overhead for the one or more base stations 2006 and/or the AI/ML model 2202.

Aspects presented herein may improve the efficiency, accuracy, and/or performance of UE positioning by reducing reporting overhead for PRS-based/SRS-based CIR/CFR measurements. In an aspect, an LMF may request a target (e.g., a UE whose position is to be determined) to indicate whether it has the capability to report CIR/CFR and ask the target to list the supported compression methods, and the target may indicate its capabilities along with any supported compression methods. This exchange may happen during an LPP capability exchange procedure. In an aspect, the target may be configured by the LMF to report a sparse subset of received PRS resources based on sampling parameters provided by the LMF or the standard, and/or to report a set of selected samples of resources based a threshold CIR magnitude. In one example, N contiguous samples after a first sample exceeding the threshold may be selected. In another example, samples adjacent to the sample with the maximum magnitude may be selected. The report samples that satisfy certain criteria like values of SNR, RSRP, delay spread, and/or Rician factor may be considered. In an aspect, the target may pass CFRs to an AI/ML model (e.g., an encoder) that produces a compressed latent representation of PRS-based CFR which the UE reports back to the LMF. The AI/ML model may be a standard model, LMF provided model, a UE proprietary model.

In AI/ML based UL-positioning scenarios, more efficient ways may be implemented for reporting SRS-based measurements like CFR/CIR from an NG-RAN node to an LMF than current wired/fiber channels. Aspects presented herein propose compression methods for reporting of such measurements over NRPPa. In an aspect, an NG-RAN node receives a set of configurations from a network entity (LMF) specifying how the NG-RAN may compress SRS-based CIR/CFR measurements. The configurations may include a compression method and/or AI/ML model(s) to be used. NG-RAN node may measure SRS from a target, compresses the SRS-based CIR/CFR measurements, and report them to the network entity. In an aspect, the request and response between the NG-RAN node and the network entity may be sent as part of NRPPa Measurement Pre-configuration procedure or the NRPPa Assistance Information Transfer procedure or NRPPa TRP Location Information exchange procedure. The compressed SRS-based CIR/CFR measurements may be sent as part of the NRPPa Measurement Information Transfer procedure. In an aspect, the NG-RAN node may be configured by the LMF over NRPPa specifications to report a sparse subset of received SRS resources belonging to different resource sets/TRPs, or to report a compact version of SRS-based CIRs based on a threshold magnitude of sample CIRs. In one example first N samples exceeding the threshold may be reported. In another example, samples before and after a sample with the maximum magnitude may be reported. The NG-RAN node may also be configured to report SRS-based CFR/CIR measurements that satisfy certain criteria like values of SNR, RSRP, RSRPP, delay spread, Rician factor, etc. In an aspect, NG-RAN node may pass CFR/CIR to an AI/ML model (e.g., an encoder) that produces a compressed latent representation of SRS-based CFR/CIR which the NG-RAN node reports back to the LMF.

Figure 23:
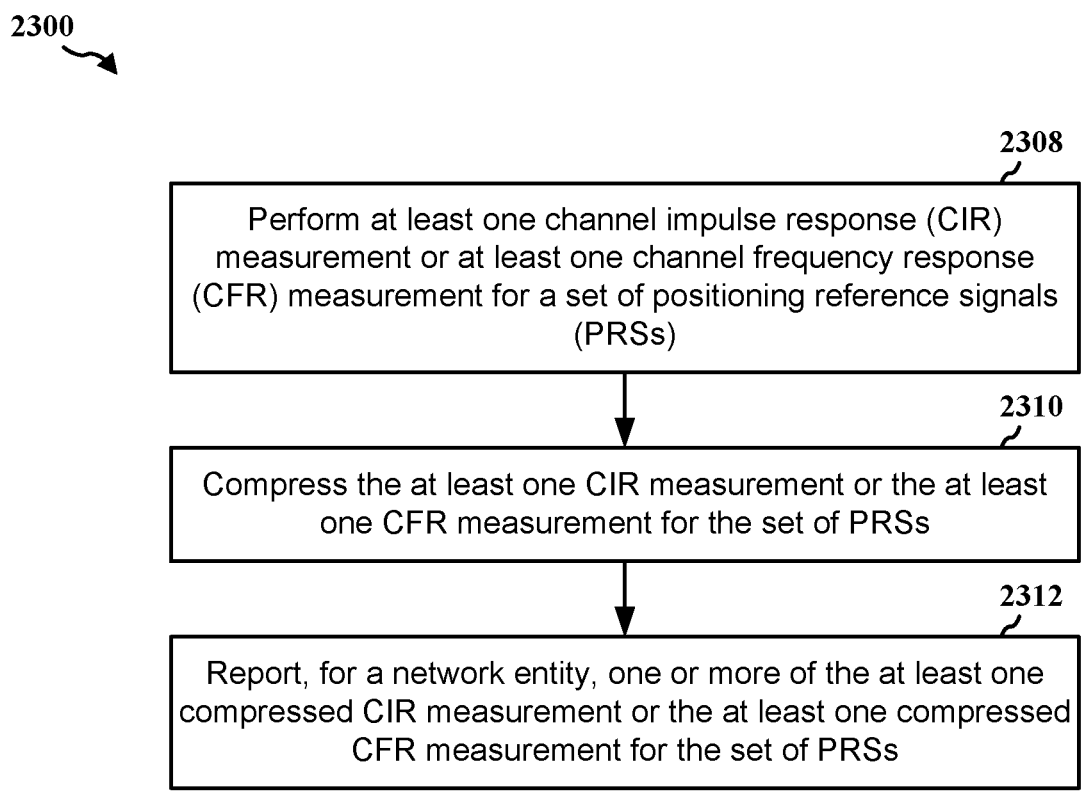
FIG. 23 is a flowchart of a method of wireless communication.

FIG. 23 is a flowchart 2300 of a method of wireless communication. The method may be performed by a UE (e.g., the UE 104, 404, 502, 1602, 2002; the apparatus 2504). The method may enable the UE to compress DL reference signal measurements to reduce reporting overhead for the DL reference signal measurements, thereby improving the efficiency and performance of AI/ML positioning.

At 2308, the UE may perform at least one CIR measurement or at least one CFR measurement for a set of PRSs, such as described in connection with FIGS. 16-19. For example, at 1612 of FIG. 16, the UE 1602 may perform channel impulse response (CIR) measurement(s) and/or channel frequency response (CFR) measurement(s) for the set of RSs 1608. The at least one CIR measurement or the at least one CFR measurement may be performed by, e.g., the measurement compression component 198, the transceiver(s) 2522, the cellular baseband processor(s) 2524, and/or the application processor(s) 2506 of the apparatus 2504 in FIG. 25.

At 2310, the UE may compress the at least one CIR measurement or the at least one CFR measurement for the set of PRSs, such as described in connection with FIGS. 16-19. For example, at 1614 of FIG. 16, the LMF 1604 may the UE 1602 may compress the CIR/CFR measurement(s) for the set of RSs 1608. The compression of the at least one CIR measurement or the at least one CFR measurement may be performed by, e.g., the measurement compression component 198, the transceiver(s) 2522, the cellular baseband processor(s) 2524, and/or the application processor(s) 2506 of the apparatus 2504 in FIG. 25.

In one example, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, a complex value of the at least one compressed CFR measurement, timing indication of the at least one compressed CIR measurement, or frequency indication of the at least one compressed CFR measurement.

In another example, to compress the at least one CIR measurement or the at least one CFR measurement for the set of PRSs, the UE may select a fraction of PRSs from the set of PRSs for the at least one CIR measurement or the at least one CFR measurement, or for reporting one or more of the at least one compressed CIR measurement or the at least one compressed CFR measurement. In some implementations, to select the fraction of PRSs from the set of PRSs, the UE may select every $k^{th}$ subcarrier of occupied subcarriers in the set of PRSs, where k is an integer. In some examples, the UE may select every first unoccupied subcarrier that is adjacent to the selected every $k^{th}$ subcarrier.

In another example, to compress the at least one CIR measurement or the at least one CFR measurement for the set of PRSs, the UE may select a portion of samples from the at least one CIR measurement or the at least one CFR measurement for reporting one or more of the at least one compressed CIR measurement or the at least one compressed CFR measurement. In some implementations, to select the portion of samples from the at least one CIR measurement or the at least one CFR measurement the UE may select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

In another example, to compress the at least one CIR measurement or the at least one CFR measurement for the set of PRSs, the UE may select a subset of PRSs from the set of PRSs for reporting one or more of the at least one compressed CIR measurement or the at least one compressed CFR measurement based on at least one of: the subset of PRSs having an SNR above or below an SNR threshold, the subset of PRSs having a delay spread above or below a delay spread threshold, or the subset of PRSs having a Rician factor above or below a Rician factor threshold. In some implementations, the subset of PRSs may correspond to top L PRSs with highest measurements in the at least one CIR measurements or the at least one CFR measurement.

In another example, to compress the at least one CIR measurement or the at least one CFR measurement for the set of PRSs, the UE may provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

In another example, the UE may receive, from the network entity, a request to indicate whether the UE is capable of reporting the at least one compressed CIR measurement or the at least one compressed CFR measurement; and the UE may transmit, to the network entity based on the request, a capability indication of the UE to report the at least one compressed CIR measurement or the at least one compressed CFR measurement and at least one compression method supported by the UE, such as described in connection with FIG. 19. For example, at 1902, the LMF 1604 may request the UE 1602 to indicate whether the UE 1602 has the capability to report/compress CIR/CFR measurements and also request the UE 1602 to provide a list of supported compression methods (e.g., as discussed above) if the UE 1602 has the capability to compress CIR/CFR measurements (e.g., with or without using an AI/ML model). Then, as shown at 1904, in response to the request from the LMF 1604, the UE 1602 may indicate to the LMF 1604 whether it has the capability to report/compress the CIR/CFR measurements, and the UE 1602 may provide a list of supported compression methods if the UE 1602 has the capability to compress the CIR/CFR measurements. The reception of the request and/or the transmission of the capability indication may be performed by, e.g., the measurement compression component 198, the transceiver(s) 2522, the cellular baseband processor(s) 2524, and/or the application processor(s) 2506 of the apparatus 2504 in FIG. 25.

In another example, the UE may receive, from the network entity, a configuration for compressing the at least one CIR measurement or the at least one CFR measurement, such as described in connection with FIG. 19. For example, at 1906, the LMF 1604 may indicate/configure the UE 1602 to apply at least one compression method for the CIR/CFR measurement(s), and also related parameters to be applied for the indicated/configured compression method. The reception of the configuration may be performed by, e.g., the measurement compression component 198, the transceiver(s) 2522, the cellular baseband processor(s) 2524, and/or the application processor(s) 2506 of the apparatus 2504 in FIG. 25.

In another example, the UE may receive the set of PRSs from at least one network node, such as described in connection with FIGS. 16-19. For example, at 1610 of FIG. 16, the UE 1602 may receive a set of RSs 1608 (e.g., DL RSs, PRSs, etc.) from one or more base stations 1606. The reception of the set of PRSs may be performed by, e.g., the measurement compression component 198, the transceiver(s) 2522, the cellular baseband processor(s) 2524, and/or the application processor(s) 2506 of the apparatus 2504 in FIG. 25.

At 2312, the UE may report, for a network entity, one or more of the at least one compressed CIR measurement or the at least one compressed CFR measurement for the set of PRSs, such as described in connection with FIGS. 16-19. For example, at 1620 of FIG. 16, the UE 1602 may report the compressed CIR/CFR measurement(s) to the LMF 1604. The reporting may be performed by, e.g., the measurement compression component 198, the transceiver(s) 2522, the cellular baseband processor(s) 2524, and/or the application processor(s) 2506 of the apparatus 2504 in FIG. 25.

Figure 24:
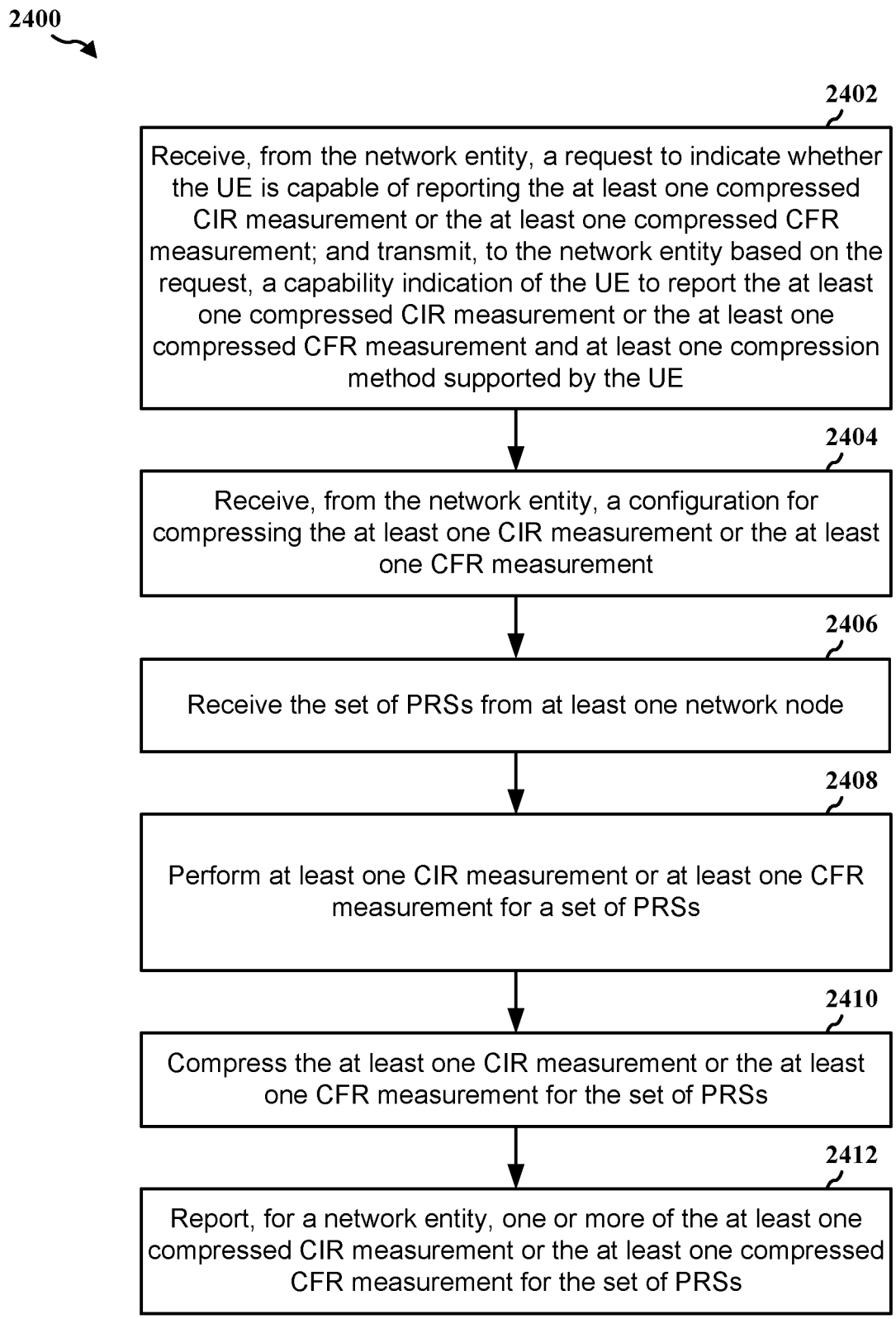
FIG. 24 is a flowchart of a method of wireless communication.

FIG. 24 is a flowchart 2400 of a method of wireless communication. The method may be performed by a UE (e.g., the UE 104, 404, 502, 1602, 2002; the apparatus 2504). The method may enable the UE to compress DL reference signal measurements to reduce reporting overhead for the DL reference signal measurements, thereby improving the efficiency and performance of AI/ML positioning.

At 2402, the UE may receive, from the network entity, a request to indicate whether the UE is capable of reporting the at least one compressed CIR measurement or the at least one compressed CFR measurement; and the UE may transmit, to the network entity based on the request, a capability indication of the UE to report the at least one compressed CIR measurement or the at least one compressed CFR measurement and at least one compression method supported by the UE, such as described in connection with FIG. 19. For example, at 1902, the LMF 1604 may request the UE 1602 to indicate whether the UE 1602 has the capability to report/compress CIR/CFR measurements and also request the UE 1602 to provide a list of supported compression methods (e.g., as discussed above) if the UE 1602 has the capability to compress CIR/CFR measurements (e.g., with or without using an AI/ML model). Then, as shown at 1904, in response to the request from the LMF 1604, the UE 1602 may indicate to the LMF 1604 whether it has the capability to report/compress the CIR/CFR measurements, and the UE 1602 may provide a list of supported compression methods if the UE 1602 has the capability to compress the CIR/CFR measurements. The reception of the request and/or the transmission of the capability indication may be performed by, e.g., the measurement compression component 198, the transceiver(s) 2522, the cellular baseband processor(s) 2524, and/or the application processor(s) 2506 of the apparatus 2504 in FIG. 25.

At 2404, the UE may receive, from the network entity, a configuration for compressing the at least one CIR measurement or the at least one CFR measurement, such as described in connection with FIG. 19. For example, at 1906, the LMF 1604 may indicate/configure the UE 1602 to apply at least one compression method for the CIR/CFR measurement(s), and also related parameters to be applied for the indicated/configured compression method. The reception of the configuration may be performed by, e.g., the measurement compression component 198, the transceiver(s) 2522, the cellular baseband processor(s) 2524, and/or the application processor(s) 2506 of the apparatus 2504 in FIG. 25.

At 2406, the UE may receive the set of PRSs from at least one network node, such as described in connection with FIGS. 16-19. For example, at 1610 of FIG. 16, the UE 1602 may receive a set of RSs 1608 (e.g., DL RSs, PRSs, etc.) from one or more base stations 1606. The reception of the set of PRSs may be performed by, e.g., the measurement compression component 198, the transceiver(s) 2522, the cellular baseband processor(s) 2524, and/or the application processor(s) 2506 of the apparatus 2504 in FIG. 25.

At 2408, the UE may perform at least one CIR measurement or at least one CFR measurement for a set of PRSs, such as described in connection with FIGS. 16-19. For example, at 1612 of FIG. 16, the UE 1602 may perform channel impulse response (CIR) measurement(s) and/or channel frequency response (CFR) measurement(s) for the set of RSs 1608. The at least one CIR measurement or the at least one CFR measurement may be performed by, e.g., the measurement compression component 198, the transceiver(s) 2522, the cellular baseband processor(s) 2524, and/or the application processor(s) 2506 of the apparatus 2504 in FIG. 25.

At 2410, the UE may compress the at least one CIR measurement or the at least one CFR measurement for the set of PRSs, such as described in connection with FIGS. 16-19. For example, at 1614 of FIG. 16, the LMF 1604 may the UE 1602 may compress the CIR/CFR measurement(s) for the set of RSs 1608. The compression of the at least one CIR measurement or the at least one CFR measurement may be performed by, e.g., the measurement compression component 198, the transceiver(s) 2522, the cellular baseband processor(s) 2524, and/or the application processor(s) 2506 of the apparatus 2504 in FIG. 25.

In one example, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, or a complex value of the at least one compressed CFR measurement.

In another example, to compress the at least one CIR measurement or the at least one CFR measurement for the set of PRSs, the UE may select a fraction of PRSs from the set of PRSs for the at least one CIR measurement or the at least one CFR measurement, or for reporting one or more of the at least one compressed CIR measurement or the at least one compressed CFR measurement. In some implementations, to select the fraction of PRSs from the set of PRSs, the UE may select every $k^{th}$ subcarrier of occupied subcarriers in the set of PRSs, where k is an integer. In some examples, the UE may select every first unoccupied subcarrier that is adjacent to the selected every $k^{th}$ subcarrier.

In another example, to compress the at least one CIR measurement or the at least one CFR measurement for the set of PRSs, the UE may select a portion of samples from the at least one CIR measurement or the at least one CFR measurement for reporting one or more of the at least one compressed CIR measurement or the at least one compressed CFR measurement. In some implementations, to select the portion of samples from the at least one CIR measurement or the at least one CFR measurement the UE may select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

In another example, to compress the at least one CIR measurement or the at least one CFR measurement for the set of PRSs, the UE may select a subset of PRSs from the set of PRSs for reporting one or more of the at least one compressed CIR measurement or the at least one compressed CFR measurement based on at least one of: the subset of PRSs having an SNR above or below an SNR threshold, the subset of PRSs having a delay spread above or below a delay spread threshold, or the subset of PRSs having a Rician factor above or below a Rician factor threshold. In some implementations, the subset of PRSs may correspond to top L PRSs with highest measurements in the at least one CIR measurements or the at least one CFR measurement.

In another example, to compress the at least one CIR measurement or the at least one CFR measurement for the set of PRSs, the UE may provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

At 2412, the UE may report, for a network entity, one or more of the at least one compressed CIR measurement or the at least one compressed CFR measurement for the set of PRSs, such as described in connection with FIGS. 16-19. For example, at 1620 of FIG. 16, the UE 1602 may report the compressed CIR/CFR measurement(s) to the LMF 1604. The reporting may be performed by, e.g., the measurement compression component 198, the transceiver(s) 2522, the cellular baseband processor(s) 2524, and/or the application processor(s) 2506 of the apparatus 2504 in FIG. 25.

Figure 25:
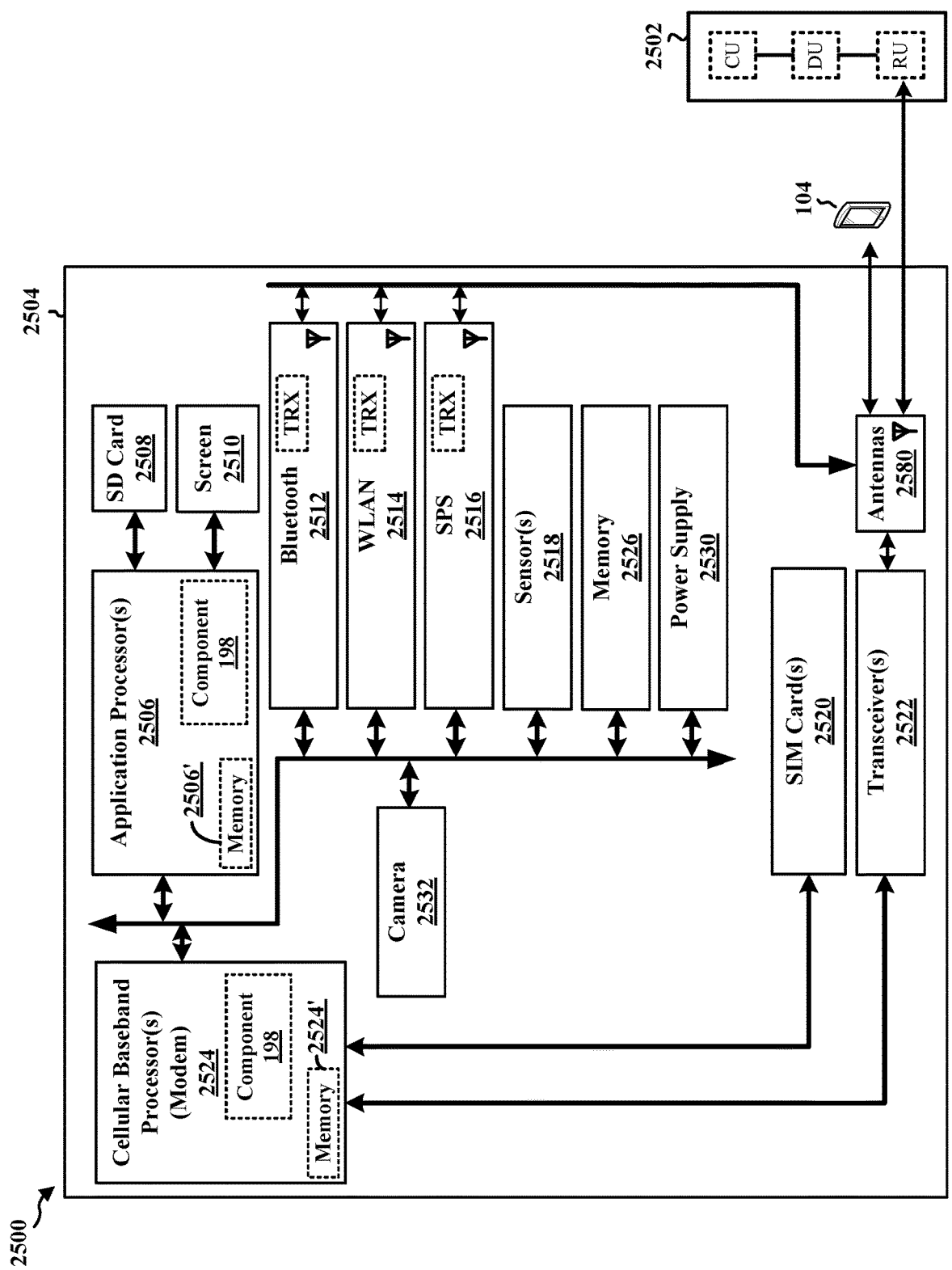
FIG. 25 is a diagram illustrating an example of a hardware implementation for an example apparatus and/or network entity.

FIG. 25 is a diagram 2500 illustrating an example of a hardware implementation for an apparatus 2504. The apparatus 2504 may be a UE, a component of a UE, or may implement UE functionality. In some aspects, the apparatus 2504 may include at least one cellular baseband processor 2524 (also referred to as a modem) coupled to one or more transceivers 2522 (e.g., cellular RF transceiver). The cellular baseband processor(s) 2524 may include at least one on-chip memory 2524'. In some aspects, the apparatus 2504 may further include one or more subscriber identity modules (SIM) cards 2520 and at least one application processor 2506 coupled to a secure digital (SD) card 2508 and a screen 2510. The application processor(s) 2506 may include on-chip memory 2506'. In some aspects, the apparatus 2504 may further include a Bluetooth module 2512, a WLAN module 2514, an SPS module 2516 (e.g., GNSS module), one or more sensor modules 2518 (e.g., barometric pressure sensor/altimeter; ultrawide band (UWB) sensor, motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2526, a power supply 2530, and/or a camera 2532. The Bluetooth module 2512, the WLAN module 2514, and the SPS module 2516 may include an on-chip transceiver (TRX) (or in some cases, just a receiver (RX)). The Bluetooth module 2512, the WLAN module 2514, and the SPS module 2516 may include their own dedicated antennas and/or utilize the antennas 2580 for communication. The cellular baseband processor(s) 2524 communicates through the transceiver(s) 2522 via one or more antennas 2580 with the UE 104 and/or with an RU associated with a network entity 2502. The cellular baseband processor(s) 2524 and the application processor(s) 2506 may each include a computer-readable medium/memory 2524', 2506', respectively. The additional memory modules 2526 may also be considered a computer-readable medium/ memory. Each computer-readable medium/memory 2524', 2506', 2526 may be non-transitory. The cellular baseband processor(s) 2524 and the application processor(s) 2506 are each responsible for general processing, including the execution of software stored on the computer-readable medium/memory. The software, when executed by the cellular baseband processor(s) 2524/application processor(s) 2506, causes the cellular baseband processor(s) 2524/application processor(s) 2506 to perform the various functions described supra. The computer-readable medium/memory may also be used for storing data that is manipulated by the cellular baseband processor(s) 2524/application processor(s) 2506 when executing software. The cellular baseband processor(s) 2524/application processor(s) 2506 may be a component of the UE 350 and may include the at least one memory 360 and/or at least one of the TX processor 368, the RX processor 356, and the controller/processor 359. In one configuration, the apparatus 2504 may be at least one processor chip (modem and/or application) and include just the cellular baseband processor(s) 2524 and/or the application processor(s) 2506, and in another configuration, the apparatus 2504 may be the entire UE (e.g., see UE 350 of FIG. 3) and include the additional modules of the apparatus 2504.

As discussed supra, the measurement compression component 198 may be configured to perform at least one CIR measurement or at least one CFR measurement for a set of PRSs. The measurement compression component 198 may also be configured to compress the at least one CIR measurement or the at least one CFR measurement for the set of PRSs. The measurement compression component 198 may also be configured to report, for a network entity, one or more of the at least one compressed CIR measurement or the at least one compressed CFR measurement for the set of PRSs. The measurement compression component 198 may be within the cellular baseband processor(s) 2524, the application processor(s) 2506, or both the cellular baseband processor(s) 2524 and the application processor(s) 2506. The measurement compression component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2504 may include a variety of components configured for various functions. In one configuration, the apparatus 2504, and in particular the cellular baseband processor(s) 2524 and/or the application processor(s) 2506, may include means for performing at least one CIR measurement or at least one CFR measurement for a set of PRSs. The apparatus 2504 may further include means for compressing the at least one CIR measurement or the at least one CFR measurement for the set of PRSs. The apparatus 2504 may further include means for reporting, for a network entity, one or more of the at least one compressed CIR measurement or the at least one compressed CFR measurement for the set of PRSs.

In one configuration, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, or a complex value of the at least one compressed CFR measurement.

In another configuration, the means for compressing the at least one CIR measurement or the at least one CFR measurement for the set of PRSs may include configuring the apparatus 2504 to select a fraction of PRSs from the set of PRSs for the at least one CIR measurement or the at least one CFR measurement, or for reporting one or more of the at least one compressed CIR measurement or the at least one compressed CFR measurement. In some implementations, the apparatus 2504 may further include means for selecting every $k^{th}$ subcarrier of occupied subcarriers in the set of PRSs, where k is an integer. In some configurations, the apparatus 2504 may further include means for selecting every first unoccupied subcarrier that is adjacent to the selected every $k^{th}$ subcarrier.

In another configuration, the means for compressing the at least one CIR measurement or the at least one CFR measurement for the set of PRSs may include configuring the apparatus 2504 to select a portion of samples from the at least one CIR measurement or the at least one CFR measurement for reporting one or more of the at least one compressed CIR measurement or the at least one compressed CFR measurement. In some implementations, to select the portion of samples from the at least one CIR measurement or the at least one CFR measurement, the apparatus 2504 may further includes means for selecting first N contiguous samples with magnitudes exceeding a magnitude threshold, where N is an integer, means for selecting a set of samples whose magnitude is associated with a maximum CIR measurement or a maximum CFR measurement, or means for selecting first M peaks in the CIR measurement or the CFR measurement.

In another configuration, the means for compressing the at least one CIR measurement or the at least one CFR measurement for the set of PRSs may include configuring the apparatus 2504 to select a subset of PRSs from the set of PRSs for reporting one or more of the at least one compressed CIR measurement or the at least one compressed CFR measurement based on at least one of: the subset of PRSs having an SNR above or below an SNR threshold, the subset of PRSs having a delay spread above or below a delay spread threshold, or the subset of PRSs having a Rician factor above or below a Rician factor threshold. In some implementations, the subset of PRSs may correspond to top L PRSs with highest measurements in the at least one CIR measurements or the at least one CFR measurement.

In another configuration the means for compressing the at least one CIR measurement or the at least one CFR measurement for the set of PRSs may include configuring the apparatus 2504 to provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

In another configuration, the apparatus 2504 may further includes means for receiving, from the network entity, a request to indicate whether the UE is capable of reporting the at least one compressed CIR measurement or the at least one compressed CFR measurement; and means for transmitting, to the network entity based on the request, a capability indication of the UE to report the at least one compressed CIR measurement or the at least one compressed CFR measurement and at least one compression method supported by the UE.

In another configuration, the apparatus 2504 may further include means for receiving, from the network entity, a configuration for compressing the at least one CIR measurement or the at least one CFR measurement.

In another configuration, the apparatus 2504 may further include means for receiving the set of PRSs from at least one network node.

The means may be the measurement compression component 198 of the apparatus 2504 configured to perform the functions recited by the means. As described supra, the apparatus 2504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 26:
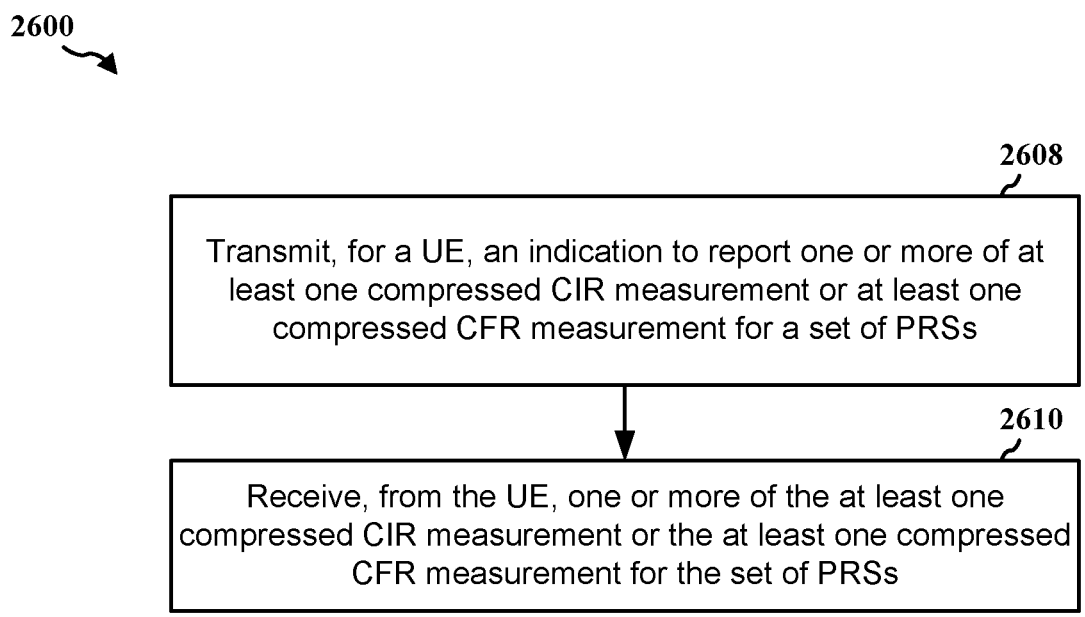
FIG. 26 is a flowchart of a method of wireless communication.

FIG. 26 is a flowchart 2600 of a method of wireless communication. The method may be performed by a network entity (e.g., the one or more location servers 168; the location server 504; the LMF 1604, 2004; the network entity 2860). The method may enable the network entity to configure a UE to compress DL reference signal measurements to reduce reporting overhead for the DL reference signal measurements, thereby improving the efficiency and performance of AI/ML positioning.

At 2608, the network entity may transmit, for a UE, an indication to report one or more of at least one compressed CIR measurement or at least one compressed CFR measurement for a set of PRSs, such as described in connection with FIG. 19. For example, at 1906, the LMF 1604 may indicate the UE 1602 to apply at least one compression method for the CIR/CFR measurement(s), and also related parameters to be applied for the indicated/configured compression method. The transmission of the indication may be performed by, e.g., the measurement compression configuration component 197, the network processor(s) 2812, and/or the network interface 2880 of the network entity 2860 in FIG. 28.

In one example, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, or a complex value of the at least one compressed CFR measurement.

At 2610, the network entity may receive, from the UE, one or more of the at least one compressed CIR measurement or the at least one compressed CFR measurement for the set of PRSs, such as described in connection with FIGS. 16-19. For example, at 1620 of FIG. 16, the LMF 1604 may receive the compressed CIR/CFR measurement(s) from the UE 1602. The reception of the one or more of the at least one compressed CIR measurement or the at least one compressed CFR measurement may be performed by, e.g., the measurement compression configuration component 197, the network processor(s) 2812, and/or the network interface 2880 of the network entity 2860 in FIG. 28.

In one example, the network entity may transmit, to the UE, a request to indicate whether the UE is capable of reporting the at least one compressed CIR measurement or the at least one compressed CFR measurement; and receive, from the UE based on the request, a capability indication of the UE to report the at least one compressed CIR measurement or the at least one compressed CFR measurement and at least one compression method supported by the UE, such as described in connection with FIG. 19. For example, at 1902, the LMF 1604 may request the UE 1602 to indicate whether the UE 1602 has the capability to report/compress CIR/CFR measurements and also request the UE 1602 to provide a list of supported compression methods (e.g., as discussed above) if the UE 1602 has the capability to compress CIR/CFR measurements (e.g., with or without using an AI/ML model). Then, as shown at 1904, in response to the request from the LMF 1604, the UE 1602 may indicate to the LMF 1604 whether it has the capability to report/compress the CIR/CFR measurements, and the UE 1602 may provide a list of supported compression methods if the UE 1602 has the capability to compress the CIR/CFR measurements. The transmission of the request and/or the reception of the capability indication may be performed by, e.g., the measurement compression configuration component 197, the network processor(s) 2812, and/or the network interface 2880 of the network entity 2860 in FIG. 28.

In another example, the network entity may configure at least one network node to transmit the set of PRSs to the UE. The configuration may be performed by, e.g., the measurement compression configuration component 197, the network processor(s) 2812, and/or the network interface 2880 of the network entity 2860 in FIG. 28.

In another example, the network entity may transmit, for the UE, a configuration for compressing the at least one CIR measurement or the at least one CFR measurement, such as described in connection with FIG. 19. For example, at 1906, the LMF 1604 may configure the UE 1602 to apply at least one compression method for the CIR/CFR measurement(s), and also related parameters to be applied for the indicated/configured compression method. The transmission of the configuration may be performed by, e.g., the measurement compression configuration component 197, the network processor(s) 2812, and/or the network interface 2880 of the network entity 2860 in FIG. 28.

In another example, the configuration may configure the UE to select a fraction of PRSs from the set of PRSs for the at least one CIR measurement or the at least one CFR measurement, or for reporting one or more of the at least one compressed CIR measurement or the at least one compressed CFR measurement. In some implementations, the configuration may further configure the UE to select every $k^{th}$ subcarrier of occupied subcarriers in the set of PRSs, where k is an integer. In some implementations, the configuration may further configure the UE to select every first unoccupied subcarrier that is adjacent to the selected every $k^{th}$ subcarrier.

In another example, the configuration may configure the UE to select a portion of samples from the at least one CIR measurement or the at least one CFR measurement for reporting one or more of the at least one compressed CIR measurement or the at least one compressed CFR measurement. In some implementations, the configuration may further configure the UE to select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

In another example, the configuration may configure the UE to select a subset of PRSs from the set of PRSs for reporting one or more of the at least one compressed CIR measurement or the at least one compressed CFR measurement based on at least one of: the subset of PRSs having a signal-to-noise ratio (SNR) above or below an SNR threshold, the subset of PRSs having a delay spread above or below a delay spread threshold, or the subset of PRSs having a Rician factor above or below a Rician factor threshold. In some implementations, the subset of PRSs may correspond to top L PRSs with highest measurements in the at least one CIR measurements or the at least one CFR measurement.

In another example, the configuration may configure the UE to provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

Figure 27:
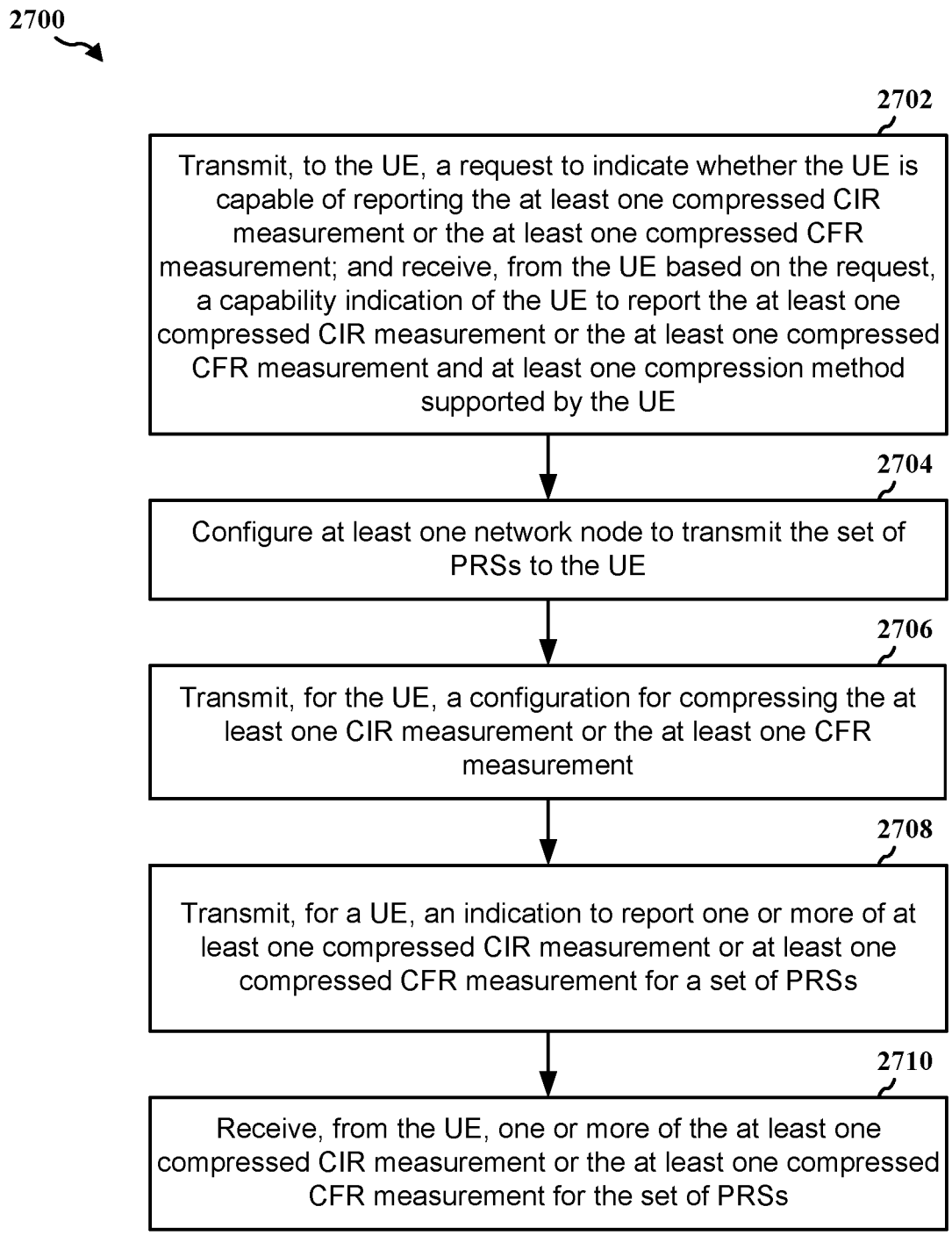
FIG. 27 is a flowchart of a method of wireless communication.

FIG. 27 is a flowchart 2700 of a method of wireless communication. The method may be performed by a network entity (e.g., the one or more location servers 168; the location server 504; the LMF 1604, 2004; the network entity 2860). The method may enable the network entity to configure a UE to compress DL reference signal measurements to reduce reporting overhead for the DL reference signal measurements, thereby improving the efficiency and performance of AI/ML positioning.

At 2702, the network entity may transmit, to the UE, a request to indicate whether the UE is capable of reporting the at least one compressed CIR measurement or the at least one compressed CFR measurement; and receive, from the UE based on the request, a capability indication of the UE to report the at least one compressed CIR measurement or the at least one compressed CFR measurement and at least one compression method supported by the UE, such as described in connection with FIG. 19. For example, at 1902, the LMF 1604 may request the UE 1602 to indicate whether the UE 1602 has the capability to report/compress CIR/CFR measurements and also request the UE 1602 to provide a list of supported compression methods (e.g., as discussed above) if the UE 1602 has the capability to compress CIR/CFR measurements (e.g., with or without using an AI/ML model). Then, as shown at 1904, in response to the request from the LMF 1604, the UE 1602 may indicate to the LMF 1604 whether it has the capability to report/compress the CIR/CFR measurements, and the UE 1602 may provide a list of supported compression methods if the UE 1602 has the capability to compress the CIR/CFR measurements. The transmission of the request and/or the reception of the capability indication may be performed by, e.g., the measurement compression configuration component 197, the network processor(s) 2812, and/or the network interface 2880 of the network entity 2860 in FIG. 28.

At 2704, the network entity may configure at least one network node to transmit the set of PRSs to the UE. The configuration may be performed by, e.g., the measurement compression configuration component 197, the network processor(s) 2812, and/or the network interface 2880 of the network entity 2860 in FIG. 28.

At 2706, the network entity may transmit, for the UE, a configuration for compressing the at least one CIR measurement or the at least one CFR measurement, such as described in connection with FIG. 19. For example, at 1906, the LMF 1604 may configure the UE 1602 to apply at least one compression method for the CIR/CFR measurement(s), and also related parameters to be applied for the indicated/configured compression method. The transmission of the configuration may be performed by, e.g., the measurement compression configuration component 197, the network processor(s) 2812, and/or the network interface 2880 of the network entity 2860 in FIG. 28.

In one example, the configuration may configure the UE to select a fraction of PRSs from the set of PRSs for the at least one CIR measurement or the at least one CFR measurement, or for reporting one or more of the at least one compressed CIR measurement or the at least one compressed CFR measurement. In some implementations, the configuration may further configure the UE to select every $k^{th}$ subcarrier of occupied subcarriers in the set of PRSs, where k is an integer. In some implementations, the configuration may further configure the UE to select every first unoccupied subcarrier that is adjacent to the selected every $k^{th}$ subcarrier.

In another example, the configuration may configure the UE to select a portion of samples from the at least one CIR measurement or the at least one CFR measurement for reporting one or more of the at least one compressed CIR measurement or the at least one compressed CFR measurement. In some implementations, the configuration may further configure the UE to select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

In another example, the configuration may configure the UE to select a subset of PRSs from the set of PRSs for reporting one or more of the at least one compressed CIR measurement or the at least one compressed CFR measurement based on at least one of: the subset of PRSs having a signal-to-noise ratio (SNR) above or below an SNR threshold, the subset of PRSs having a delay spread above or below a delay spread threshold, or the subset of PRSs having a Rician factor above or below a Rician factor threshold. In some implementations, the subset of PRSs may correspond to top Z PRSs with highest measurements in the at least one CIR measurements or the at least one CFR measurement.

In another example, the configuration may configure the UE to provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

At 2708, the network entity may transmit, for a UE, an indication to report one or more of at least one compressed CIR measurement or at least one compressed CFR measurement for a set of PRSs, such as described in connection with FIG. 19. For example, at 1906, the LMF 1604 may indicate the UE 1602 to apply at least one compression method for the CIR/CFR measurement(s), and also related parameters to be applied for the indicated/configured compression method. The transmission of the indication may be performed by, e.g., the measurement compression configuration component 197, the network processor(s) 2812, and/or the network interface 2880 of the network entity 2860 in FIG. 28.

In one example, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, or a complex value of the at least one compressed CFR measurement.

At 2710, the network entity may receive, from the UE, one or more of the at least one compressed CIR measurement or the at least one compressed CFR measurement for the set of PRSs, such as described in connection with FIGS. 16-19. For example, at 1620 of FIG. 16, the LMF 1604 may receive the compressed CIR/CFR measurement(s) from the UE 1602. The reception of the one or more of the at least one compressed CIR measurement or the at least one compressed CFR measurement may be performed by, e.g., the measurement compression configuration component 197, the network processor(s) 2812, and/or the network interface 2880 of the network entity 2860 in FIG. 28.

Figure 28:
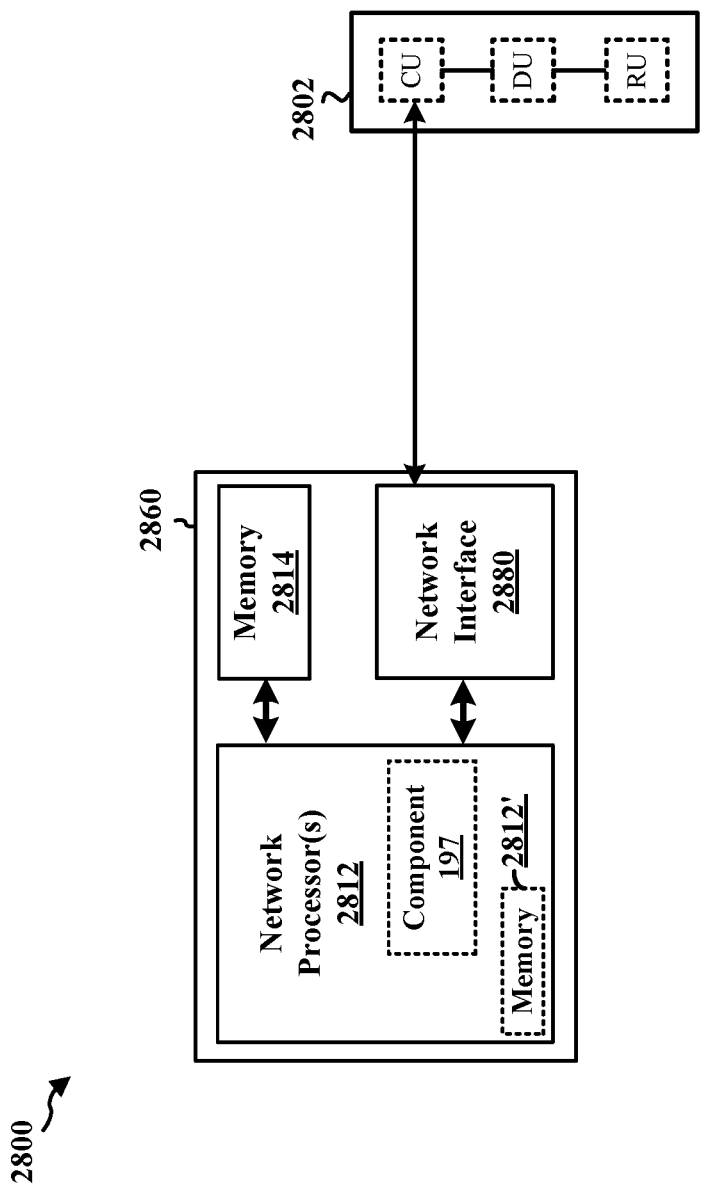
FIG. 28 is a diagram illustrating an example of a hardware implementation for an example network entity.

FIG. 28 is a diagram 2800 illustrating an example of a hardware implementation for a network entity 2860. In one example, the network entity 2860 may be within the core network 120. The network entity 2860 may include at least one network processor 2812. The network processor(s) 2812 may include on-chip memory 2812'. In some aspects, the network entity 2860 may further include additional memory modules 2814. The network entity 2860 communicates via the network interface 2880 directly (e.g., backhaul link) or indirectly (e.g., through a RIC) with the CU 2802. The on-chip memory 2812' and the additional memory modules 2814 may each be considered a computer-readable medium/memory. Each computer-readable medium/memory may be non-transitory. The network processor(s) 2812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the measurement compression configuration component 197 may be configured to transmit, for a UE, an indication to report one or more of at least one compressed CIR measurement or at least one compressed CFR measurement for a set of PRSs. The measurement compression configuration component 197 may also be configured to receive, from the UE, one or more of the at least one compressed CIR measurement or the at least one compressed CFR measurement for the set of PRSs. The measurement compression configuration component 197 may be within the network processor(s) 2812. The measurement compression configuration component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2860 may include a variety of components configured for various functions. In one configuration, the network entity 2860 may include means for transmitting, for a UE, an indication to report one or more of at least one compressed CIR measurement or at least one compressed CFR measurement for a set of PRSs. The network entity 2860 may further include means for receiving, from the UE, one or more of the at least one compressed CIR measurement or the at least one compressed CFR measurement for the set of PRSs.

In one configuration, the at least one compressed CIR measurement or the at least one compressed CFR measurement may include at least one of: an absolute value of the at least one compressed CIR measurement, an absolute value of the at least one compressed CFR measurement, a complex value of the at least one compressed CIR measurement, or a complex value of the at least one compressed CFR measurement.

In another configuration, the network entity 2860 may further include means for transmitting, to the UE, a request to indicate whether the UE is capable of reporting the at least one compressed CIR measurement or the at least one compressed CFR measurement; and means for receiving, from the UE based on the request, a capability indication of the UE to report the at least one compressed CIR measurement or the at least one compressed CFR measurement and at least one compression method supported by the UE.

In another configuration, the network entity 2860 may further include means for configuring at least one network node to transmit the set of PRSs to the UE.

In another configuration, the network entity 2860 may further include means for transmitting, for the UE, a configuration for compressing the at least one CIR measurement or the at least one CFR measurement.

In another configuration, the configuration may configure the UE to select a fraction of PRSs from the set of PRSs for the at least one CIR measurement or the at least one CFR measurement, or for reporting one or more of the at least one compressed CIR measurement or the at least one compressed CFR measurement. In some implementations, the configuration may further configure the UE to select every $k^{th}$ subcarrier of occupied subcarriers in the set of PRSs, where k is an integer. In some implementations, the configuration may further configure the UE to select every first unoccupied subcarrier that is adjacent to the selected every $k^{th}$ subcarrier.

In another configuration, the configuration may configure the UE to select a portion of samples from the at least one CIR measurement or the at least one CFR measurement for reporting one or more of the at least one compressed CIR measurement or the at least one compressed CFR measurement. In some implementations, the configuration may further configure the UE to select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

In another configuration, the configuration may configure the UE to select a subset of PRSs from the set of PRSs for reporting one or more of the at least one compressed CIR measurement or the at least one compressed CFR measurement based on at least one of: the subset of PRSs having an SNR above or below an SNR threshold, the subset of PRSs having a delay spread above or below a delay spread threshold, or the subset of PRSs having a Rician factor above or below a Rician factor threshold. In some implementations, the subset of PRSs may correspond to top L PRSs with highest measurements in the at least one CIR measurements or the at least one CFR measurement.

In another configuration, the configuration may configure the UE to provide the at least one CIR measurement or the at least one CFR measurement for the set of PRSs for an AI/ML model, and receive, from the AI/ML model, the at least one compressed CIR measurement or the at least one compressed CFR measurement for the set of PRSs.

The means may be the measurement compression configuration component 197 of the network entity 2860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only. A and B, A and C. B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: performing at least one channel impulse response (CIR) measurement or at least one channel frequency response (CFR) measurement for a set of positioning reference signals (PRSs); compressing the at least one CIR measurement or the at least one CFR measurement for the set of PRSs; and reporting, for a network entity, one or more of the at least one compressed CIR measurement or the at least one compressed CFR measurement for the set of PRSs.

Aspect 2 is the method of aspect 1, wherein the at least one compressed CIR measurement or the at least one compressed CFR measurement includes at least one of: an absolute value of the at least one compressed CIR measurement, an absolute value of the at least one compressed CFR measurement, a complex value of the at least one compressed CIR measurement, or a complex value of the at least one compressed CFR measurement.

Aspect 3 is the method of aspect 1 or aspect 2, further comprising: receiving, from the network entity, a configuration for compressing the at least one CIR measurement or the at least one CFR measurement.

Aspect 4 is the method of any of aspects 1 to 3, further comprising: receiving the set of PRSs from at least one network node.

Aspect 5 is the method of any of aspects 1 to 4, wherein compressing the at least one CIR measurement or the at least one CFR measurement for the set of PRSs comprises: selecting a fraction of PRSs from the set of PRSs for the at least one CIR measurement or the at least one CFR measurement, or for reporting one or more of the at least one compressed CIR measurement or the at least one compressed CFR measurement.

Aspect 6 is the method of any of aspects 1 to 5, wherein selecting the fraction of PRSs from the set of PRSs comprises: selecting every $k^{th}$ subcarrier of occupied subcarriers in the set of PRSs, where k is an integer.

Aspect 7 is the method of any of aspects 1 to 6, further comprising: selecting every first unoccupied subcarrier that is adjacent to the selected every $k^{th}$ subcarrier.

Aspect 8 is the method of any of aspects 1 to 7, wherein compressing the at least one CIR measurement or the at least one CFR measurement for the set of PRSs comprises: selecting a portion of samples from the at least one CIR measurement or the at least one CFR measurement for reporting one or more of the at least one compressed CIR measurement or the at least one compressed CFR measurement.

Aspect 9 is the method of any of aspects 1 to 8, wherein selecting the portion of samples from the at least one CIR measurement or the at least one CFR measurement comprises at least one of: selecting first N contiguous samples with magnitudes exceeding a magnitude threshold, where N is an integer; selecting a set of samples whose magnitude is associated with a maximum CIR measurement or a maximum CFR measurement; or selecting first M peaks in the CIR measurement or the CFR measurement.

Aspect 10 is the method of any of aspects 1 to 9, wherein compressing the at least one CIR measurement or the at least one CFR measurement for the set of PRSs comprises: selecting a subset of PRSs from the set of PRSs for reporting one or more of the at least one compressed CIR measurement or the at least one compressed CFR measurement based on at least one of: the subset of PRSs having a signal-to-noise ratio (SNR) above or below an SNR threshold, the subset of PRSs having a delay spread above or below a delay spread threshold, or the subset of PRSs having a Rician factor above or below a Rician factor threshold.

Aspect 11 is the method of any of aspects 1 to 10, wherein the subset of PRSs corresponds to top L PRSs with highest measurements in the at least one CIR measurements or the at least one CFR measurement.

Aspect 12 is the method of any of aspects 1 to 11, wherein compressing the at least one CIR measurement or the at least one CFR measurement for the set of PRSs comprises: providing the at least one CIR measurement or the at least one CFR measurement for the set of PRSs for an artificial intelligence (AI)/machine learning (ML) (AI/ML) model; and receiving, from the AI/ML model, the at least one compressed CIR measurement or the at least one compressed CFR measurement for the set of PRSs.

Aspect 13 is the method of any of aspects 1 to 12, further comprising: receiving, from the network entity, a request to indicate whether the UE is capable of reporting the at least one compressed CIR measurement or the at least one compressed CFR measurement; and transmitting, to the network entity based on the request, a capability indication of the UE to report the at least one compressed CIR measurement or the at least one compressed CFR measurement and at least one compression method supported by the UE.

Aspect 14 is an apparatus for wireless communication at a user equipment (UE), comprising: at least one memory; and at least one processor coupled to the at least one memory and, based at least in part on information stored in the at least one memory, the at least one processor, individually or in any combination, is configured to implement any of aspects 1 to 13.

Aspect 15 is the apparatus of aspect 14, further comprising at least one of a transceiver or an antenna coupled to the at least one processor.

Aspect 16 is an apparatus for wireless communication comprising means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a network entity, comprising: transmitting, for a user equipment (UE), an indication to report one or more of at least one compressed channel impulse response (CIR) measurement or at least one compressed channel frequency response (CFR) measurement for a set of positioning reference signals (PRSs); and receiving, from the UE, one or more of the at least one compressed CIR measurement or the at least one compressed CFR measurement for the set of PRSs.

Aspect 19 is the method of aspect 18, wherein the at least one compressed CIR measurement or the at least one compressed CFR measurement includes at least one of: an absolute value of the at least one compressed CIR measurement, an absolute value of the at least one compressed CFR measurement, a complex value of the at least one compressed CIR measurement, or a complex value of the at least one compressed CFR measurement.

Aspect 20 is the method of aspect 18 or aspect 19, further comprising: configuring at least one network node to transmit the set of PRSs to the UE.

Aspect 21 is the method of any of aspects 18 to 20, further comprising: transmitting, for the UE, a configuration for compressing the at least one CIR measurement or the at least one CFR measurement.

Aspect 22 is the method of any of aspects 18 to 21, wherein the configuration configures the UE to select a fraction of PRSs from the set of PRSs for the at least one CIR measurement or the at least one CFR measurement, or for reporting one or more of the at least one compressed CIR measurement or the at least one compressed CFR measurement.

Aspect 23 is the method of any of aspects 18 to 22, wherein the configuration further configures the UE to select every $k^{th}$ subcarrier of occupied subcarriers in the set of PRSs, where k is an integer.

Aspect 24 is the method of any of aspects 18 to 23, wherein the configuration further configures the UE to select every first unoccupied subcarrier that is adjacent to the selected every $k^{th}$ subcarrier.

Aspect 25 is the method of any of aspects 18 to 24, wherein the configuration configures the UE to select a portion of samples from the at least one CIR measurement or the at least one CFR measurement for reporting one or more of the at least one compressed CIR measurement or the at least one compressed CFR measurement.

Aspect 26 is the method of any of aspects 18 to 25, wherein the configuration further configures the UE to select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

Aspect 27 is the method of any of aspects 18 to 26, wherein the configuration configures the UE to select a subset of PRSs from the set of PRSs for reporting one or more of the at least one compressed CIR measurement or the at least one compressed CFR measurement based on at least one of: the subset of PRSs having a signal-to-noise ratio (SNR) above or below an SNR threshold, the subset of PRSs having a delay spread above or below a delay spread threshold, or the subset of PRSs having a Rician factor above or below a Rician factor threshold.

Aspect 28 is the method of any of aspects 18 to 27, wherein the subset of PRSs corresponds to top L PRSs with highest measurements in the at least one CIR measurements or the at least one CFR measurement.

Aspect 29 is the method of any of aspects 18 to 28, wherein the configuration configures the UE to provide the at least one CIR measurement or the at least one CFR measurement for the set of PRSs for an artificial intelligence (AI)/machine learning (ML) (AI/ML) model; and receive, from the AI/ML model, the at least one compressed CIR measurement or the at least one compressed CFR measurement for the set of PRSs.

Aspect 30 is the method of any of aspects 18 to 29, further comprising: transmitting, to the UE, a request to indicate whether the UE is capable of reporting the at least one compressed CIR measurement or the at least one compressed CFR measurement; and receiving, from the UE based on the request, a capability indication of the UE to report the at least one compressed CIR measurement or the at least one compressed CFR measurement and at least one compression method supported by the UE.

Aspect 31 is an apparatus for wireless communication at a network entity, comprising: at least one memory; and at least one processor coupled to the at least one memory and, based at least in part on information stored in the at least one memory, the at least one processor, individually or in any combination, is configured to implement any of aspects 18 to 30.

Aspect 32 is the apparatus of aspect 31, further comprising at least one of a transceiver or an antenna coupled to the at least one processor.

Aspect 33 is an apparatus for wireless communication comprising means for implementing any of aspects 18 to 30.

Aspect 34 is a computer-readable medium (e.g., a non-transitory computer-readable medium) storing computer executable code, where the code when executed by a processor causes the processor to implement any of aspects 18 to 30.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
perform at least one channel impulse response (CIR) measurement or at least one channel frequency response (CFR) measurement for a set of positioning reference signals (PRSs);
compress the at least one CIR measurement or the at least one CFR measurement for the set of PRSs;
report, for a network entity, one or more of the at least one compressed CIR measurement or the at least one compressed CFR measurement for the set of PRSs;
receive, from the network entity, a request to indicate whether the UE is capable of reporting the at least one compressed CIR measurement or the at least one compressed CFR measurement; and
transmit, to the network entity based on the request, a capability indication of the UE to report the at least one compressed CIR measurement or the at least one compressed CFR measurement and at least one compression method supported by the UE.

2. The apparatus of claim 1, wherein the at least one compressed CIR measurement or the at least one compressed CFR measurement includes at least one of: an absolute value of the at least one compressed CIR measurement, an absolute value of the at least one compressed CFR measurement, a complex value of the at least one compressed CIR measurement, a complex value of the at least one compressed CFR measurement, a timing indicator of the at least one compressed CIR measurement, or a frequency indication of the at least one compressed CFR measurement.

3. The apparatus of claim 1, wherein the at least one processor, individually or in any combination, is further configured to:
receive, from the network entity, a configuration for compressing the at least one CIR measurement or the at least one CFR measurement.

4. The apparatus of claim 1, wherein the at least one processor, individually or in any combination, is further configured to:
receive the set of PRSs from at least one network node.

5. The apparatus of claim 1, wherein to compress the at least one CIR measurement or the at least one CFR measurement for the set of PRSs, the at least one processor, individually or in any combination, is configured to:
select a fraction of PRSs from the set of PRSs for the at least one CIR measurement or the at least one CFR measurement, or for reporting one or more of the at least one compressed CIR measurement or the at least one compressed CFR measurement.

6. The apparatus of claim 5, wherein to select the fraction of PRSs from the set of PRSs, the at least one processor, individually or in any combination, is configured to:
select every $k^{th}$ subcarrier of occupied subcarriers in the set of PRSs, where k is an integer.

7. The apparatus of claim 6, wherein the at least one processor, individually or in any combination, is further configured to:
select every first unoccupied subcarrier that is adjacent to the selected every $k^{th}$ subcarrier.

8. The apparatus of claim 1, wherein to compress the at least one CIR measurement or the at least one CFR measurement for the set of PRSs, the at least one processor, individually or in any combination, is configured to:
select a portion of samples from the at least one CIR measurement or the at least one CFR measurement for reporting one or more of the at least one compressed CIR measurement or the at least one compressed CFR measurement.

9. The apparatus of claim 8, wherein to select the portion of samples from the at least one CIR measurement or the at least one CFR measurement, the at least one processor, individually or in any combination, is configured to:
select first N contiguous samples with magnitudes exceeding a magnitude threshold, where N is an integer;
select a set of samples whose magnitude is associated with a maximum CIR measurement or a maximum CFR measurement; or
select first M peaks in the CIR measurement or the CFR measurement.

10. The apparatus of claim 1, wherein to compress the at least one CIR measurement or the at least one CFR measurement for the set of PRSs, the at least one processor, individually or in any combination, is configured to:
select a subset of PRSs from the set of PRSs for reporting one or more of the at least one compressed CIR measurement or the at least one compressed CFR measurement based on at least one of:
the subset of PRSs having a signal-to-noise ratio (SNR) above an SNR threshold,
the subset of PRSs having a delay spread above or below a delay spread threshold, or
the subset of PRSs having a Rician factor above or below a Rician factor threshold.

11. The apparatus of claim 10, wherein the subset of PRSs corresponds to top L PRSs with highest measurements in the at least one CIR measurements or the at least one CFR measurement.

12. The apparatus of claim 1, wherein to compress the at least one CIR measurement or the at least one CFR measurement for the set of PRSs, the at least one processor, individually or in any combination, is configured to:
provide the at least one CIR measurement or the at least one CFR measurement for the set of PRSs for an artificial intelligence (AI)/machine learning (ML) (AI/ML) model; and
receive, from the AI/ML model, the at least one compressed CIR measurement or the at least one compressed CFR measurement for the set of PRSs.

13. The apparatus of claim 1, further comprising a transceiver coupled to the at least one processor, wherein to report the one or more of the at least one compressed CIR measurement or the at least one compressed CFR measurement for the set of PRSs, the at least one processor, individually or in any combination, is configured to:

report, via the transceiver, the one or more of the at least one compressed CIR measurement or the at least one compressed CFR measurement for the set of PRSs.

14. A method of wireless communication at a user equipment (UE), comprising:

performing at least one channel impulse response (CIR) measurement or at least one channel frequency response (CFR) measurement for a set of positioning reference signals (PRSs);

compressing the at least one CIR measurement or the at least one CFR measurement for the set of PRSs;

reporting, for a network entity, one or more of the at least one compressed CIR measurement or the at least one compressed CFR measurement for the set of PRSs;

receiving, from the network entity, a request to indicate whether the UE is capable of reporting the at least one compressed CIR measurement or the at least one compressed CFR measurement; and transmitting, to the network entity based on the request, a capability indication of the UE to report the at least one compressed CIR measurement or the at least one compressed CFR measurement and at least one compression method supported by the UE.

15. An apparatus for wireless communication at a network entity, comprising:

at least one memory; and at least one processor coupled to the at least one memory and, based at least in part on information stored in the at least one memory, the at least one processor, individually or in any combination, is configured to:

transmit, for a user equipment (UE), an indication to report one or more of at least one compressed channel impulse response (CIR) measurement or at least one compressed channel frequency response (CFR) measurement for a set of positioning reference signals (PRSs);

receive, from the UE, one or more of the at least one compressed CIR measurement or the at least one compressed CFR measurement for the set of PRSs;

transmit, to the UE, a request to indicate whether the UE is capable of reporting the at least one compressed CIR measurement or the at least one compressed CFR measurement; and receive, from the UE based on the request, a capability indication of the UE to report the at least one compressed CIR measurement or the at least one compressed CFR measurement and at least one compression method supported by the UE.

16. The apparatus of claim 15, wherein the at least one compressed CIR measurement or the at least one compressed CFR measurement includes at least one of: an absolute value of the at least one compressed CIR measurement, an absolute value of the at least one compressed CFR measurement, a complex value of the at least one compressed CIR measurement, a complex value of the at least one compressed CFR measurement, a timing indicator of the at least one compressed CIR measurement, or a frequency indication of the at least one compressed CFR measurement.

17. The apparatus of claim 15, wherein the at least one processor, individually or in any combination, is further configured to:

configure at least one network node to transmit the set of PRSs to the UE.

18. The apparatus of claim 15, wherein the at least one processor, individually or in any combination, is further configured to:

transmit, for the UE, a configuration for compressing the at least one CIR measurement or the at least one CFR measurement.

19. The apparatus of claim 18, wherein the configuration configures the UE to select a fraction of PRSs from the set of PRSs for the at least one CIR measurement or the at least one CFR measurement, or for reporting one or more of the at least one compressed CIR measurement or the at least one compressed CFR measurement.

20. The apparatus of claim 19, wherein the configuration further configures the UE to select every $k^{th}$ subcarrier of occupied subcarriers in the set of PRSs, where k is an integer.

21. The apparatus of claim 20, wherein the configuration further configures the UE to select every first unoccupied subcarrier that is adjacent to the selected every $k^{th}$ subcarrier.

22. The apparatus of claim 18, wherein the configuration configures the UE to select a portion of samples from the at least one CIR measurement or the at least one CFR measurement for reporting one or more of the at least one compressed CIR measurement or the at least one compressed CFR measurement.

23. The apparatus of claim 22, wherein the configuration further configures the UE to select first N contiguous samples with magnitudes exceeding a magnitude threshold, where N is an integer, select a set of samples whose magnitude is associated with a maximum CIR measurement or a maximum CFR measurement, or select first M peaks in the CIR measurement or the CFR measurement.

24. The apparatus of claim 18, wherein the configuration configures the UE to select a subset of PRSs from the set of PRSs for reporting one or more of the at least one compressed CIR measurement or the at least one compressed CFR measurement based on at least one of:

the subset of PRSs having a signal-to-noise ratio (SNR) above an SNR threshold, the subset of PRSs having a delay spread above or below a delay spread threshold, or the subset of PRSs having a Rician factor above or below a Rician factor threshold.

25. The apparatus of claim 24, wherein the subset of PRSs corresponds to top L PRSs with highest measurements in the at least one CIR measurements or the at least one CFR measurement.

26. The apparatus of claim 18, wherein the configuration configures the UE to provide the at least one CIR measurement or the at least one CFR measurement for the set of PRSs for an artificial intelligence (AI)/machine learning (ML) (AI/ML) model and receive, from the AI/ML model, the at least one compressed CIR measurement or the at least one compressed CFR measurement for the set of PRSs.

27. The apparatus of claim 15, further comprising a transceiver coupled to the at least one processor, wherein to transmit the indication, the at least one processor, individually or in any combination, is configured to transmit the indication via the transceiver, and wherein to receive one or more of the at least one compressed CIR measurement or the at least one compressed CFR measurement for the set of PRSs, the at least one processor, individually or in any combination, is configured to receive, via the transceiver, one or more of the at least one compressed CIR measurement or the at least one compressed CFR measurement for the set of PRSs.

28. A method of wireless communication at a network entity, comprising:
- transmitting, for a user equipment (UE), an indication to report one or more of at least one compressed channel impulse response (CIR) measurement or at least one compressed channel frequency response (CFR) measurement for a set of positioning reference signals (PRSs);
- receiving, from the UE, one or more of the at least one compressed CIR measurement or the at least one compressed CFR measurement for the set of PRSs;
- transmitting, to the UE, a request to indicate whether the UE is capable of reporting the at least one compressed CIR measurement or the at least one compressed CFR measurement; and
- receiving, from the UE based on the request, a capability indication of the UE to report the at least one compressed CIR measurement or the at least one compressed CFR measurement and at least one compression method supported by the UE.

\* \* \* \* \*